(12) United States Patent
Makino et al.

(10) Patent No.: US 10,002,122 B2
(45) Date of Patent: Jun. 19, 2018

(54) FORMING KNOWLEDGE INFORMATION BASED ON A PREDETERMINED THRESHOLD OF A CONCEPT AND A PREDETERMINED THRESHOLD OF A TARGET WORD EXTRACTED FROM A DOCUMENT

(71) Applicants: Kabushiki Kaisha Toshiba, Minato-ku (JP); Toshiba Solutions Corporation, Kawasaki-shi (JP)

(72) Inventors: Kyoko Makino, Kawasaki (JP); Shigeaki Sakurai, Koutou (JP); Shigeru Matsumoto, Nishi-Tokyo (JP); Shozo Isobe, Kawasaki (JP); Kazuyoshi Nishi, Fuchu (JP); Yoshimi Saito, Yokohama (JP); Hiroyuki Suzuki, Kawasaki (JP); Yoshinori Masaoka, Yokohama (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 785 days.

(21) Appl. No.: 14/543,553

(22) Filed: Nov. 17, 2014

(65) Prior Publication Data
US 2015/0066964 A1 Mar. 5, 2015

Related U.S. Application Data

(63) Continuation of application No. PCT/JP2012/003586, filed on May 31, 2012.

(51) Int. Cl.
*H03M 5/00* (2006.01)
*H03M 7/00* (2006.01)
(Continued)

(52) U.S. Cl.
CPC ...... *G06F 17/2705* (2013.01); *G06F 17/2288* (2013.01); *G06F 17/246* (2013.01);
(Continued)

(58) Field of Classification Search
CPC ............. G06F 17/2705; G06F 17/2288; G06F 17/30011; G06F 17/30864; G06Q 40/04
(Continued)

(56) References Cited

U.S. PATENT DOCUMENTS 6,263,335 B1 7/2001 Paik et al.
6,823,331 B1* 11/2004 Abu-Hakima .... G06F 17/30707
707/758
(Continued)

FOREIGN PATENT DOCUMENTS

| CN | 101727451 A | 6/2010 |
|---|---|---|
| JP | 09-160915 A | 6/1997 |

(Continued)

OTHER PUBLICATIONS

Combined Office Action and Search Report dated Apr. 20, 2016 in Chinese Patent Application No. 201280002603.4 (with English language translation).
(Continued)

*Primary Examiner* — Cesar Paula
*Assistant Examiner* — Luu-Phuong Nguyen
(74) *Attorney, Agent, or Firm* — Oblon, McClelland, Maier & Neustadt, L.L.P.

(57) ABSTRACT

Provided is a knowledge extracting apparatus for extracting knowledge information related to a knowledge-extraction target from an electronic document distributed continually in a state where the electronic document is not associated with the knowledge-information extraction target. A knowledge extracting apparatus according to one embodiment is a knowledge extracting apparatus including: an information
(Continued)

receiving section for receiving an electronic document; a knowledge extracting section for extracting a concept from the electronic document based on a target word to extract knowledge information and a clue word to extract knowledge information and forming knowledge information in which the concept thus extracted and the target word are associated with each other; a storage section for storing the knowledge information thus extracted; and an information analysis section for, after the knowledge information is stored, analyzing the electronic document based on the knowledge information in the storage section.

12 Claims, 42 Drawing Sheets

(51) Int. Cl.
*G06F 17/27* (2006.01)
*G06Q 40/04* (2012.01)
*G06F 17/22* (2006.01)
*G06F 17/24* (2006.01)
*G06F 17/30* (2006.01)

(52) U.S. Cl.
CPC .. *G06F 17/30011* (2013.01); *G06F 17/30864* (2013.01); *G06Q 40/04* (2013.01); *G06F 17/271* (2013.01); *G06F 17/278* (2013.01); *G06F 17/2785* (2013.01); *G06F 17/30616* (2013.01)

(58) Field of Classification Search
USPC .......................................................... 715/255
See application file for complete search history.

(56) References Cited

U.S. PATENT DOCUMENTS

| | | | | |
|---|---|---|---|---|
| 7,493,252 | B1* | 2/2009 | Nagano | G06F 17/3061 704/1 |
| 2002/0178155 | A1* | 11/2002 | Sakurai | G06F 17/30616 |
| 2003/0217335 | A1* | 11/2003 | Chung | G06F 17/2785 715/206 |
| 2005/0154690 | A1* | 7/2005 | Nitta | G06F 17/2217 706/46 |
| 2006/0080276 | A1* | 4/2006 | Suzuki | G06F 17/241 |
| 2007/0078889 | A1* | 4/2007 | Hoskinson | G06F 17/30705 |
| 2007/0192309 | A1* | 8/2007 | Fischer | G06F 17/30684 |
| 2010/0010968 | A1* | 1/2010 | Redlich | G06F 17/30672 707/E17.014 |
| 2010/0082673 | A1* | 4/2010 | Nakano | G06F 17/3089 707/776 |
| 2010/0145678 | A1* | 6/2010 | Csomai | G06F 17/2755 704/9 |

FOREIGN PATENT DOCUMENTS

| | | |
|---|---|---|
| JP | 11-134410 A | 5/1999 |
| JP | 2002-251590 A | 9/2002 |
| JP | 2003-108785 A | 4/2003 |
| JP | 2003-162639 A | 6/2003 |
| JP | 2004-252971 A | 9/2004 |
| JP | 2005-100221 A | 4/2005 |
| JP | 2011-141833 A | 7/2011 |
| JP | 2012-099001 A | 5/2012 |
| KR | 10-2006-0013537 | 8/2007 |
| WO | WO 2011/004529 A1 | 1/2011 |

OTHER PUBLICATIONS

Extended European Search Report dated Jul. 1, 2016 in Patent Application No. 12877878.4.
Viorel Milea, et al., "An OWL-Based Approach Towards Representing Time in Web Information Systems", Community Research and Development Information Service, http://cordis.europa.eu/pub/ist/docs/kct/towl-paperwism07_en.pdf, XP055264172, Jan. 2007, 12 Pages.
Office Action dated Jun. 17, 2016 in Japanese Patent Application No. 2012-015700 (with English language translation).
International Search Report dated Jul. 24, 2012 for PCT/JP2012/003586 filed May 31, 2012 with English Translation.
International Written Opinion dated Jul. 24, 2012 for PCT/JP2012/003586 filed May 31, 2012.
Hiroyuki Sakai et al., "Estimation of Impact Contained in Articles about each Company in Financial Articles", IPSJ SIG Notes (2006-FI-84), Sep. 13, 2006, vol. 2006, No. 94, pp. 43-50 with English Abstract.
Kazuhiro Kohara et al., "Neutral Multivariate Prediction Using Event-Knowledge and Selectively Intensive Learning", The Transactions of the Institute of Electrical Engineers of Japan C, Jun. 20, 1996, vol. 116-C, No. 7, pp. 802-808 with English Abstract.
Yasunari Nishimura et al., "Research on Knowledge extraction from temporal data and text data base", FIT2005 Dai 4 Kai Forum on Information Technology Ippan Koen Ronbunshu, separate vol. 2, Database Shizen Gengo Jinko Chino. Game Onsei. Ongaku, Setai Joho Kagaku, Aug. 22, 2005, pp. 119-120.
Kenji Nakamura et al., "Kabuka Joho to Shinbun Kiji o Mochiita Kigyo no Hyoban Joho no Chushutsu ni Kansuru Kenkyu", Dai 70 Kai (Heisei 20 Nen) Zenkoku Taikai Koen Ronbunshu (1), Archtecture Software Kagaku. Kogaku Database to Media, Mar. 13, 2008, pp. 1-637 to 1-638.
He Zhang et al., "Kabuka Data ni Motozuku Shinbun Kiji no Hyoka", 2008 Nendo the Japanese Society for Artificial Intelligence Zenkoku Taikai (Dai 22 Kai) Ronbunshu [CD-ROM], 2008, pp. 1-3 (1E2-4) with English Abstract.
Office Action dated Dec. 11, 2015 in Japanese Patent Application No. 2012-015700 (with English language translation).
Office Action dated May 27, 2015 in Singaporean Patent Application No. 11201407958P.

* cited by examiner

111

FIRST CLUE WORD DICTIONARY

| CODE | FIRST CLUE WORD |
|------|-----------------|
| G001 | RELATED ISSUE |
| G002 | SPECIAL PROCUREMENT |
| G003 | RELATED STOCK |
| G004 | EACH COMPANY |
| G005 | STOCK |

FIG. 2

KNOWLEDGE-EXTRACTION TARGET WORD DICTIONARY 112

| SECURITIES CODE | KNOWLEDGE-EXTRACTION TARGET WORD (COMPANY NAME) | INDUSTRIAL CATEGORY 1 ON TOKYO STOCK EXCHANGE (LARGE CLASSIFICATION) | INDUSTRIAL CATEGORY 2 ON TOKYO STOCK EXCHANGE (SMALL CLASSIFICATION) | KNOWLEDGE-EXTRACTION TARGET NAME EXPRESSION (COMPANY NAME EXPRESSION) |
|---|---|---|---|---|
| 1031 | RR BOU | MANUFACTURING INDUSTRY | TEXTILE GOODS | RR BOU |
| 1035 | zz BOU CO., LTD. | MANUFACTURING INDUSTRY | TEXTILE GOODS | zz BOU |
| 1045 | IROHANI PHARMACEUTICAL INDUSTRY CO., LTD. | MANUFACTURING INDUSTRY | MEDICAL PRODUCT | IROHANI |
| 1045 | IROHANI PHARMACEUTICAL INDUSTRY CO., LTD. | MANUFACTURING INDUSTRY | MEDICAL PRODUCT | IROHANI PHARMA |
| 1045 | IROHANI PHARMACEUTICAL INDUSTRY CO., LTD. | MANUFACTURING INDUSTRY | MEDICAL PRODUCT | IROHANI PHARMACEUTICAL |
| 1045 | IROHANI PHARMACEUTICAL INDUSTRY CO., LTD. | MANUFACTURING INDUSTRY | MEDICAL PRODUCT | IROHANI PHARMACEUTICAL INDUSTRY |
| 1042 | ff PHARMACEUTICAL CO., LTD. | MANUFACTURING INDUSTRY | MEDICAL PRODUCT | ff PHARMACEUTICAL |
| 1041 | HOHETO MEDICALS CO., LTD. | MANUFACTURING INDUSTRY | MEDICAL PRODUCT | HOHETO MEDICALS |
| 1033 | yy BOU HOLDINGS CO., LTD. | TRADE | WHOLESALE | yy BO HD |
| 1033 | yy BOU HOLDINGS CO., LTD. | TRADE | WHOLESALE | yy BOU |
| 1033 | yy BOU HOLDINGS CO., LTD. | TRADE | WHOLESALE | yy BOU HD |
| 1033 | yy BOU HOLDINGS CO., LTD. | TRADE | WHOLESALE | yy BOU HOLDINGS |

SECOND CLUE WORD DICTIONARY

| CODE | SECOND CLUE WORD |
|------|------------------|
| t001 | CUE |
| t002 | REGARDED AS CUE |
| t003 | WELCOMED |
| t004 | NEGATIVE REACTION |
| t005 | SELECTED |
| t005 | BUYING LEADS |

FIG. 4

NEWS ID: 1   TIME STAMP: OCTOBER 21, 2010, 11:08
NEWS SOURCE: X NEWS AGENCY
GENRE: ECONOMY
NEWS HEADING: "Group infection of new influenza in student dormitory in A prefecture, related issues remained steady"
NEWS MAIN BODY: Influenza-related issues including RR bou <1031>, yy bo HD <1033>, and Hoheto medicals <1041> are ranked. It seems to be a cue that A prefecture announced that a group infection of new influenza was caused in a student dormitory in X city. As a result of genetic tests of 12 men and women, they were found to be infected by a new influenza type NEWS ID: 2   TIME STAMP: NOVEMBER 6, 2010, 18:13
NEWS SOURCE: S NEWSPAPER COMPANY
GENRE: SOCIETY
NEWS HEADLINE: Group infection of influenza in hospital, six patients died. Hospital in B City of B prefecture
NEWS MAIN BODY: B prefecture announced, on Nov 6, that a group infection of influenza was caused in a hospital in B city, and six men and women between the ages of sixty to ninety in the hospital died from Oct 31 to Nov 5. This is believed to be caused by Hong Kong type A influenza. 33 people including staffs and patients complain their symptoms as of November 5, but they are allegedly not in a serious condition. A man in his 80s died on 6th of this month, but he tested negative for the influenza. The prefecture does not announce the hospital name. According to the prefecture, the hospital reported to M public health center that "49 patients complain influenza-like symptoms" on 2nd of this month, and instructed to isolate people with suspicious of infection. An on-site inspection was allegedly conducted on 4th and 5th of this month. However, a man in his 80s died on 31st of last month, followed by three people including a man in his 90s, a man in his 60s, and a woman in her 70s on Nov 2, a woman in her 80s on Nov 4, and a man in his 80s on Nov 5. They all tested positive for the influenza. The health welfare division of the prefecture said, "we gave instructions to the hospital through the public health center, and the hospital followed the instructions. We found no fault in particular."

NEWS ID: 3    TIME STAMP: JANUARY 1, 2011, 9:24
NEWS SOURCE: M NEWS AGENCY
GENRE: MARKET
NEWS HEADLINE: Rebound of Nikkei average, increase in U.S. stock prices and steady yen exchange rate = Market opening on 17th
NEWS MAIN BODY: Nikkei Stock Average was rebounded and opened on Jan 17 at 10,562.09 yen, increased 63.05 yen from the previous week, and struggled to find a direction with high prices. In response to the increase in U.S. stock prices and steady yen exchange rate late last week, buying leads. The stock average comes close to 10,575 yen (75 yen high from the closing price at Osakashi Securities Exchange) of a yen-denominated liquidation value in Chicago futures exchange. In terms of the industrial category, petroleum-related stocks, such as XXX Seki <1001>, and Petroleum W <1022> which was reported that its consolidated pretax profit was a little over 200 billion yen for April to December of 2010, rise. Buying of stocks of trading companies such as HH trading <1080> also leads. Share prices of non-ferrous metal such as SS Minerals <1050> are also high. Fiber stocks such as Fiber JJ <1030> are also bought. Bank stocks such as HH Bank <1082> are also rising. High technology stocks including High-tech BB <1060> and QQ Memory <1063> to which D securities raised its investment decision are also selected.

FIG. 6

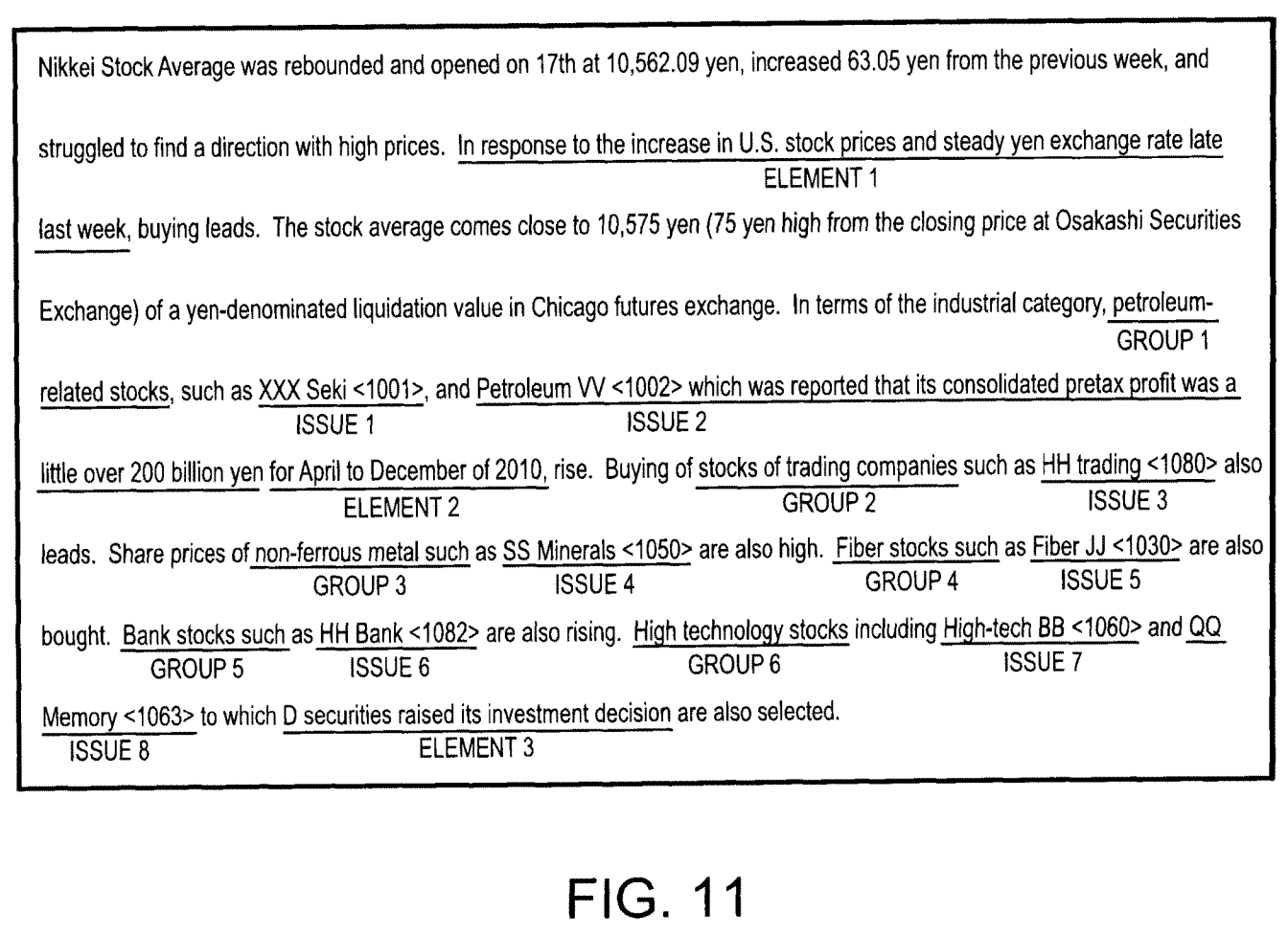

Nikkei Stock Average was rebounded and opened on 17th at 10,562.09 yen, increased 63.05 yen from the previous week, and struggled to find a direction with high prices. In response to the increase in U.S. stock prices and steady yen exchange rate late
<u>                                                                                         ELEMENT 1                                                                                        </u>
last week, buying leads. The stock average comes close to 10,575 yen (75 yen high from the closing price at Osakashi Securities Exchange) of a yen-denominated liquidation value in Chicago futures exchange. In terms of the industrial category, <u>petroleum-</u>
<u>                                                                                                                                                                                   GROUP 1</u>
<u>related stocks, such as XXX Seki <1001>, and Petroleum VV <1002></u> which was reported that its consolidated pretax profit was a
<u>                          ISSUE 1                                                     ISSUE 2                                                                                              </u>
little over 200 billion yen for April to December of 2010, rise. <u>Buying of stocks of trading companies such as HH trading <1080></u> also
<u>                                      ELEMENT 2                                                                  GROUP 2                                                           ISSUE 3</u>
leads. <u>Share prices of non-ferrous metal such as SS Minerals <1050></u> are also high. <u>Fiber stocks such as Fiber JJ <1030></u> are also
<u>                                GROUP 3                          ISSUE 4                                                       GROUP 4                      ISSUE 5                        </u>
bought. <u>Bank stocks such as HH Bank <1082></u> are also rising. <u>High technology stocks including High-tech BB <1060> and QQ</u>
<u>              GROUP 5                 ISSUE 6                                                     GROUP 6                                                       ISSUE 7                     </u>
<u>Memory <1063></u> to which D securities raised its investment decision are also selected.
<u>  ISSUE 8                      ELEMENT 3                                                                                                                                                   </u>

FIG. 11

KNOWLEDGE INFORMATION

| KNOWLEDGE NO. | FIRST CONCEPTUAL NAME | KNOWLEDGE-EXTRACTION TARGET WORD (ISSUE) | SECOND CONCEPT (SHARE-PRICE-FLUCTUATION ELEMENT) |
|---|---|---|---|
| 1 | INFLUENZA | 1033 : yy BOU HOLDINGS CO., LTD.  1031 : RR BOU CO., LTD.  1041 : HOHETO MEDICALS CO., LTD. | GROUP INFECTION |
| 2 | PETROLEUM | 1001 : XXX SEKI CO., LTD.  1002 : PETROLEUM VV HOLDINGS CO., LTD. | CONSOLIDATED PRETAX PROFIT WAS A LITTLE OVER 200 BILLION YEN |
| 3 | TRADING COMPANY | 1080 : HH TRADING CO., LTD. | |
| 4 | NON-FERROUS METAL | 1050 : SS MINERALS CO., LTD. | |
| 5 | FIBER | 1030 : FIBER JJ CO., LTD. | |
| 6 | BANK | 1082 : HH BANK FINANCIAL GROUP CO., LTD. | |
| 7 | HIGH TECHNOLOGY | 1060 : HIGH-TECHNIQUE BB CO., LTD.  1063 : QQ MEMORY | RAISED ITS INVESTMENT DECISION |

SECOND CLUE WORD DICTIONARY

| CODE | SECOND CLUE WORD | DIRECTION | INTENSITY |
|---|---|---|---|
| t001 | CUE | | |
| t002 | REGARDED AS CUE | | |
| t003 | WELCOMED | POSITIVE | 2 |
| t004 | NEGATIVE REACTION | NEGATIVE | 2 |
| t005 | SELECTED | | |
| t006 | BUYING LEADS | POSITIVE | 1 |

FIG. 16

| NEWS ID: 4 | TIME STAMP: NOVEMBER 17, 2011, 9:45 |
|---|---|

NEWS SOURCE: X NEWS AGENCY
GENRE: JAPANESE STOCKS
NEWS HEADING: Sharp decline in Chirinuruwo = negative reaction to downward revision in earnings
NEWS MAIN BODY : The share price of Chirinuruwo <1123> listed on TSE Mothers is sharply declined to 73,000 yen, down 6,400 yen from the previous business day.

| NEWS ID: 5 | TIME STAMP: JANUARY 28, 2011, 20:04 |
|---|---|

NEWS SOURCE: S NEWSPAPER COMPANY
GENRE: GENERAL ECONOMY
NEWS HEADLINE: AA iron cutting its profit forecast to reflect rising raw material costs and delayed price passthrough
NEWS MAIN BODY : AA iron manufacture <1152> revised its consolidated ordinary income forecast for March of 2011 to 220 billion yen, down 12% from 250 billion yen of initial forecast, on Jan 28, to reflect rising raw material costs, burden of additional costs under the influence of the deluge in country $\beta$, and delayed price passthrough of steel products. The president of the company, D-Yama E-O, said in the financial results briefing that raw material costs which have begun to rise from about November continues to rise further under the influence of the deluge in country $\beta$, and the profit for January to March would be markedly decreased as compared with the profit for October to December. The company estimation shows the ordinary profit for January to March would be 31,700 million yen, down approximately 40% from the ordinary profit for October to December. This is largely affected by a decrease in ordinary profit in the iron industry, which is the main business, to 13,900 million yen, down approximately 70% from that for October to December. Regarding the price of steel products, the president said, "the price enters an upward phase, but there is only few gains for us by March," indicating that no prospect of improvement in sales price for this fiscal year is also a reason for the downward revision in earnings.

FIG. 17

| KNOWLEDGE NO. | FIRST CONCEPT | KNOWLEDGE-EXTRACTION TARGET WORD | SHARE-PRICE-FLUCTUATION ELEMENT | DIRECTION | INTENSITY |
|---|---|---|---|---|---|
| 10 | | 1123 : CHIRINURUWO | DOWNWARD REVISION IN EARNINGS | NEGATIVE | 2 |

FIG. 18

KNOWLEDGE INFORMATION

| TARGET (FIRST CONCEPT) | SECOND CONCEPT | TIME STAMP | SIMILARITY INFORMATION NUMBER |
|---|---|---|---|
| INFLUENZA | GROUP OF NEW INFLUENZA IN A STUDY DORMITORY IN A PREFECTURE | OCTOBER 21, 2010, 11:08 | 30 |
| INFLUENZA | GROUP INFECTION OF INFLUENZA WAS CAUSED IN A HOSPITAL IN B CITY AND ... IN THE HOSPITAL ... FROM OCT 31 TO NOV 5 ... | NOVEMBER 6, 2010, 18:13 | 50 |

FIG. 20

| FIRST CONCEPT | LOW-ORDER GROUP NAME | KNOWLEDGE-EXTRACTION TARGET (ISSUE) | CERTAINTY FACTOR | BUSINESS ENTRY TIMING | BUSINESS CLOSURE TIMING | CERTAINTY FACTOR UPDATING HISTORY 1 | CERTAINTY FACTOR UPDATING HISTORY 2 | FIRST CLUE WORD |
|---|---|---|---|---|---|---|---|---|
| INFLUENZA | MASK | yy BOU HOLDINGS <1033> | 1.3 | | | JANUARY 4, 2009 +0.1 | DECEMBER X, 2008 +0.1 | SPECIAL PROCUREMENT |
| INFLUENZA | MASK | zz BOU<1035> | 1.1 | | | JANUARY 4, 2009 +0.1 | | RELATED STOCK |
| INFLUENZA | DISINFECTANT/ SANITIZATION AGENT | HOHETO MEDICALS<1041> | 0.6 | | MARCH 31, 2011 | JANUARY 4, 2009 -0.1 | | EACH COMPANY |
| INFLUENZA | INFLUENZA MEDICINE | ff PHARMACEUTICAL<1042> | 1 | OCTOBER 19, 2007 | | SEPTEMBER 10, 2008 +1 | | RELATED |
| MULTIPLE DRUG RESISTANT BACTERIA | DISINFECTANT/ SANITIZATION AGENT | HOHETO MEDICALS<1041> | 1.2 | | | SEPTEMBER X, 2008 +0.1 | | ISSUE |

FIG. 22

| | |
|---|---|
| 1 | IN CASE JUDGMENT IN STEP S55 IS YES AND TURNOVER CHANGE RATE ≤ 1.1 IS SATISFIED, ADD 0.05 TO CERTAINTY FACTOR |
| 2 | IN CASE WHERE JUDGMENT IN STEP S55 IS YES AND TURNOVER CHANGE RATE > 1.1 IS SATISFIED, ADD (TURNOVER CHANGE RATE - 1.0) x 0.5 TO CERTAINTY FACTOR |
| 3 | IN CASE WHERE JUDGMENT IN STEP S56 IS YES AND TURNOVER CHANGE RATE > 1.1 IS SATISFIED, REDUCE (NEWS CHANGE RATE - TURNOVER CHANGE RATE) x 0.5 FROM CERTAINTY FACTOR |
| 4 | IN CASE WHERE JUDGMENT IN STEP S56 IS YES AND TURNOVER CHANGE RATE < 1.0 IS SATISFIED, ADD (NEWS CHANGE RATE - TURNOVER CHANGE RATE) x 0.5 TO CERTAINTY FACTOR |

| CORRELATION COEFFICIENT | | TARGET NEWS | |
|---|---|---|---|
| EVALUATION PERIOD | ONLY ISSUE NAME | ISSUE NAME OR GROUP NAME (WITHOUT CERTAINTY FACTOR) | ISSUE NAME OR GROUP NAME (WITH CERTAINTY FACTOR CORRECTION) |
| 2010/8/31-2011/3/10 | 0.024 | 0.011 | 0.364 |

FIG. 30

The government allegedly decided to push forward the private diversion of Self-Defense Force airplanes, and defense-related issues such as aa heavy industries <7191>, bb heavy industries <7192>, and cc industry <7193> are firm.

Defense-related issues are selectively bought due to growing tension on the Korean Peninsula.

FIG. 31

| KNOWLEDGE NO. | GROUP NAME | RELATED TERM |
|---|---|---|
| 10 | DEFENSE | SELF-DEFENSE, GROWING TENSION |

112 — KNOWLEDGE-EXTRACTION TARGET WORD DICTIONARY

| CODE | KNOWLEDGE-EXTRACTION TARGET WORD | PROGRAM NAME | KNOWLEDGE-EXTRACTION TARGET WORD EXPRESSION |
|---|---|---|---|
| A001 | ACTRESS P | | ACTRESS P, P, p, M |
| A002 | ACTOR Q | | ACTOR Q, Q, q |
| A003 | COAT OF OFFICIAL TITLE M | DRAMA A | COAT OF M |
| A004 | LINES OF OFFICIAL TITLE M | DRAMA A | LINES OF M |
| B001 | OFFICIAL TITLE M | DRAMA A | m |
| B001 | OFFICIAL TITLE M | DRAMA A | Mr. m |

113a

SECOND CLUE WORD DICTIONARY

| CODE | SECOND CLUE WORD | DIRECTION | INTENSITY |
|---|---|---|---|
| t001 | (;＿;) | WEEP | 1 |
| t002 | (T＿T) | WEEP | 2 |
| t003 | (ToT) | WEEP | 2 |
| t004 | ( * ＿ * ) | SURPRISE | 1 |
| t005 | ( □ ) | SURPRISE | 1 |
| t006 | (°□°) | SURPRISE | 1 |
| t007 | (°Д°) | SURPRISE | 1 |
| t008 | (^＿^;) | IMPATIENCE | 1 |
| t009 | ( □ ;) | IMPATIENCE | 1 |
| t010 | (°Д°;) | IMPATIENCE | 2 |
| t011 | (^＿^) | LAUGH | 1 |
| t012 | (^∇^) | LAUGH | 2 |
| t013 | (^o^) | LAUGH | 2 |
| t014 | (^O^) | LAUGH | 2 |
| t015 | ( ω ) | LAUGH | 1 |
| t016 | (´∀`) | LAUGH | 1 |
| t017 | (・∀・) | LAUGH | 1 |
| t018 | ww | LAUGH | 1 |
| t019 | www | LAUGH | 2 |
| t020 | wwww | LAUGH | 3 |
| t021 | (`Д´) | ANGER | 1 |
| t022 | (`^´) | ANGER | 1 |

FIG. 37

| ARTICLE ID | TIME STAMP | USER | BACKGROUND INFORMATION | MAIN BODY |
|---|---|---|---|---|
| 1 | 2011/11/28 20:19 | aaa | | Q's performance is too stink for a serious scene LOLww #drama B |
| 2 | 2011/11/28 22:11 | bbb | | m is too amazing LOLwww #drama A |
| 3 | 2011/11/28 22:12 | ccc | | m is just too good at everything LOLww #drama A |
| 4 | 2011/11/28 22:12 | ddd | | m is just too good at everything LOLww #drama A |
| 5 | 2011/11/28 22:12 | eee | ccc | m is too terrific LOLwww #drama A |
| 6 | 2011/11/28 22:20 | fff | | m is too good at playing volleyball. LOL. It's been a while since I played volleyball. |
| 7 | 2011/11/28 22:22 | ggg | | m is awesome ww #drama A |
| 8 | 2011/11/28 22:34 | hhh | | m is awesome(;_;) #drama A |

| TARGET | KNOWLEDGE INFORMATION | | |
|---|---|---|---|
| | EVENT | TIME STAMP | SIMILARITY INFORMATION |
| OFFICIAL TITLE V | GOOD AT EVERYTHING | 2011/11/28 22:12 | 30 |
| OFFICIAL TITLE V | VOLLEYBALL | 2011/11/28 22:20 | 10 |

| FIRST CLUE WORD | SECOND CLUE WORD | KNOWLEDGE-EXTRACTION TARGET WORD | CERTAINTY FACTOR | CERTAINTY FACTOR UPDATING HISTORY | CERTAINTY FACTOR UPDATING HISTORY |
|---|---|---|---|---|---|
| DRAMA A | LOL | OFFICIAL TITLE M | 0.3 | NOVEMBER 28, 2011 -0.1 | |
| DRAMA B | LOL | ACTOR Q | 1.5 | NOVEMBER 28, 2012 +0.2 | |

FIG. 42

FORMING KNOWLEDGE INFORMATION BASED ON A PREDETERMINED THRESHOLD OF A CONCEPT AND A PREDETERMINED THRESHOLD OF A TARGET WORD EXTRACTED FROM A DOCUMENT

CROSS-REFERENCE TO RELATED APPLICATIONS

This application is a continuation application of PCT application Serial No. PCT/JP2012/003586, filed on May 31, 2012, the entire contents of which are incorporated herein by reference.

FIELD

Embodiments of the present invention relate to a knowledge extracting apparatus, a knowledge update apparatus, and a non-transitory computer readable medium.

BACKGROUND

In order to effectively utilize a large quantity of data provided on the Internet or the like, there is such a technique to provide knowledge information by selecting information associated with information that a user requires from a large quantity of data by use of thesauruses which define synonyms about a certain concept or a relation between concepts, or by combining pieces of selected information.

For example, in stock transactions, it is effective to quickly obtain knowledge information which becomes a cue to stock fluctuations to make a judgment and reflect the judgment on contents of transactions. For example, in a case where new influenza breaks out of season, it is easily expected that demand for manufacturers of masks used for infection prevention and manufacturers of disinfectant increases, and stock prices of these manufacturers increase. It is effective for a user who makes a stock transaction to estimate an issue of which the demand increases, from information of "spread of influenza out of season" and to reflect the estimation on transactions.

In view of this, conventionally, there have been such a technique to provide news together with securities information and a technique to extract related news according to a search request from a user and to provide the related news as knowledge information.

Examples of the above technique may be a technique (a first technique) to display a share price chart and related news on the same screen and a technique (a second technique) to store, as a related issue, an issue of which a share price fluctuates in a similar manner to a targeted issue in the same period among related issues (issues set in advance, for example, competitors, clients, main banks, companies with capital ties, and the like) to the targeted issue.

Further, there are such a technique to perform triggered by a user request, keyword extraction and issue association for search of a targeted issue according to clue words such as " . . . related stock," " . . . special procurement," and the like among pieces of news stored in a storage device, and to show a result to the user, and a technique (a third technique) to manage and update a dependency of words based on a certainty factor according to the number of appearances in syntax analysis results occurring a plurality of times, in a field of a general thesaurus construction or the like. There is also such a technique (a fourth technique) that related terms collocating with a company name are obtained from a document group and stored in a table a, a degree of how much the collocation pair affects a share price fluctuation is stored in a prediction coefficient table, an evaluation value of the related terms and a prediction coefficient are managed and updated independently, and a share price estimation is performed.

However, the first technique to display a share price chart and news on the same screen to a user has such a problem that target word phrases (hereinafter referred to as knowledge extraction target words) to extract knowledge information such as an issue should be associated with the news in advance.

Further, the second technique to store, as a related issue, an issue of which a share price fluctuates in a similar manner to a targeted issue in the same period has such a problem that an issue which does not fluctuate in a similar manner to the targeted issue is not associated therewith. In addition, since issues having an explicit association with the targeted issue, e.g., in the same line of business as the targeted issue, are set in advance, a range for grouping issues is limited.

The third technique performs keyword extraction and issue association based on news stored in the storage device, but its utilization method and update method are not disclosed.

Further, the third technique evaluates a certainty factor of the dependency of words and updates the certainty factor based on a new corpus to be obtained afterward, but its information source is the same (similar information).

The fourth technique obtains and manages related terms to a company name and also manages and updates influences to its share price fluctuation, but a target to be updated due to the share price fluctuation is only a prediction coefficient.

BRIEF DESCRIPTION OF THE DRAWINGS

FIG. 2 is a view illustrating an example of a first clue word dictionary in the first embodiment.

FIG. 3 is a view illustrating an example of a knowledge-extraction target word dictionary in the first embodiment.

FIG. 4 is a view illustrating an example of a second clue word dictionary in the first embodiment.

FIG. 5 is a view illustrating an example of an electronic document in the first embodiment.

FIG. 6 is a view illustrating an example of an electronic document in the first embodiment.

FIG. 11 is a view illustrating one example of an extraction result of group names which are a first conceptual name from an analysis-target electronic document in the first embodiment, issues, and transaction elements.

FIG. 12 is a view illustrating one example of knowledge information in the first embodiment.

FIG. 16 is a view illustrating an example of a second clue word dictionary in a second embodiment.

FIG. 17 is a view illustrating an example of an electronic document in the second embodiment.

FIG. 18 is a view illustrating an example of knowledge information in the second embodiment.

FIG. 20 is a view illustrating one example of the process result of the knowledge extracting section in the third embodiment.

FIG. 22 is a view illustrating one example of knowledge information in the fourth embodiment.

FIG. 27 is a view illustrating one example of certainty factor update rules of the knowledge evaluation update apparatus in the fourth embodiment.

FIG. 30 is a view illustrating one example of an effect of the certainty factor update of the knowledge evaluation update apparatus in the fourth embodiment.

FIG. 31 is a view illustrating an example of analysis-target news information in a fifth embodiment.

FIG. 32 is a view illustrating an example of related-term information in the fifth embodiment.

FIG. 36 is a schematic view illustrating an example of a knowledge-extraction target word dictionary of the knowledge extracting apparatus in the sixth embodiment.

FIG. 37 is a schematic view illustrating an example of a second clue word dictionary of the knowledge extracting apparatus in the sixth embodiment.

FIG. 38 is a schematic view illustrating an example of electronic documents of the knowledge extracting apparatus in the sixth embodiment.

FIG. 41 is a schematic view illustrating one example of a process result of the knowledge extracting section in the sixth embodiment.

FIG. 42 is a schematic view illustrating one example of a process result of a knowledge evaluation update apparatus in the sixth embodiment.

DETAILED DESCRIPTION

An object of the present invention is to provide a knowledge extracting apparatus, a knowledge update apparatus, and a non-transitory computer readable medium each for extracting knowledge information related to a knowledge-extraction target word from an electronic document distributed continually in a state where the electronic document is not associated with a knowledge-information extraction target.

A knowledge extracting apparatus according to one embodiment is a knowledge extracting apparatus for extracting knowledge information from an electronic document, and includes: an information receiving section for receiving the electronic document; a knowledge extracting section for extracting a concept from the electronic document based on a target word to extract the knowledge information and a clue word to extract the knowledge information and forming knowledge information in which the concept thus extracted and the target word are associated with each other; a storage section for storing the knowledge information thus extracted; and an information analysis section for, after the knowledge information is stored, analyzing the electronic document based on the knowledge information stored in the storage section.

The following describes a knowledge extracting apparatus in each embodiment with reference to drawings.

Note that each of the following apparatuses is implementable by either a hardware configuration or a combination of a hardware resource and software. As the software in the combinatory configuration, a program which is installed in a computer of a corresponding apparatus in advance via a network or a storage medium and realizes a function of the corresponding apparatus is used.

First Embodiment

Figure 1:
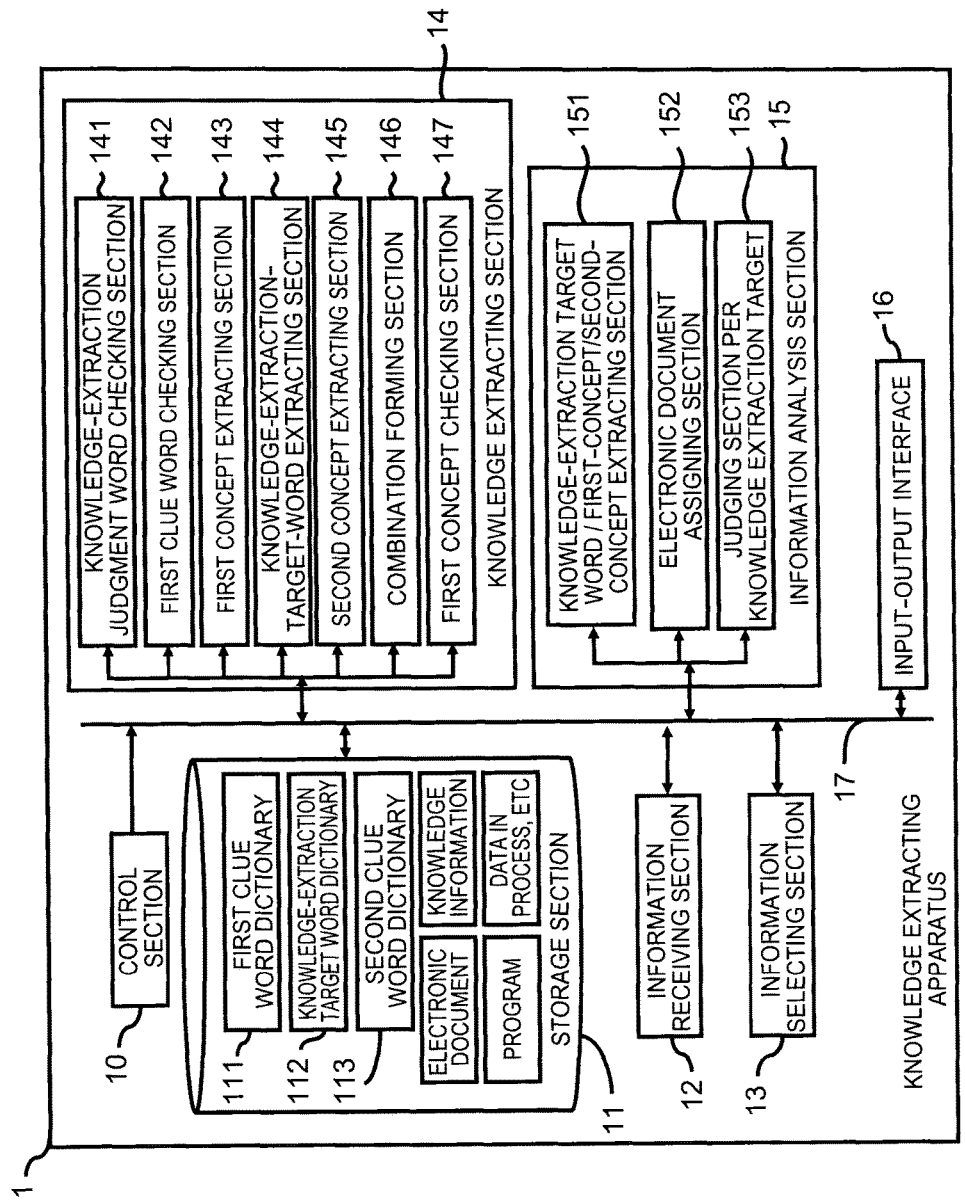
FIG. 1 is a view illustrating an exemplary configuration of a knowledge extracting apparatus in a first embodiment.

FIG. 1 is a block diagram illustrating an exemplary configuration of a knowledge extracting apparatus according to a first embodiment. The knowledge extracting apparatus 1 of the present embodiment is usable to provide information obtained during securities market hours to a user who makes a stock transaction and a system (including a system to which a combined event processing engine, CEP, and the like are incorporated) such as an algorithmic trade engine which makes a judgment on a stock transaction. The knowledge extracting apparatus 1 extracts, for example, knowledge information related to stock transactions from an electronic document such as news information distributed on the Internet. The knowledge information obtained as a result of the extraction is usable to provide information and the like.

More specifically, when this knowledge extracting apparatus 1 receives economic news out of pieces of news information, the knowledge extracting apparatus 1 obtains, for example, knowledge on an issue grouping associated with a key word "influenza" and knowledge of "bird flu" and "group infection" which will be a share-price-fluctuation element of "influenza" related issues, and retains these pieces of knowledge as knowledge information. Further, when the knowledge extracting apparatus 1 receives internet distribution news including economic news or business information, the knowledge extracting apparatus 1 refers to the knowledge information thus retained and gives, to news information, a group such as "influenza," issues belonging to the group, and information on whether there is any share-price-fluctuation element for the group, so that the knowledge extracting apparatus 1 is able to provide the news information to a system such as an algorithmic trade engine or a user terminal device of a user who makes a stock transaction. That is, the knowledge extracting apparatus 1 extracts knowledge information including a concept (a first concept) which is information to make grouping of knowledge-extraction target words such as an issue and information (a second concept) to be associated with the first concept.

For example, in a case where knowledge information related to stock transactions is extracted, a clue word (a first clue word) which allows an industry (e.g., finance, metal, advertisement, and the like) to which an issue of a stock belongs to be regarded as the first concept is stored in the knowledge extracting apparatus 1. The first clue word will be described later. The second concept is a concept different from the first concept and is extracted based on a second clue word, which will be described below.

Further, the knowledge extracting apparatus 1 may be referred to as a knowledge extracting apparatus 1.

More specifically, the knowledge extracting apparatus 1 includes a control section 10 for managing control on the overall system, a storage section 11, an information receiving section 12, an information selecting section 13, a knowledge extracting section 14, an information analysis section 15, and an input-output interface 16, and the sections 11 to 16 are connected to each other through a bus 17.

The storage section 11 is constituted by, for example, hardware such as a hard disk drive and a nonvolatile memory device. The storage section 11 stores a program to be executed by the control section 10, and in addition, retains knowledge information extracted in the knowledge extracting section 14, an electronic document received and analyzed, and the like. Also, the storage section 11 retains a first clue word dictionary 111, a knowledge-extraction target word dictionary 112, a second clue word dictionary 113, and data and the like in process, which will be described later.

As illustrated in an example in FIG. 2, the first clue word dictionary ill is configured such that a code for identifying a first clue word and the first clue word to be a clue to a first concept for grouping knowledge-information extraction targets are described in association with each other. That is, a first conceptual name (a group name) is added to an electronic document in the present embodiment based on the first clue words stored in advance. The first clue word dictionary of the present embodiment may be referred to as a group definition word dictionary 111.

As illustrated in an example in FIG. 3, the knowledge-extraction target word dictionary 112 is configured such that a securities code for identifying an issue which is a target word (a knowledge-extraction target word) to extract knowledge information from an electronic document in the present embodiment, a company name of the issue, an industrial category 1 on Tokyo Stock Exchange indicative of a large classification of an industrial category of the issue, an industrial category 2 on Tokyo Stock Exchange indicative of a small classification in the industrial category 1 on Tokyo Stock Exchange, and a company name expression indicative of the company name of the issue are described in association with each other. As the company name expression, various names such as an official name, an abbreviated name, a popular name, a common name, and a nickname of the company are usable. Note that the company name expression is not limited to a name, but a securities code of each company may be used. That is, the knowledge-extraction target word dictionary may be referred to as an issue dictionary 112 in the present embodiment.

As illustrated in an example in FIG. 4, the second clue word dictionary 113 is configured such that a code for identifying a second clue word (an element expression clue word) and a clue word corresponding to an expression of a knowledge-extraction judgment word, which will be described later, are described in association with each other. That is, the second clue word dictionary 113 may be referred to as an element expression clue word dictionary 113.

The information receiving section 12 receives news information distributed on the Internet. FIGS. 5 and 6 are examples of the news information distributed on the Internet. The reception of news information may be performed in a form where news information is distributed based on a contract with a distribution supplier or in a form where news information newly distributed is found and obtained by an Internet search program generally called a search robot or crawler. In the present embodiment, among components of news information to be distributed on the Internet, five items including a "time stamp," a "news source," a "genre," a "news headline," and a "news main body" as illustrated in FIGS. 5 and 6, and a "news ID" given by the information receiving section 12 are used. The "time stamp" is distribution time-of-day information given to the news information thus distributed. The "news source" is a name of a business operator which provides the information. The "genre" is tag information indicative of a genre (field) such as "economy," "society," and "sports" given to the news information. The "genre" may not to be given at the time of news reception. The "news headline" is a Japanese text string of a headline part of the news information thus distributed, and the "news main body" is a Japanese text string of a main text part except the headline of the news information thus distributed.

The information selecting section 13 selects economic news (news information including economic terms) from news information received by the information receiving section 12. A judgment on whether the news is economic news or not is made such that in a case where a "genre" is given to received news information, for example, it is judged whether or not the "genre" is an expression including any term of economic terms and its synonyms such as "economy" and "market condition." In a case where any "genre" is not given to the received news information, for example, it is judged whether or not a news headline or a news main body thereof includes economic terms, particularly, terms related to stock transactions such as "Tokyo Stock Exchange," "Osaka Stock Exchange," "Nikkei Stock Average," "share price," "stock market," "high price," "closing price," and "turnover." That is, the information selecting section 13 selects an electronic document highly related to the knowledge-extraction target word.

The knowledge extracting section 14 extracts knowledge information from the news information selected by the information input section 13. For example, the knowledge extracting section 14 extracts, by use of the dictionaries 111 to 113 in the storage section 11, first conceptual names for grouping issues which are knowledge extraction targets, issues belonging to groups, and element expressions to be factors to share price fluctuations from the economic news which is a knowledge-information extraction target, and writes them into the storage section 11 as knowledge information on an issue grouping and elements (events) by means of a knowledge-extraction judgment word checking section 141, a first clue word checking section 142, a first concept extracting section 143, a knowledge-extraction-target-word extracting section 144, a second concept extracting section 145, a combination forming section 146, and a first concept checking section 147, which will be described later. Here, the knowledge information to be used may be, for example, information including a first conceptual name, an issue, and a share-price-fluctuation element, or information including first information including a first conceptual name and an issue and second information including a share-price-fluctuation element. However, the knowledge information is not limited to these combinations. Note that the knowledge extracting section 14 is able to extract knowledge information not from information selected by the information selecting section 13, but from an electric document stored in the storage section 11.

Note that the knowledge extracting section 14 may extract knowledge information not only by a method using these sections 141 to 147 and the dictionaries 111 to 113, but also by a method in which issues are grouped by use of syntax analysis, semantic analysis, and context analysis, for example. In the latter method, it is possible to extract knowledge information even from news information such as "company XX is ranked due to spread of influenza," which does not include any group definition words illustrated in FIG. 2.

After the knowledge information is stored in the storage section 11, the information analysis section 15 analyzes all pieces of news information received (newly) by the information receiving section 12, based on the knowledge information stored in the storage section 11, and includes, for example, a knowledge-extraction target word/first-concept/second-concept extracting section 151, an electronic document assigning section 152, and a judging section 153 per knowledge extraction target. Further, in a case where newly received news information includes information corresponding to knowledge information of grouping or an elements (an event), the information analysis section 15 may add the knowledge information to the news information. The information analysis section 15 may further classify pieces of news information processed during a certain period of time, including the newly received news information, into groups or issues and perform statistical processing on each of the groups or issues, so as to add statistical information.

After a series of processes are finished, an output of the information analysis section 15 is shown on a user terminal device by the input-output interface 16 as an analysis result of the news information.

The input-output interface 16 is connectable to an external memory device (not illustrated) through a cable assembly, and inputs or outputs knowledge information to be stored in the storage section 11 and data of an analysis result storing database (not illustrated) to/from this external memory device.

Figure 7:
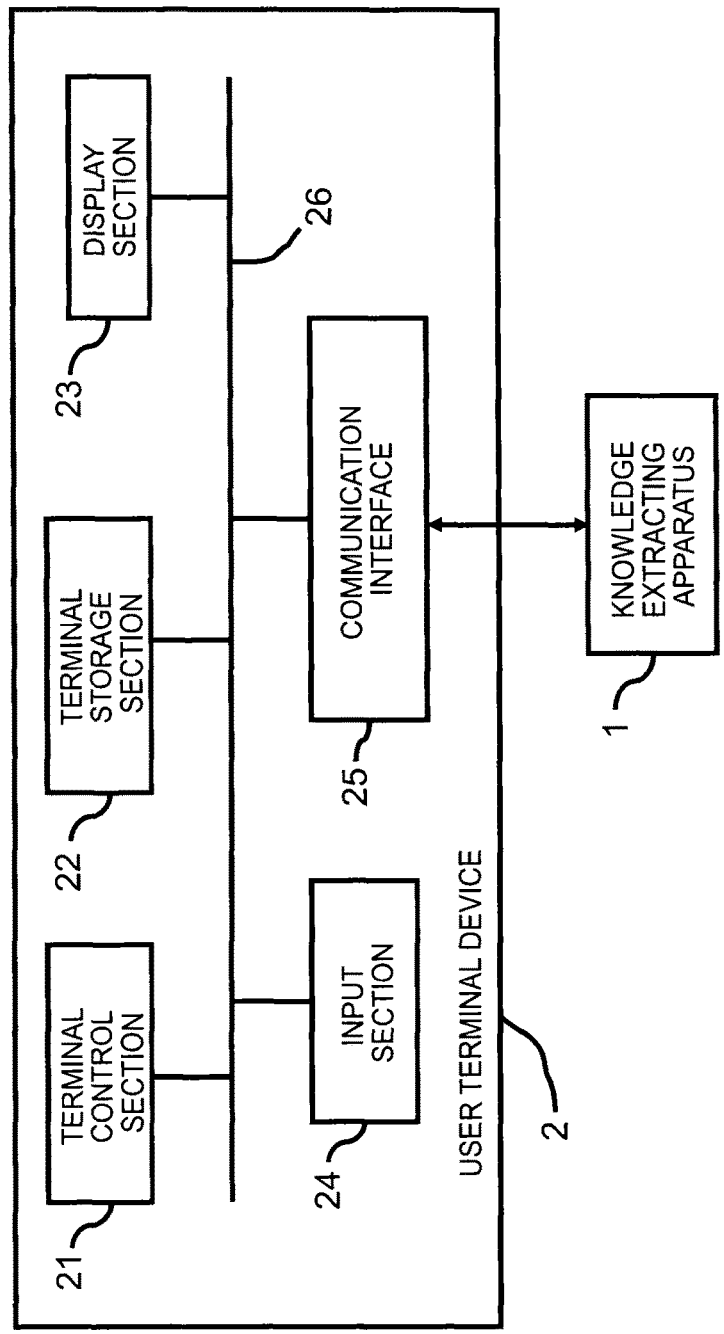
FIG. 7 is a view illustrating an exemplary configuration of a user terminal apparatus according to the first embodiment.

FIG. 7 is a block diagram illustrating an exemplary configuration of the user terminal device connected to the knowledge extracting apparatus 1 as described above. The user terminal device 2 is a terminal device handled by a user who uses the knowledge extracting apparatus 1. The user terminal device 2 includes a terminal control section 21 for controlling overall processes of the device, a terminal storage section 22, a display section 23, an input section 24, and a communication interface 25, which are connected to each other through a bus 26.

The terminal storage section 22 is a storage device constituted by, for example, hardware such as a hard disk drive or a nonvolatile memory device. The terminal storage section 22 stores a program for control. Further, the terminal storage section 22 functions as a work memory of various processes by the terminal control section 21.

The display section 23 is, for example, a liquid crystal display, and outputs an output of the information analysis section 15 to the user. For example, the display section 23 shows to the user a distribution time (time stamp) of news information received newly, a news source, a company name/first conceptual name picked up as a topic in the news information, transaction elements (treasury stock acquisition, worsening business conditions, a group infection of influenza, and the like) included in the news information in a tabular format.

The input section 24 is, for example, a keyboard and a mouse, and receives operations for knowledge extraction, information analysis, and system setting.

The communication interface 25 is connected to the knowledge extracting apparatus 1 through a cable assembly, and exchanges conditions specified by the user in the user terminal device 2, process results of the knowledge extracting apparatus 1, and the like. Further, the communication interface 25 is connectable to an external memory device through a cable assembly and is able to input and output knowledge information on an issue grouping and elements (events) to be stored in the storage section 11 and analysis results to/from this external memory device.

Figure 8:
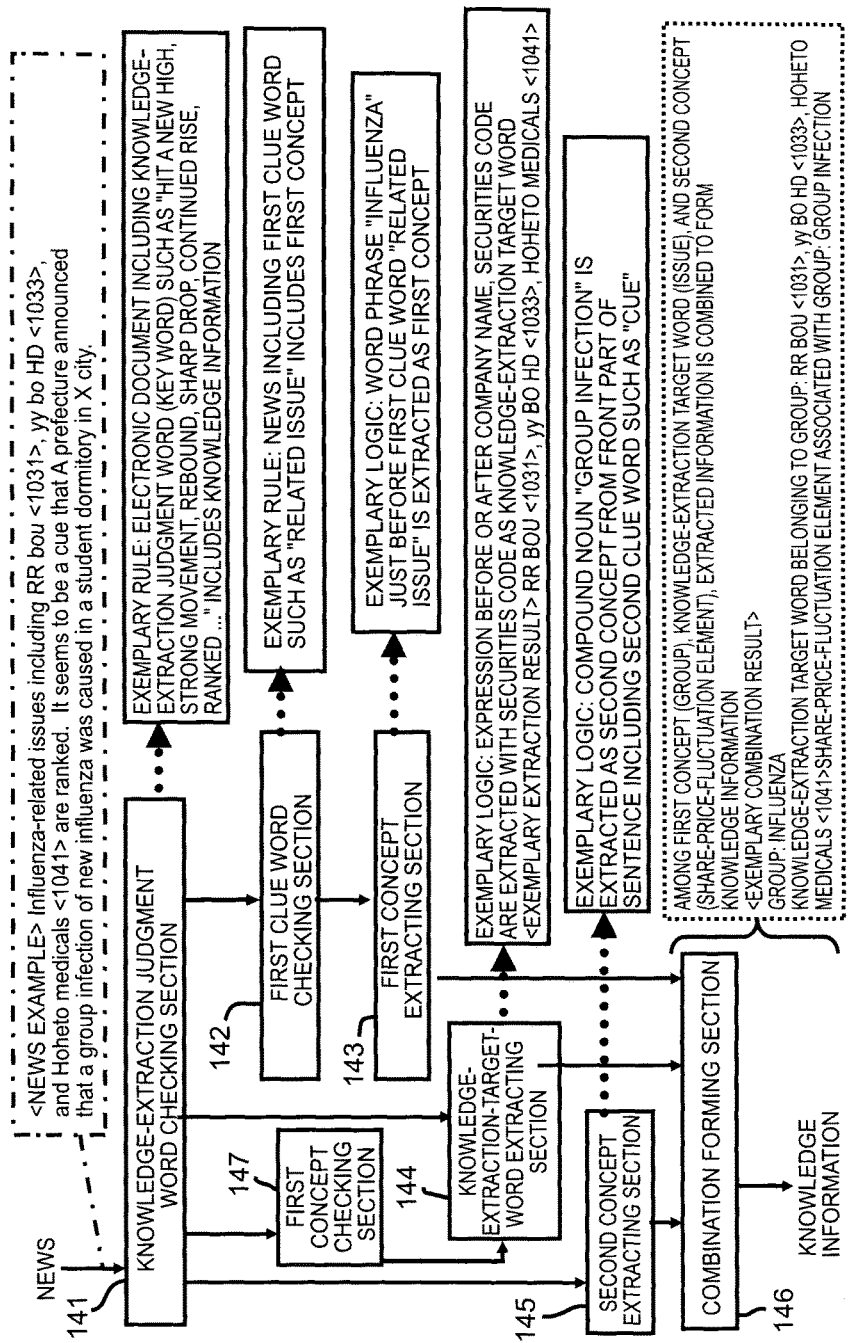
FIG. 8 is a view illustrating details of a process operation of a knowledge extracting section in the first embodiment.
Figure 9:
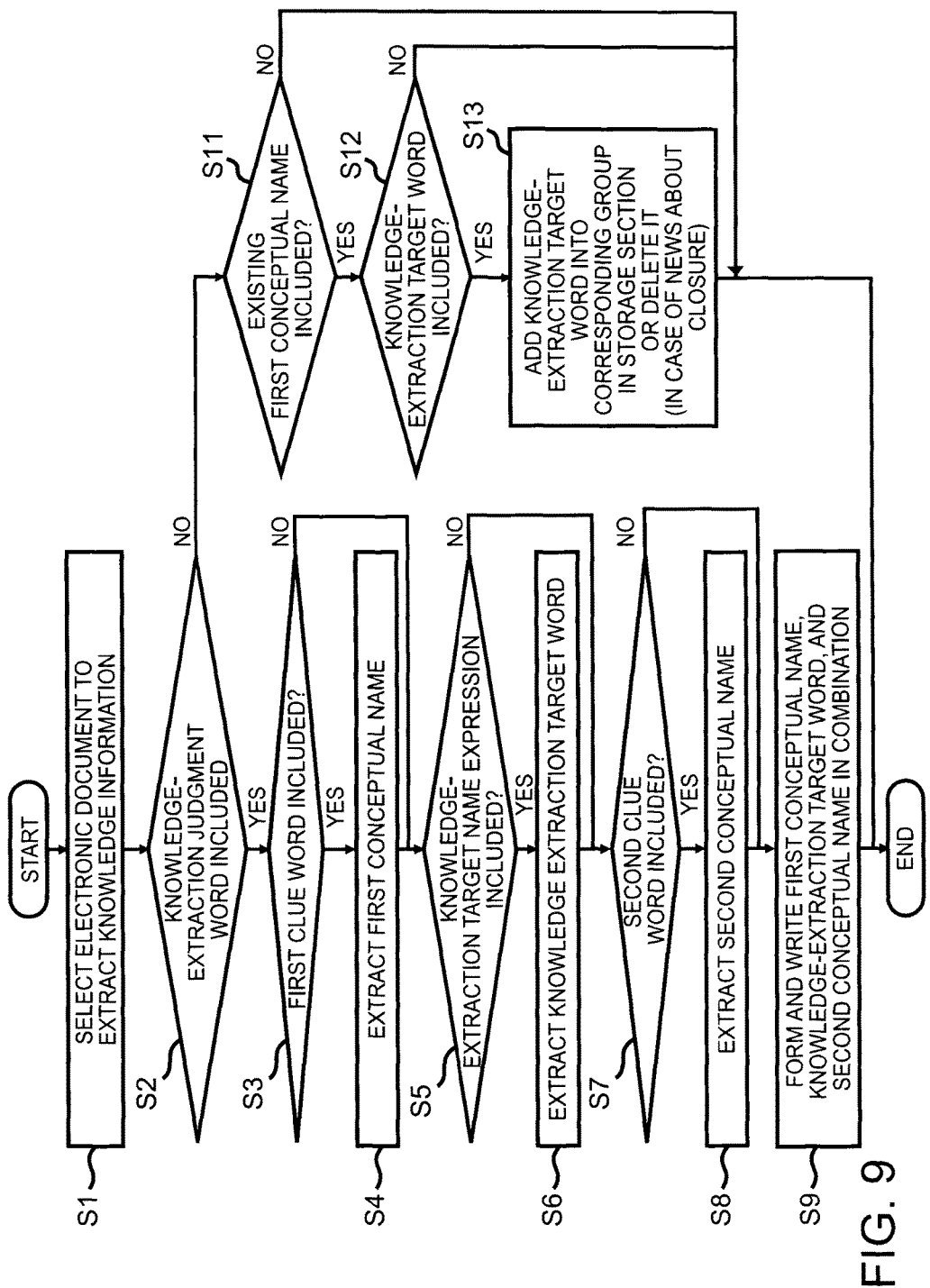
FIG. 9 is a flowchart to describe one example of the process operation of the knowledge extracting section in the first embodiment.

Next will be described an operation of the knowledge extracting apparatus 1 thus configured. FIG. 8 is a schematic view illustrating details of a process operation of the knowledge extracting section 14, and FIG. 9 is a flowchart to describe one example of the process operation of the knowledge extracting section.

Note that in the following description, a process of the knowledge extracting section 14 is performed every time news information is received, but this process may be performed collectively on pieces of news information that have been received already, during times such as nighttime when an information analysis process is not performed.

The information receiving section 12 receives new news information by distribution from a news distribution site or by accessing to a news distribution site. For example, among pieces of news information in FIGS. 5 and 6, news information corresponding to a news ID "1" illustrated in FIG. 5 is received.

The information selecting section 13 selects economy news as an electronic document from which knowledge information is extracted, from pieces of news information which are electronic documents received by the information receiving section 12 (step S1). A judgment on whether the news is economic news or not is made such that in a case where a "genre" is given to received news information, for example, it is judged whether the "genre" is an expression including any of economic terms and its synonyms such as "economy" and "market condition."

In a case where any "genre" is not given to the received news information, for example, it is judged whether or not a news headline or a news main body thereof includes economic terms, particularly, terms related to stock transactions, such as "Tokyo Stock Exchange," "Osaka Stock Exchange," "Nikkei Stock Average," "share price," "stock market," "high price," "closing price," and "turnover." Selected news information is sent to the knowledge extracting section 14 from the information selecting section 13.

In the knowledge extracting section 14, the knowledge-extraction judgment word checking section 141 judges whether or not the news information selected by the information selecting section 13 includes a knowledge-extraction judgment word to judge whether or not the news information thus selected is a possible electronic document from which knowledge information may be extracted (step S2).

In the present embodiment, the knowledge-extraction judgment word is a share-price-fluctuation evaluation word to evaluate share price fluctuations. That is, the knowledge-extraction judgment word checking section 141 may be referred to as a share-price-fluctuation evaluation word checking section 141 in the present embodiment.

For example, the knowledge-extraction judgment word checking section 141 judges whether or not any share-price-fluctuation evaluation word such as "hit a new high," "strong movement," "rebound," "sharp drop," "continued rise," and "ranked" is included in a news headline or a news main body of received news information.

When the news information includes a share-price-fluctuation evaluation word, the knowledge extracting section 14 judges that the news information is news information including knowledge information, and transmits the news information to the first clue word checking section 142.

Note that if the "share-price-fluctuation evaluation word" has a content to evaluate a fluctuation of a share price, the "share-price-fluctuation evaluation word" may be also expressed in other words such as a "share-price-fluctuation representing word," a "share-price-fluctuation word," or a "share-price-fluctuation definition word."

As a result of the judgment in step S2, when the news information includes the share-price-fluctuation evaluation word, the first clue word checking section 142 judges whether or not the news information includes any first clue word (a group definition word) that defines a first conceptual name of an issue (step S3). That is, the first clue word checking section 142 of the present embodiment may be referred to as a group definition word checking section 142.

For example, the first clue word checking section 142 refers to the first clue word dictionary 111, and judges whether or not a news headline or a news main body of the received news information includes at least one of the group definition words. For example, the news of the news ID "1" illustrated in FIG. 5 includes a group definition word "related issues."

In a case where the received news information does not include any group definition word, a process of step S4 in the first concept extracting section 143 is omitted.

In a case where the received news information includes a group definition word, the first clue word checking section 142 transmits the news information to the first concept extracting section 143.

When the news information includes a group definition word as a result of the judgment in step S3, the first concept extracting section 143 extracts a first conceptual name from the news information based on the group definition word (step S4).

For example, when the first concept extracting section 143 receives news information including a group definition word, the first concept extracting section 143 extracts a noun just before the group definition word as the first conceptual name. In a case where the received news information is the news of the news ID "1" as illustrated in FIG. 5, for example, the first concept extracting section 143 extracts a noun "influenza" just before a group definition word "related issue," as the first conceptual name.

The first conceptual name is assumed a noun, but not only a word such as "influenza," but a compound noun such as "new influenza" and "seasonal influenza" may be also regarded as an extraction target. Further, in a case where a group definition word is included but a word just before the group definition word is not a noun, it is judged that no first conceptual name is included.

As a result of the judgment in step S2 by the knowledge-extraction judgment word checking section 141, when the news information includes a share-price-fluctuation evaluation word, the knowledge-extraction-target-word extracting section 144 extracts an issue including a company name and a securities code from the news information.

More specifically, after step S3 or S4, for example, in regard to news information transmitted without the process of the first concept extracting section 143, the knowledge-extraction-target-word extracting section 144 refers to the knowledge-extraction target word dictionary 112 and judges whether or not a knowledge-extraction target name expression is included in a news headline or a news main body of the news information (step S5), and when the knowledge-extraction target name expression is included, the knowledge-extraction-target-word extracting section 144 extracts an issue which is a knowledge-extraction target word corresponding to the knowledge-extraction target name expression (step S6). That is, the knowledge-extraction-target-word extracting section 144 of the present embodiment may be referred to as an issue extracting section 144.

In a case where the news headline or the news main body includes an expression in a column of the "knowledge-extraction target name expression" in the knowledge-extraction target word dictionary 112, it is judged that an issue which is a knowledge-extraction target word written in a "securities code" or a "company name" in a corresponding row is included.

The knowledge-extraction target word dictionary 112 may include definitions of a plurality of rows with respect to a single securities code. Further, a plurality of knowledge-extraction target name expressions may be extracted from a single piece of news information.

In a case of the news of the news ID "1" as illustrated in FIG. 5, knowledge-extraction target name expressions "RR bou," "yy bou HD," and "Hoheto medicals" are included. Accordingly, issues "securities code: 1031, company name: RR bou Co., Ltd.," "securities code: 1033, company name: yy bou Holdings Co., Ltd.," and "securities code: 1041, company name: Hoheto medicals Co., Ltd." are extracted.

In the knowledge-extraction target word dictionary 112, a knowledge-extraction target name expression is a company name or an abbreviated name of the company name, but a securities code of each company may be also taken as an example of the knowledge-extraction target name expression. The knowledge-extraction target name expression in the knowledge-extraction target word dictionary 112 of the present embodiment may be referred to as a company name expression.

Figure 10:
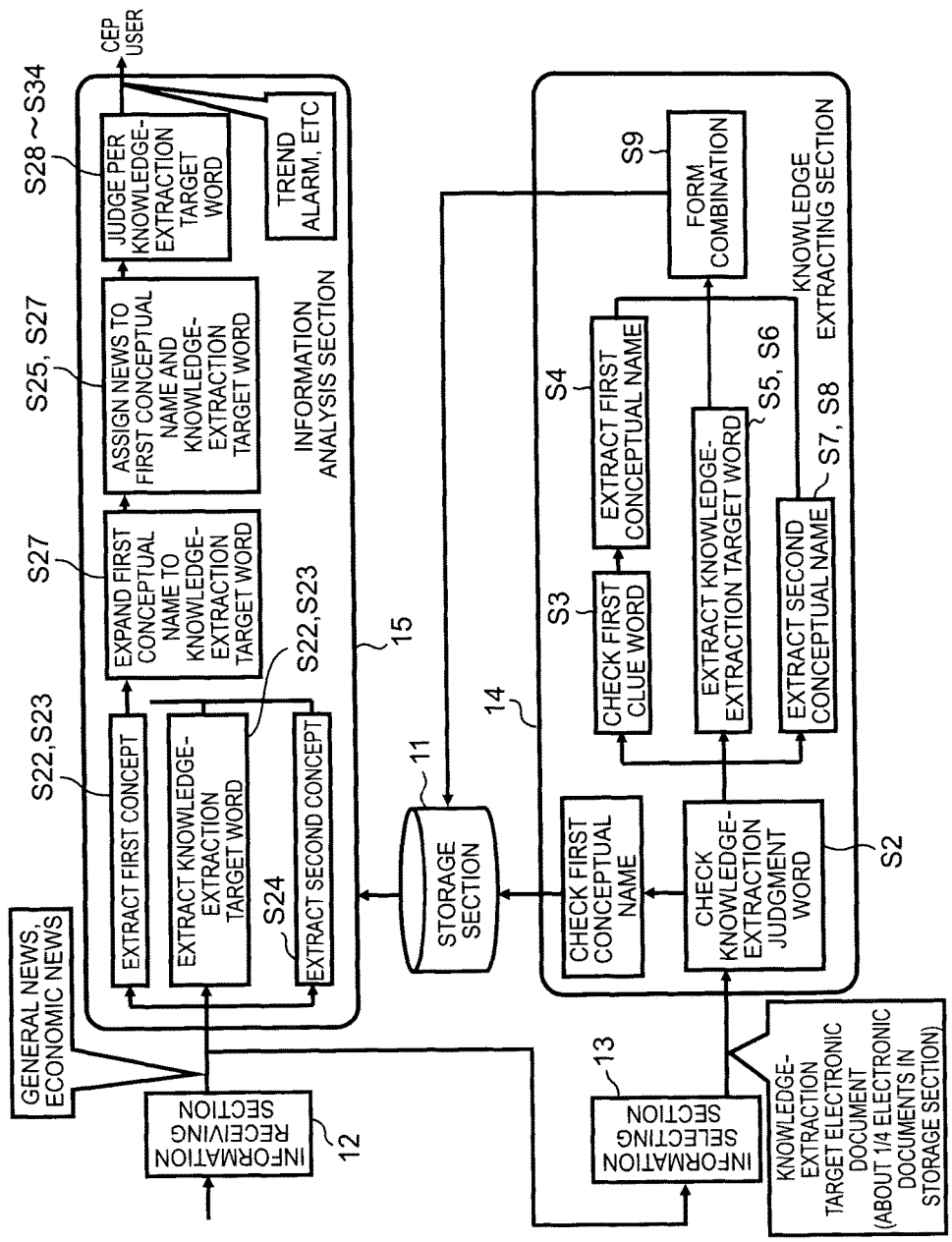
FIG. 10 is a view illustrating an outline of an order of the process operation in the first embodiment.

Note that, as illustrated in FIG. 10, the knowledge-extraction-target-word extracting section 144 may just extract an issue in the case where the share-price-fluctuation evaluation word is included as a result of step S2. In view of this, the knowledge-extraction-target-word extracting section 144 is able to extract an issue not only after step S3 or S4, but also at any point after step S2 but before step S9.

As a result of the judgment by the knowledge-extraction judgment word checking section 141, when the news information includes a share-price-fluctuation evaluation word, which is a knowledge-extraction judgment word, the second concept extracting section 145 extracts a share-price-fluctuation element from the news information as a second concept. More specifically, the second concept extracting section 145 judges whether or not at least one second clue word in the second clue word dictionary 113 is included in a news headline or a news main body of the news information including the share-price-fluctuation evaluation word (step S7).

The processes of step S7 and step S8 are performed after step S6 in the flowchart of FIG. 9, but may be performed before the process of step S3 or in parallel with the processes from step S3 to step S6.

In a case where a second clue word in the second clue word dictionary 113 is included in the news headline or news main body of the received news information, the second concept extracting section 145 extracts a noun phrase relating to the second clue word as a second conceptual name (step S8). The second conceptual name may be referred to as a share-price-fluctuation element expression in the present embodiment. That is, the second concept extracting section 145 may be an element extracting section 145 in the present embodiment.

For example, in the news main body of the news ID "1" illustrated in FIG. 5, the second sentence, "it seems to be a cue that A prefecture announced that a group infection of new influenza was caused in a student dormitory in X city," includes a second clue word "cue."

A noun phrase relating to the second clue word "cue" is "that . . . announced that a group infection of new influenza was caused." This noun phrase "that . . . announced that a group infection of new influenza was caused" is extracted as a share-price-fluctuation element (event) expression.

The share-price-fluctuation element (event) expression may be a phrase "a group infection of new influenza was caused" or "a group infection of new influenza" obtained by analyzing the noun phrase thus extracted, as an extraction target.

Alternatively, the term "new influenza" including the first conceptual name "influenza" extracted in step S6 or step S7 and its attached words may be deleted and the term "group infection" may be taken as an extraction target.

Further, the following assumes a case where the news main body is constituted by two sentences as follows: "A prefecture announced that a group infection of new influenza was caused in a student dormitory in X city. This seems to be a cue." In this case, after a pronoun "this," which relates to the clue word "cue," is extracted, context analysis is performed to replace "this" with its previous sentence "A prefecture announced that a group infection of new influenza was caused in a student dormitory in X city," and from the phrase "A prefecture announced that a group infection of new influenza was caused in a student dormitory in X city" after the replacement or from its analysis result, "group infection of new influenza was caused," "group infection of new influenza," or "group infection" may be taken as an extraction target.

After the processes from step S3 to step S8 have been finished, the combination forming section 146 combines the first conceptual name extracted from the news information in process, the issues which are the knowledge-extraction target words, and the share-price-fluctuation element (the second conceptual name or event), so as to form knowledge information, and writes the knowledge information into the storage section (step S9).

In a case where a single first conceptual name is extracted from the news information, all extracted issues (knowledge-extraction target words) and all extracted share-price-fluctuation elements (second conceptual names) are assigned to the first conceptual name. That is, one or more issues as knowledge-extraction target words and one or more share-price-fluctuation elements as second concepts are allowed to be assigned to a single first conceptual name.

In a case where analysis-target news information is one with a news ID "3" in FIG. 6, six first conceptual names, eight issues, and three share-price-fluctuation elements are extracted from a news main body thereof as illustrated in FIG. 11.

In a case where there are a plurality of first conceptual names extracted as such, a first conceptual name, an issue relating to the first conceptual name, and a share-price-fluctuation element relating to the first conceptual name or the issue relating to the first conceptual name may be combined by use of advanced natural language processing such as context analysis.

Further, in a simpler manner, the news main body may be marked off per sentence, and a first conceptual name, an issue, and a share-price-fluctuation element may be combined per sentence. Alternatively, sentences are taken out from the news main body one by one, and when a first conceptual name and an issue are both found, the first conceptual name, the issue, and a share-price-fluctuation element which are extracted by then may be output in combination, and from its subsequent sentence, a first conceptual name, an issue, and a share-price-fluctuation element may be newly combined. As the knowledge information, the issue and the share-price-fluctuation element are assumed to be assigned to the first conceptual name, but a combination without the issue or the share-price-fluctuation element may be formed.

By such a process, in the present embodiment, the following six sets are extracted as the knowledge information which is a set of a first conceptual name, an issue (company name expression), and a share-price-fluctuation element.

(1) First conceptual name: Petroleum, Issue: XXX Seki <1001>, Petroleum VV <1002>

Element: reported that its consolidated pretax profit was a little over 200 billion yen for April to December of 2010.

(2) First conceptual name: Trading company, Issue: HH Trading <1080>.

(3) First conceptual name: Nonferrous metal, Issue: SS Minerals <1050>.

(4) First conceptual name: Fiber, Issue: Fiber JJ <1030>.

(5) First conceptual name: Banking corporation, Issue: HH Bank <1082>.

(6) First conceptual name: High-technology, Issue: High-tech BB <1060>, QQ Memory <1063>, Element: D securities raised its investment decision.

The combination is assumed a set of the first conceptual name, the issue, and the share-price-fluctuation element. However, the combination may be assumed a set of only the first conceptual name and the issue, and the share-price-fluctuation element may be retained independently as knowledge information. Alternatively, the share-price-fluctuation element may be retained not with the first conceptual name but with the issue as knowledge information.

After the process of the combination forming section 146, the knowledge information thus extracted as illustrated in an example in FIG. 12 is written into the storage section 11

(step S9). Note that, as illustrated in FIG. 12, examples of the first concept in the present embodiment encompass "influenza," "petroleum," "trading company," "nonferrous metal," "fiber," "metal," "high-technology," and the like.

In regard to economic news which is judged in step S2 not to include any share-price-fluctuation evaluation word, the first concept checking section 147 judges whether or not a news headline or a news main body thereof includes any first conceptual name (any existing first conceptual name) of knowledge information which has been written in the storage section 11 (step S11). In the present embodiment, since the first conceptual name is a group name, the first concept checking section 147 may be referred to as a group name checking section.

In a case where an existing first conceptual name is included, the knowledge-extraction-target-word extracting section 144 judges whether or not the news headline and the news main body include any knowledge-extraction target name expression by use of the knowledge-extraction target word dictionary 112 (step S12).

In a case where a knowledge-extraction target name expression is included, when there is such an expression as "entry" or "new business," the combination forming section 146 forms a combination for a process of adding an issue corresponding to the extracted knowledge-extraction target name expression to an existing group.

When there is such an expression as "closure," the combination forming section 146 forms a combination for a process of removing an issue corresponding to the knowledge-extraction target name expression thus extracted for an existing first conceptual name (step S13).

When the combination of the existing first concept and the adding or removing process of the issue is formed in step S13, the process is performed on the storage section 11 (step S9).

Figure 13:
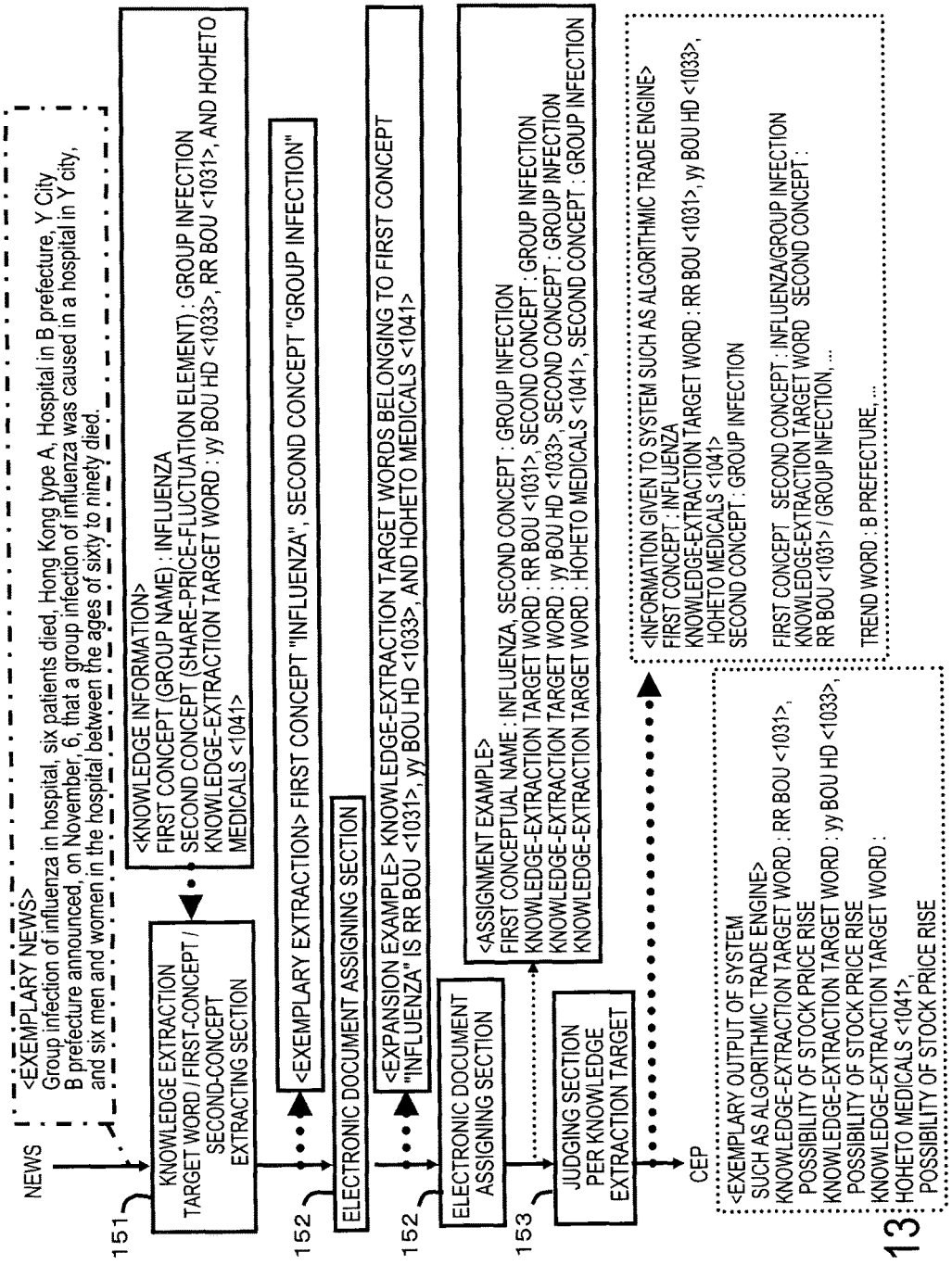
FIG. 13 is a view illustrating details of a process operation of an information analysis section in the first embodiment.

Next will be described an operation of the information analysis section 15 with reference to FIGS. 13, 14, and 15.

At first, the information receiving section 12 receives new news information by distribution from a news distribution site or by accessing to a news distribution site. For example, the information receiving section 12 receives news information corresponding to a news ID "2" in FIG. 5 (step S21). The news information thus received is transmitted to the knowledge-extraction target word/first-concept/second-concept extracting section 151.

Initially, the knowledge-extraction target word/first-concept/second-concept extracting section 151 refers to the knowledge-extraction target word dictionary 112 stored in the storage section 11, and judges whether or not a news headline or a news main body of the news information thus received includes a knowledge-extraction target name expression (step S22).

In a case where a knowledge-extraction target name expression is included, the knowledge-extraction target word/first-concept/second-concept extracting section 151 extracts a company name/securities code corresponding to the knowledge-extraction target name expression thus extracted. Further, the knowledge-extraction target word/first-concept/second-concept extracting section 151 refers to the knowledge information illustrated in FIG. 12, and extracts all first conceptual names to which the company name/securities code is assigned (step S23). The knowledge-extraction target word/first-concept/second-concept extracting section 151 and the electronic document assigning section (a news assigning section) 152 perform, per company name extracted from the news headline and the news main body, processes of step S24/step S25 on each group to which the company belongs.

Initially, the knowledge-extraction target word/first-concept/second-concept extracting section 151 refers to the knowledge information illustrated in FIG. 12, extracts a second concept (a share-price-fluctuation element) assigned to a first conceptual name to which the company name/company in process at that point belongs, and judges whether or not the share-price-fluctuation element (expression) is included in the news headline/news main body (step S24).

In a case where the share-price-fluctuation element (expression) is included, it is judged that the received news information in process includes information related to the group, and the electronic document assigning section 152 assigns the news information in process to a company associated with the first conceptual name in the knowledge information illustrated in FIG. 12 (step S25).

After, before, or in parallel with the processes from step S22 to step S25, the knowledge-extraction target word/first-concept/second-concept extracting section 151 judges whether or not the news headline or the news main body of the received news information includes any first conceptual name illustrated in FIG. 12 (step S26).

For example, the news information of the news ID "2" illustrated in FIG. 6 includes a first conceptual name "influenza" in its main body.

In a case where a first conceptual name is included, the knowledge-extraction target word/first-concept/second-concept extracting section 151 extracts the first conceptual name from the main body or the knowledge information, and sends it to the electronic document assigning section 152.

In a case where the first conceptual name is extracted, the electronic document assigning section 152 takes out issues which are knowledge-extraction target words associated with the first conceptual name in the knowledge information illustrated in FIG. 12, and assigns the electronic document in process to all the knowledge-extraction target words (step S27).

The judging section 153 per knowledge extraction target performs processes from step S28 to step S34 described below on each of the knowledge-extraction target words to which the news information is assigned in the processes to step S27.

In step S28, by referring to an extraction result of the second concept, that is, the share-price-fluctuation element (expression) in step S24, it is judged whether or not a second concept specific to a first concept to which an issue currently in process as the knowledge-extraction target word belongs is extracted.

In regard to the knowledge-extraction target word in process, in a case where the second concept is extracted in association with the first concept to which the knowledge-extraction target word belongs, it is judged that information related to the knowledge-extraction target word may fluctuate, and a set of the knowledge-extraction target word and the second conceptual name is added to an alarm (step S29).

More specifically, in regard to the issue in process, when a share-price-fluctuation element associated with a group to which the issue belongs is extracted, it is judged that a share price of the issue may fluctuate, and a set of the issue and the share-price-fluctuation element is added to a share-price-fluctuation element alarm.

In a case where the knowledge information stored in the storage section 11 is divided into a "first conceptual name/knowledge-extraction target word" and a second conceptual name, it is judged, in step S28, whether or not all second concepts stored in the storage section 11 are extracted regardless of whether the knowledge-extraction target word in process belongs to the group or not.

In this case, a set of the issue as the knowledge-extraction target word and the share-price-fluctuation element as the second concept extracted in step S28 is added to a second concept alarm in step S29.

After the news information is assigned to the issue as the knowledge-extraction target word, news headlines/news main bodies assigned to the issue in process and stored in the storage section 11 for a given period of time in the past, for example, three days are referred to, so as to judge whether or not there is any trend word (step S30), and when a trend word is included in any news information about the issue, a set of the issue and the trend word is added to a trend alarm (step S31).

The trend word is a word shown in search sites in recent years, and a technique to judge novelty or trend of an appearing word has been well known.

Further, similarly, news headlines/news main bodies of pieces of news information assigned to the issue in process and stored in the storage section 11 for a given period of time, for example, for one hour in the past are referred to, so as to judge whether or not received news information in process is similar to or identical with any of the pieces of news information thus stored for the given period of time in the past (step S32), and in a case where there is similar news information or identical news information, a similarity between the pieces of news information in pairs is found, and a multiple-distribution alarm is added (step S33).

The second concept alarm, the trend alarm, and the multiple-distribution alarm output in the above processes are output from the information analysis section 15 and provided to a system such as an algorithmic trade engine or a user terminal device 2 for making a stock transaction (step S34).

In a case where its destination is the system such as an algorithmic trade engine, the system such as an algorithmic trade engine receives, as input information, a current share price, an order state, and the like of the issue in addition to the news information provided from the knowledge extracting apparatus 1 and information assigned to the news information, and exhibits, to a user, transaction strategies which should be taken at present through the user terminal device 2 for making a stock transaction.

As described above, according to the present embodiment, with such a configuration that news information including economic terms is selected from pieces of received news information, knowledge information is extracted from the news information thus selected, and the knowledge information extracted is stored, knowledge information on an issue grouping and a share-price-fluctuation element is extracted at any given time from news information continually distributed in a state where the news information is not associated with any issues. This allows the knowledge information to be brought up-to-date.

Further, with such a configuration that, when news information including a share-price-fluctuation evaluation word includes a group definition word that defines a first conceptual name of an issue, the first conceptual name is extracted from the news information based on the group definition word, an issue including a company name and a securities code is extracted from the news information including the share-price-fluctuation evaluation word, a share-price-fluctuation element is extracted from the news information including the share-price-fluctuation evaluation word, the first conceptual name, the issue, and the share-price-fluctuation element thus extracted are combined to form knowledge information, and the knowledge information thus formed is written into the storage section 11, knowledge information on a grouping that is not a fixed industrial category used in securities markets is usable, thereby making it possible to support a share price fluctuation forecast effectively.

Further, with such a configuration that after the knowledge information is stored, all pieces of news information received newly are analyzed based on the knowledge information in the storage section 11, a result of the analysis is immediately provided to a system such as an algorithmic trade engine or a user who makes a stock transaction, thereby making it possible to support a most recent stock transaction effectively.

Further, in a case where its destination is the system such as an algorithmic trade engine, it is possible to make a judgment based on a wealth of information in comparison with a case where only numerical information such as a current share price and an order state is referred to.

Further, the present embodiment and each of the following embodiments do not limit their target to internet distribution news. For example, other information (blog, miniblog, microblog, company announcement information) distributed on the Internet or an electronic document existing outside the Internet can be assumed as a target. Further, a combination of a plurality of types of information such as news information and a blog can be also assumed as a target.

Note that the judgment on similar news information or identical news information in step S32 may be performed by use of, for example, processes [1] to [3] described in the specification of a prior application (Japanese Patent Application No. 2010-247518) of the present application, which prior application was not published at the time of filing of the present application. In the following processes [1] to [3], the word "title" may be read as "news main body." Further, the word "news information with ID" may be read as "news information." Moreover, a subject of the processes [1] to [3] is rewritten to the "judging section 153 per knowledge extraction target" in accordance with step S32 described earlier.

[1] The storage section 11 stores a word analysis dictionary, sameness criteria, and so on in advance.

The sameness criteria show criteria to judge whether or not any two pieces of news information among pieces of transmitted news information are identical with each other, and includes the following criteria: news source names included in the two pieces of news information are identical with each other; a distribution time difference indicative of a difference in distribution time-of-day between the two pieces of news information is smaller than a standard value (a maximum distribution time difference); a similarity calculated from morphological analysis results of two titles of the two pieces of news information is higher than a prescribed value; and the similarity is calculated after significant figures of the numerical information are rounded to the same digit.

Note that the similarity is, for example, a ratio of the number of independent words and pieces of numerical information included in both of the morphological analysis results of the two titles, with respect to a total sum of respective numbers of independent words included in the respective morphological analysis results of the two titles and respective numbers of pieces of numerical information included therein. Further, a prescribed value of the similarity (not less than 0 but not more than 1) is preferably a high value such as about 0.9. Moreover, instead of the criterion "a similarity calculated from morphological analysis results of two titles is higher than a prescribed value," the sameness criteria may include such a criterion that "independent words extracted from respective morphological analysis results of two titles are identical with each other." Further, the sameness criteria may be read as sameness judgment rules.

[2] The judging section 153 per knowledge extraction target performs a word analysis process of news information with ID by use of a word analysis dictionary in the storage section 11. One example of the word analysis process to be used here is a morphological analysis technique (a well-known technique). In other words, the judging section 153 per knowledge extraction target has a morphological analysis function to perform morphological analysis on a title included in news information with ID in the storage section 11, add an obtained morphological analysis result to a news ID and a tile of the news information with ID, and write obtained analysis result information into the storage section 11.

Note that the following describes the morphological analysis technique as one example, but the process in the judging section 153 per knowledge extraction target may be performed such that words are separated by use of an analyzing process different from the morphological analysis such as N gram without the use of the word analysis dictionary. That is, in the present embodiment, news information is divided into words by a technique that is not limited to the morphological analysis, and a similarity is judged by comparing the words.

However, in a case of N gram which assumes characters as a unit, assignment of word class and judgment on whether or not a word is an independent word cannot be performed. Accordingly, when a word analyzing process is performed by the other means of the morphological analysis, a "word" rather than an "independent word" can be a processing target.

[3] The judging section 153 per knowledge extraction target judges whether or not latest news information with ID in the storage section 11 is the same news as news information with ID having been written in the storage section 11 previously, based on whether or not the sameness criteria in the storage section 11 is satisfied.

For example, the judging section 153 per knowledge extraction target calculates a similarity indicative of a ratio of how much independent words and numerical information extracted from a morphological analysis result of a title of the latest news information with ID are identical with independent words and numerical information extracted from a morphological analysis result of a title of the news information with ID having been written previously. Note that, before calculating the similarity, significant figures of respective pieces of numerical information are rounded to the same digit. In a case where this similarity is higher than the prescribed value (e.g., 0.9), if these pieces of news information with ID have the same news source name and further a difference between distribution times of the respective pieces of news is within a standard value (e.g., five minutes), a sameness judging section 15 judges that these pieces of news are the same news. Note that checking of the similarity being high, checking of the news source names being the same, and checking of the different between distribution times is executable in any given order. Further, instead of checking that the similarity is high, it may be also possible to check that independent words are perfectly matched.

Subsequently, the following describes the sameness judging process [3] by taking, as an example, news information of a news ID "38" and news information of a news ID "3" which is a target for the sameness judgment.

From a morphological analysis result of latest pieces of news information with ID including the news ID "38," one type of numerical information, "15.8% drop," and seven independent words, "U.S. <noun—proper noun—country>," "commodity sales <noun—general>," "company A <noun—proper noun—organization>," "January <noun—possibly adverb>," "recall <noun—"sahen setsuzoku" (i.e. sa-column irregular connection)>," "problem <noun—"nai" adjective stem>," and "sound <verb—independent>" are extracted.

From a morphological analysis result of previous pieces of news information with ID including the news ID "3" as a target for the sameness judgment, one type of numerical information, "15% drop <numerical information>," and four independent words, "Company A <noun—proper noun—organization>," "January <noun—possibly adverb>," "U.S. <noun—proper noun—country>," and "commodity sales <noun—general>" are extracted.

Here, respective pieces of numerical information of the news ID "38" and the news ID "3" are "15.8% drop" and "15% drop," and thus their values are not identical.

In terms of the independent words, the number of independent words extracted from the two morphological analysis results is seven in total, whereas the number of independent words extracted from both of the two morphological analysis results is four.

In this case, based on a fact that the latest news information and the previous news information have four pieces of information in common out of eight pieces of information including one type of numerical information and the seven independent words, a coincidence level is calculated to be 50% and a similarity is calculated to be 0.5.

The calculation of the similarity may be further performed such that "if respective pieces of news include pieces of numerical information, which are not identical with each other, the similarity is 0," or "an average of a coincidence level of numerical information and a coincidence level of independent words is regarded as the similarity," for example.

Note that the comparison of independent words by the judging section 153 per knowledge extraction target is performed by just comparing morphological analysis results, but alternatively, the following processes may be added as modifications: a process of converting verbs/adjectives/adjectival verbs in the morphological analysis results into their original forms for the comparison; a process of making a negative end-form when returning them to the original forms in a case where a negative auxiliary verb follows them; and the like process Second Embodiment Next will be described a second embodiment. Note that the second embodiment is a modification of the knowledge extracting apparatus 1 of the first embodiment for extracting knowledge information related to stock transactions.

A direction of a share price fluctuation does not necessarily accord with whether information obtained newly is positive or negative. Whether the direction of the share price fluctuation is a favorable direction or a worse direction in comparison with forecasts made in advance by users who make a stock transaction tends to determine the direction of the share-price fluctuation.

Accordingly, in the first embodiment, in the process of the information analysis section 15, only information on whether there is a share-price-fluctuation element or not and an expression thereof are provided to a CEP (Complex Event Processing) or to a user. However, some share-price-fluctuation elements tend to give a given directivity to the share price fluctuation.

In view of this, the second embodiment is configured such that an element extracting section 145 in a knowledge extracting section 14 gives, to one having an apparent directivity among second clue words, a direction (positive or negative) and its intensity. This intensity is set in advance in a range of integers of −5 to 5.

Along with this, a second concept extracting section 145 is configured to use a second clue word dictionary 113a illustrated in FIG. 16 instead of the second clue word dictionary 113 illustrated in FIG. 4.

More specifically, the second concept extracting section 145 includes the aforementioned function to extract a share-price-fluctuation element from news information when the news information, which is an electronic document, includes a share-price-fluctuation evaluation word as a result of a judgment by a knowledge-extraction judgment word checking section 141, and additionally includes a function to search the second clue word dictionary 113a in a storage section 11 based on the share-price-fluctuation element thus extracted and to add respective pieces of information indicative of a direction and an intensity of a share price fluctuation thus found to the share-price-fluctuation element.

Note that in the second clue word dictionary 113a, a code for identifying a clue word, a clue word to an expression of a share-price-fluctuation element, information indicative of a direction of a share price fluctuation, and information indicative of an intensity of the share price fluctuation are described in association with each other.

Next will be described an operation of a knowledge extracting apparatus 1 configured as such. Note that descriptions about configurations/operations similar to those of the knowledge extracting apparatus 1 of the first embodiment are omitted.

Operations of step S1 to S6 are performed in a similar manner to the above.

As a result of a judgment by the knowledge-extraction judgment word checking section (hereinafter referred to as a share-price-fluctuation evaluation word checking section) 141, when news information includes a share-price-fluctuation evaluation word, the second concept extracting section (hereinafter referred to as an element extracting section) 145 extracts a share-price-fluctuation element from the news information. More specifically, the second concept extracting section (hereinafter referred to as an element extracting section) 145 judges whether or not one or more clue word in the second clue word dictionary (hereinafter referred to as an element expression clue word dictionary) 113a are included in a news headline or a news main body of the news information including the share-price-fluctuation evaluation word (step S7).

The processes of step S7 and step S8 are performed after step S6 in the flowchart of FIG. 9, but may be performed before the process of step S3 or in parallel with the processes from step S3 to step S6.

In a case where a clue word in the element expression clue word dictionary 113a is included in the news headline or news main body of the received news information, the element extracting section 145 extracts a noun phrase relating to the clue word as a share-price-fluctuation element (step S8).

For example, in a knowledge extracting process from a news ID "4" illustrated in FIG. 17, a clue word "negative reaction" registered in the element expression clue word dictionary 113a is extracted, and a direction and an intensity associated with the clue word "negative reaction" are given to a share-price-fluctuation element including a noun phrase "downward revision in earnings," which relates to the clue word "negative reaction," thereby obtaining a share-price-fluctuation element "element: downward revision in earnings, direction: negative, intensity: 2."

A combination forming section 146 forms knowledge information in a similar manner to the above, and writes the knowledge information into the storage section 11 (step S9). FIG. 18 is an example of the knowledge information. Here, the knowledge information includes the share-price-fluctuation element "element: downward revision in earnings, direction: negative, intensity: 2," to which the direction and the intensity are given. The knowledge information includes a set of the first conceptual name, the issue, and the share-price-fluctuation element as a combination, similarly to the first embodiment, but the combination may be assumed a set of only the first conceptual name and the issue, and the share-price-fluctuation element may be retained independently as knowledge information. Alternatively, the share-price-fluctuation element may be retained not with the first conceptual name but with the issue as knowledge information.

After that, in a case where a news ID "5" illustrated in FIG. 17 is received, when the share-price-fluctuation element "downward revision in earnings" is extracted from a news main body thereof, an information analysis section 15 adds information of "direction: negative, intensity: 2" to an issue "1152: AA iron manufacture Co., Ltd." and the element "downward revision in earnings," and provides them to a system such as an algorithmic trade engine or a user terminal device 2 for making a stock transaction.

As described above, the present embodiment is configured such that the second clue word dictionary is searched based on a share-price-fluctuation element extracted by the knowledge extracting apparatus 1 for extracting knowledge information related to stock transactions, and respective pieces of information indicative of a direction and an intensity of a share price fluctuation thus found to the share-price-fluctuation element. With such a configuration, information in which the direction and the intensity are added to the share-price-fluctuation element is provided, thereby making it possible to further support quick decision of the system such as an algorithmic trade engine or the user who makes a stock transaction, in addition to the effect of the first embodiment.

Third Embodiment

Next will be described a third embodiment.

The third embodiment is a modification of the knowledge extracting apparatus 1 of the first embodiment for extracting knowledge information related to stock transactions, and knowledge information extracted by a knowledge extracting section 14 is an element (an event) related to a certain target and its time stamp.

Along with this, an information receiving section 12 includes the aforementioned function to receive news information, and further a function to add a time stamp to news information when receiving the news information.

In the aforementioned function to extract knowledge information from news information selected by an information selecting section 13, a knowledge extracting section 14 has a function to extract event information including an expression indicative of a predetermined target from the selected news information and to write the event information thus extracted from the news information and a time stamp into a storage section 11 as knowledge information.

Here, the expression indicative of a predetermined target is, for example, a company name expression indicative of a company name of an issue or an expression indicative of a noun just before a group definition word which defines a first conceptual name of the issue. Note that the "company name expression indicative of a company name of an issue" is described in a knowledge-extraction target word dictionary (hereinafter referred to as an issue dictionary) 112. The "group definition word which defines a first conceptual name of the issue" is described in a first clue word dictionary (hereinafter referred to as a group-definition-word dictionary) 111.

Figure 19:
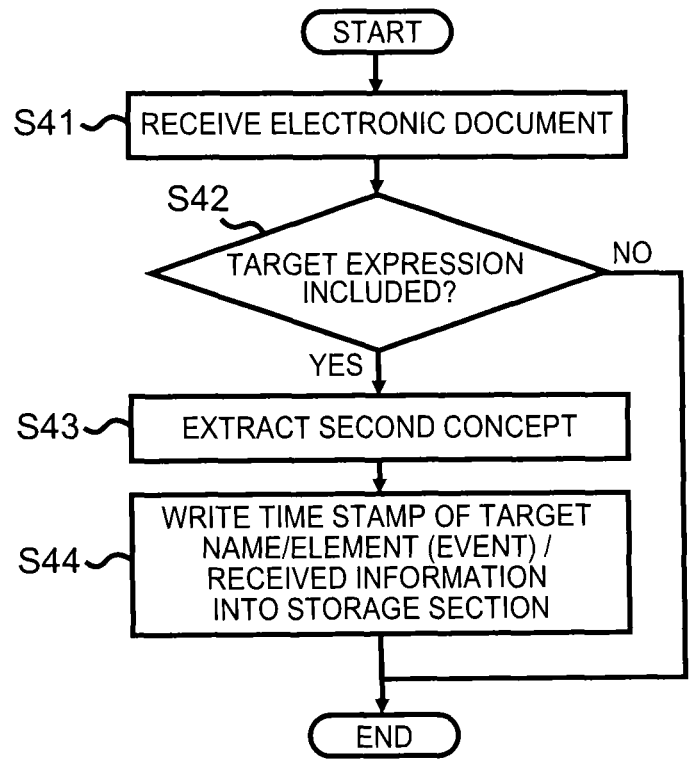
FIG. 19 is a flowchart to describe one example of a process operation of a knowledge extracting section in a third embodiment.

Next will be described an operation of a knowledge extracting apparatus 1 configured as such. FIG. 19 is a flowchart illustrating an example of a process operation of the knowledge extracting section 14.

When the information receiving section 12 receives news information (step S41), the knowledge extracting section 14 refers to the group definition word dictionary 111, the issue dictionary 112, and the like and judges whether or not an expression indicative of a target (a first concept associated with a company) selected by a user is included (step S42).

In a case where the expression indicative of the target selected by the user is included, the knowledge extracting section 14 extracts a noun phrase including the expression indicative of the target as a second concept (an event) (step S43).

The knowledge extracting section 14 additionally writes the second concept thus extracted into the storage section 11 together with a target name and a time stamp of the received information (step S44).

After that, the information analysis section 15 performs operations of steps S21 to S34 in a similar manner to the above.

FIG. 20 is a view illustrating an example of knowledge information. This is an example in which a process is performed on the news IDs "1" and "2" illustrated in FIG. 5 in regard to the first conceptual name "influenza."

The knowledge (the second concept) to be extracted is a noun phrase including a target expression selected by a user, but a compound noun may be selected from this noun phrase, a proper noun (a place name or the like) may be selected therefrom, or a trend word may be selected therefrom as a second concept, and "A prefecture," "group infection," and "X city," and a combination thereof may be assumed as a second clue word.

The second concept extracted based on the first concept "influenza" is expanded to companies according to the knowledge information obtained in the first embodiment as illustrated in FIG. 12, and information in which a "target" in the knowledge information illustrated in FIG. 20 is replaced from "influenza" to "1033: yy bou Holdings Co., Ltd" may be also written as knowledge information.

Further, as illustrated in FIG. 20, the number of distributions of news information having a high similarity may be assumed as "a similar information number" and regarded as knowledge information.

As described above, the present embodiment is configured such that when news information is received, a time stamp is added to the news information, event information including an expression indicative of a predetermined target is extracted from selected news information, and the extracted event information and a time stamp are written into the storage section 11 as knowledge information. With such a configuration, a second concept related to a certain target (a first concept) is extracted and retained in time series with time stamp information, thereby resulting in that, when a similar event has occurred, it is possible to retain knowledge information which is effective for forecast in the near future so as to provide it to a user terminal device 2, in addition to the effect of the first embodiment.

Note that it is also possible to configure the third embodiment such that an electric mail is assumed as information to receive and a project is assumed as a target, so that knowledge information indicative of a risk related to a project of corporate activities is extracted. Further, it is further possible to configure the third embodiment such that a system log of an information appliance is assumed as information to receive and a computer network system is assumed as a target, so that knowledge information related to interference detection of the computer network system is extracted.

Fourth Embodiment

Next will be described a fourth embodiment.

Figure 21:
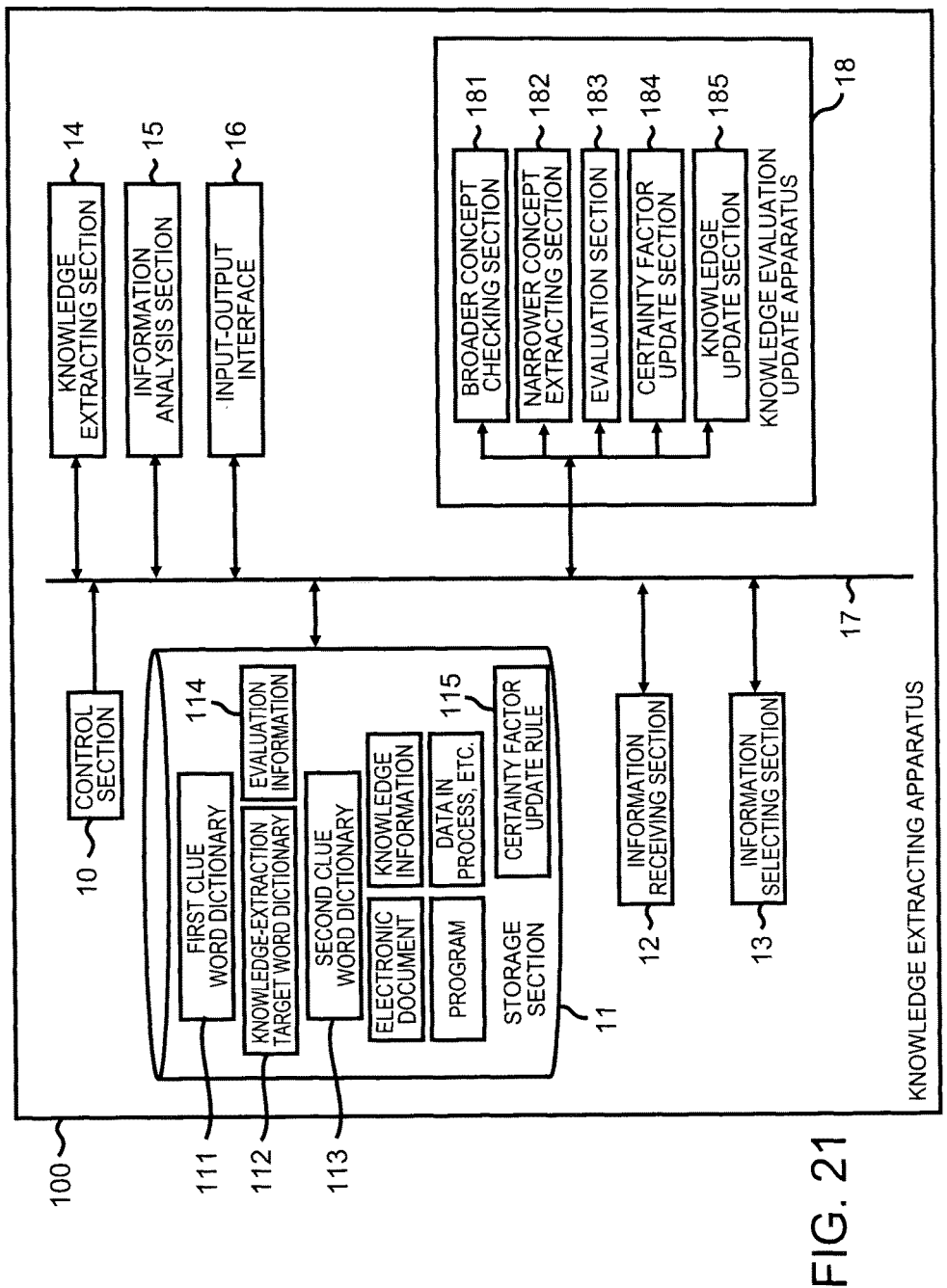
FIG. 21 is a view illustrating an exemplary configuration of a knowledge extracting apparatus according to a fourth embodiment.

With reference to FIG. 21, a configuration of a knowledge extracting apparatus 100 of the fourth embodiment is described. Note that the configurations as described in the first embodiment to the third embodiment are omitted.

As illustrated in FIG. 21, the knowledge extracting apparatus 100 of the present embodiment includes evaluation information 114 and a certainty factor update rule 115 of a storage section 11 and a knowledge evaluation update apparatus 18. The evaluation information 114, the certainty factor update rule 115, and a certainty factor will be described later.

The knowledge evaluation update apparatus 18 includes a broader concept checking section 181, a narrower concept extracting section 182, an evaluation section 183, a certainty factor update section 184, and a knowledge update section 185.

The broader concept checking section 181 checks, per group name included in knowledge information, whether or not there is any news in which the group name is described and the number of distributions in news information newly registered in the storage section 11 for a predetermined period of time. That is, the knowledge information of the present embodiment is information having a hierarchical structure, and a group name is assumed as a broader term and an issue is assumed as a narrower concept.

The narrower concept extracting section 182 extracts all issues included in the knowledge information which are narrower concepts of the group name checked by the broader concept checking section 181. Further, the narrower concept extracting section 182 checks whether or not there is any news in which the issues are described and the number of distributions, from the news information checked by the broader concept checking section 181.

The evaluation section 183 calculates an evaluation value per issue extracted by the narrower concept extracting section 182, based on the evaluation information 114 stored in the storage section 11. The evaluation information 114 is, for example, stock quotations, news, a turnover of a stock, business performance or an employee number of a company, and the like.

The certainty factor update section 184 updates a certainty factor, which will be described later, based on the evaluation value calculated by the evaluation section 183 and the certainty factor update rule 15.

The knowledge update section 185 updates knowledge information stored in the storage section 11, based on a updated result of the certainty factor update section 184.

Here, as described above, a share price fluctuation is influenced by occurrence of news related to each issue, but an intensity of the influence varies depending on an issue and a group name (key words). Accordingly, it is effective to retain, in addition to a combination of the group name and the issue, the intensity of the influence on the issue at the time of the occurrence of news related to the group name, that is, information of a certainty factor indicative of how certain the issue belongs to the group.

In view of this, the fourth embodiment is configured such that knowledge information to which certainty factor information including a certainty factor and a certainty factor updating history as illustrated in FIG. 22 is added instead of the knowledge information illustrated in FIG. 12. That is, the certainty factor of the present invention is a value indicative of a degree of how much a narrower concept belongs (relates) to a broader concept, and is different from the certainty factor in the third technique described in Background Art. Higher the certainty factor in knowledge information is, higher the degree of how much the narrower concept belongs to the broader concept is, and thus, it is possible to judge that relevant information is highly related.

Note that information about the share-price-fluctuation element in FIG. 12 is omitted in FIG. 22, but knowledge information in FIG. 22 may be configured to include the share-price-fluctuation element. Alternatively, the combination of the group name and the share-price-fluctuation element may be configured to be managed in a table different from the knowledge information in FIG. 22. Further, in addition to the share-price-fluctuation element, a direction and an intensity may be managed together as described in the second embodiment and FIG. 18. Further, the information included in the certainty factor information may be only a certainty factor.

Similarly to the knowledge information of FIG. 12 used in the first embodiment, the second embodiment, and the third embodiment, the knowledge information of FIG. 22 retains two types of information, i.e., a group name and an issue. Further, three types of information including information of a certainty factor indicative of how much the issue belongs to the group, in addition to the above two, are required. In addition to them, the following pieces of information may be retained together: a low-order group name to subdivide the group name; a business entry timing when a corresponding company plans to enter a corresponding business (group), which is released by the corresponding company; a business closure timing when the corresponding company plans to close the corresponding business (group), which is released by the corresponding company; a certainty factor updating history up to a given number of times in the past; a group definition word in which to record a group definition word at the time when a relation between the group name and the issue is extracted newly; and the like. In the present embodiment, the certainty factor updating history to be retained includes two previous histories.

Figure 23:
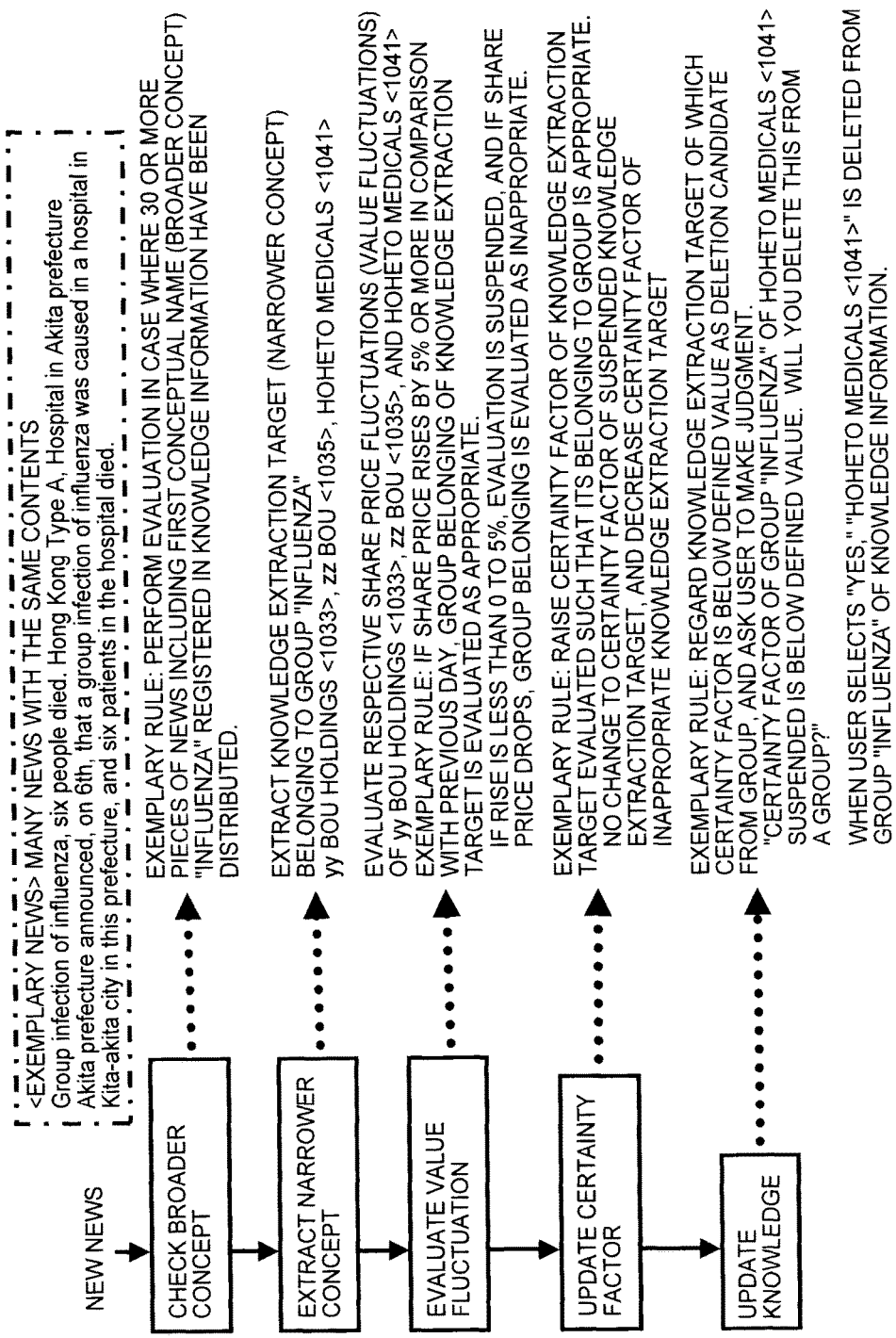
FIG. 23 is a view illustrating one example of a process operation of a knowledge evaluation update apparatus in the fourth embodiment.
Figure 24:
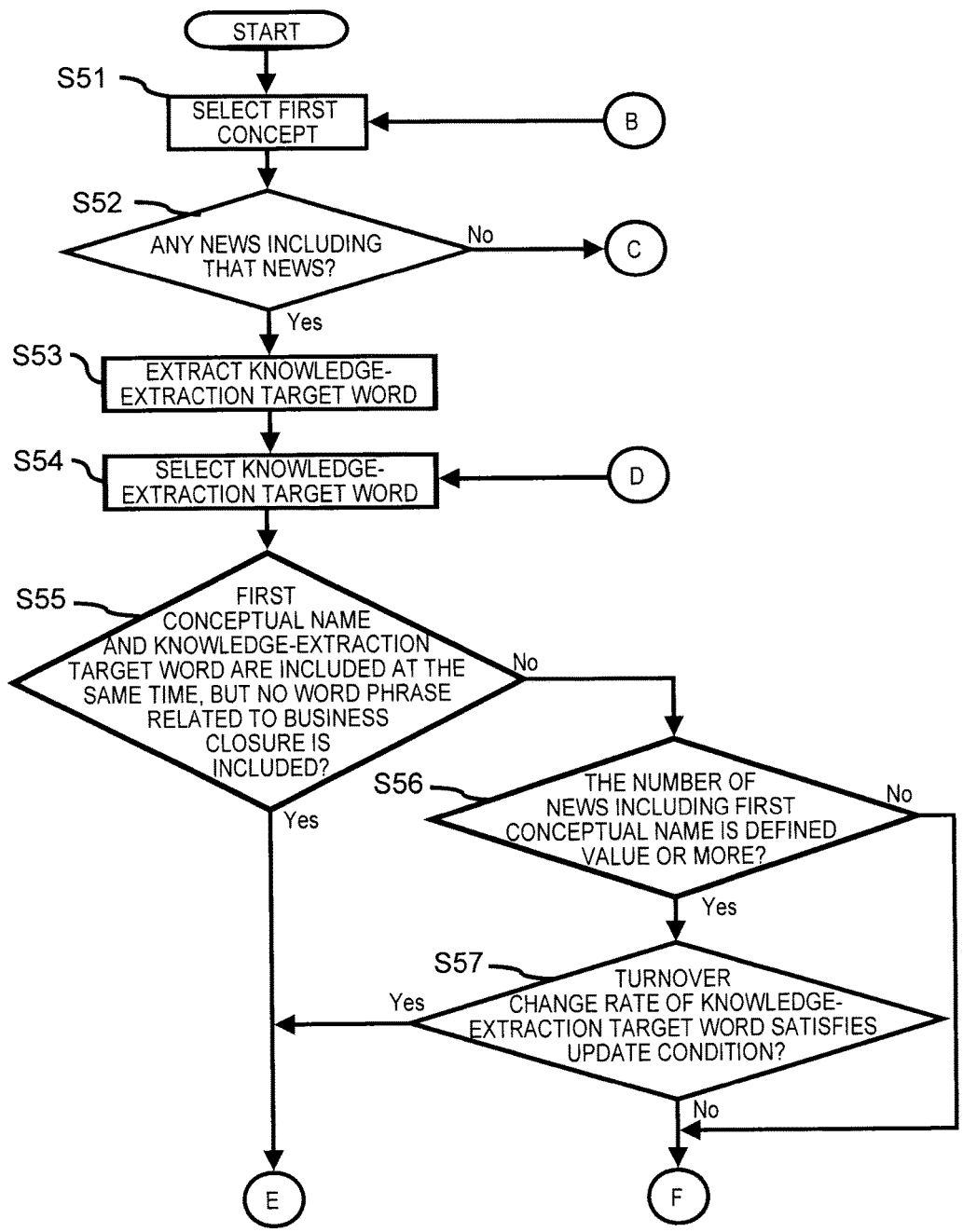
FIG. 24 is a flowchart to describe one example of the process operation of the knowledge evaluation update apparatus in the fourth embodiment.
Figure 25:
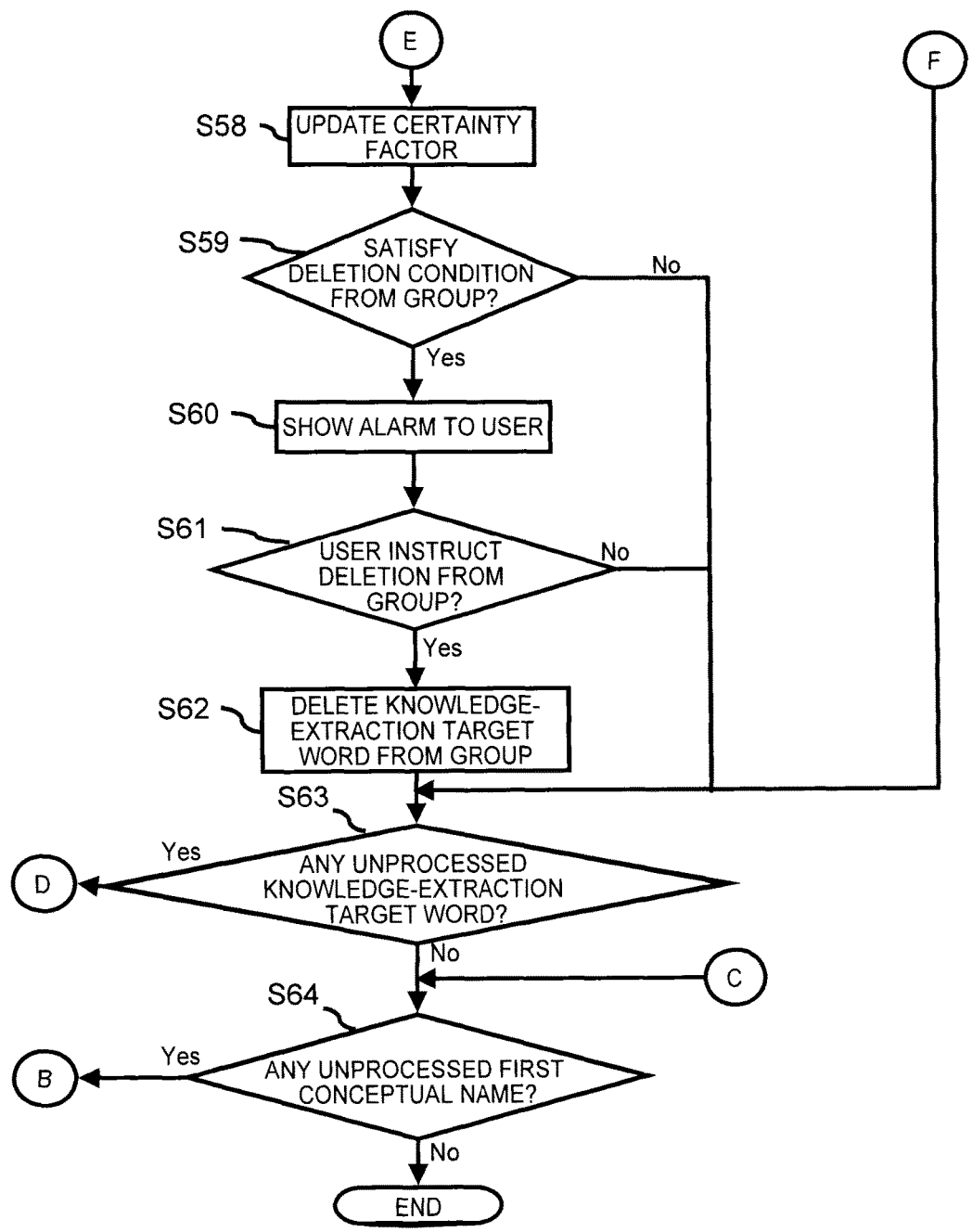
FIG. 25 is a flowchart to describe one example of the process operation of the knowledge evaluation update apparatus in the fourth embodiment.

Next will be described an operation of the knowledge extracting apparatus 100 including the knowledge evaluation update apparatus 18 for retaining and updating the certainty factor of the knowledge information in FIG. 22. FIG. 23 is a schematic view illustrating details of a process operation (hereinafter referred to as a knowledge evaluation updating process) of the knowledge evaluation update apparatus 18, and FIGS. 24 and 25 are flowcharts to describe one example of the knowledge evaluation updating process.

The following describes a case where a process related to knowledge information in the fourth row in FIG. 22 is performed in the knowledge extracting apparatus 100 of the present embodiment. The knowledge information in the fourth line in FIG. 22 is as follows: "First conceptual name: influenza, Low-order group name: influenza medicine, Issue: ff pharmaceutical <1042>, Certainty factor: 1, Business entry timing: Oct. 19, 2007, Certainty factor updating history 1 (pervious certainty factor updating history): Sep. 10, 2008 +1, Group definition word: related."

Extraction of a set of a first conceptual name (hereinafter referred to as a group name), an issue (a company name expression), and a share-price-fluctuation element are performed in a similar manner to the first embodiment. When a combination of a group name and an issue is extracted newly, an initial value of the certainty factor of 1.0, for example, is given. Further, a minimum value of the certainty factor of the present embodiment is 0, and when the certainty factor becomes less than 0 due to a certainty factor update process, which will be described later, the certainty factor is adjusted to 0. Further, a maximum value of the certainty factor of the present embodiment is 5.0. When the certainty factor becomes more than 5.0 as a result of the certainty factor update process, the certainty factor may be adjusted so as not to largely exceed 5.0 by exception processing. The exception processing is, for example, a process in which in a case where the certainty factor of the previous day is larger than 5.0 and the certainty factor will be further increased by update at this time, the certainty factor is increased only by 0.05, and in a case where the certainty factor of the previous day is less than 4.95 and the certainty factor will exceed 5.0 by update at this time, the certainty factor after the update is adjusted to 5.0.

Note that in the following description, the knowledge evaluation updating process is performed once in the evening or in the nighttime after securities markets are closed, but this process may be performed not once a day but may be performed at the end of the morning session and at the end of the afternoon session of the securities markets.

When the knowledge evaluation updating process is started, the broader concept checking section 181 selects one group name from the knowledge information in FIG. 22 (step S51). In this case, a group name "influenza" is selected. Subsequently, the broader concept checking section 181 checks whether or not there is any news in which the group name selected in step S51 is described among pieces of news newly registered in the storage section 11 on that day (step S52).

Note that, in the present embodiment, counting of the number of news stories is performed at every predetermined time such as at 15:00 of the business day, for example. News distributed on day-off may be added to news of the next business day. Further, in step S52, the broader concept checking section 181 may check whether or not there is any news in which the group name and its low-order group name are both described.

In a case where there is no news in which the group name currently selected is described ("No" in step S52), processes from step S53 to step S63 are omitted to proceed to step S64. Step S64 will be described later.

In a case where there is news in which the group name currently selected is described ("Yes" in step S52), the narrower concept extracting section 182 extracts issues included in the same knowledge information as the group name currently selected, from the knowledge information in FIG. 22 (step S53). The evaluation section 183 selects one issue from the issues selected by the narrower concept extracting section 182 (step S54). In this case, an issue "ff pharmaceutical <1042>" is selected.

Subsequently, the evaluation section 183 judges whether or not there is any news including the issue selected by the narrower concept extracting section 182 and a group name corresponding to the issue at the same time but without any predetermined word phrase ("closure," "disposal," and the like) associated with business closure (step S55).

When there is no news including the issue selected by the narrower concept extracting section 182 and the group name corresponding to the issue at the same time but without any predetermined word phrase associated with business closure ("No" in step S55), processes of step S56 and step S57 are omitted to proceed to step S58.

When there is news including the issue selected by the narrower concept extracting section 182 and the group name corresponding to the issue at the same time but without any predetermined word phrase associated with business closure ("Yes" in step S55), the evaluation section 183 checks whether or not the number of news stories including the group name is a prescribed number or more (step S56). The prescribed value in step S56 is 3 in the present embodiment.

When the number of news stories including the group name is the prescribed number or more ("Yes" in step S56), the evaluation section 183 calculates a "turnover change rate" of the issue as an evaluation value and checks whether or not the turnover change rate thus calculated satisfies an update condition of the certainty factor, which will be described later (step S57).

Figure 26:
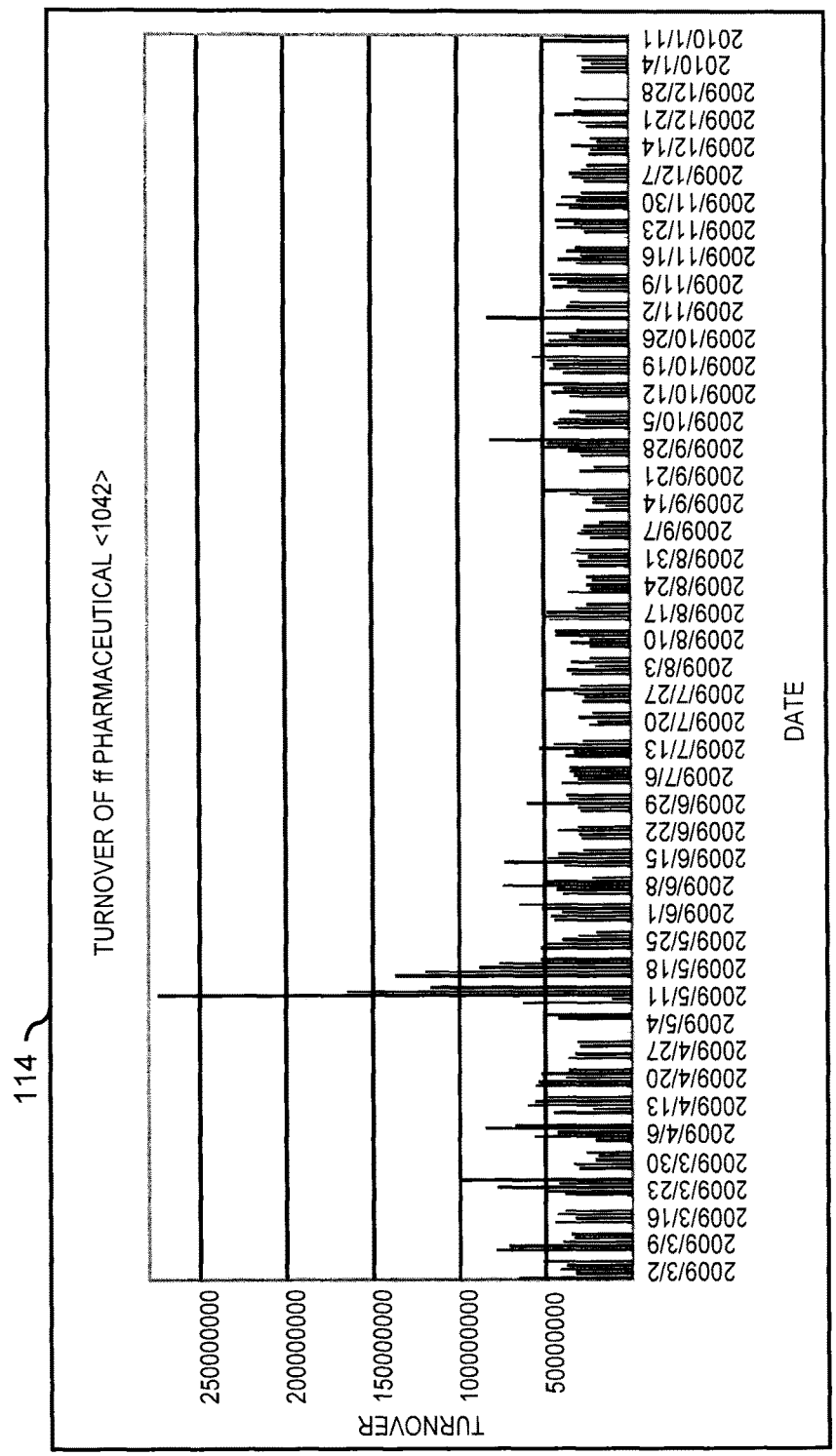
FIG. 26 is a view illustrating one example of evaluation information of the knowledge evaluation update apparatus in the fourth embodiment.

In this case, the evaluation information 114 of the present embodiment includes daily turnovers related to an issue of a stock. FIG. 26 illustrates one example of turnovers of the issue "ff pharmaceutical <1042>."

The evaluation section 158 calculates the "turnover change rate" by use of this evaluation information 114 according to the following formula in step S57:

Turnover change rate=(turnover of current day)/(average of turnovers of most recent five business days)     (1)

The formula (1) uses the average of the most recent five business days, but needless to say, it is not limited to five business days.

Note that the update condition in step S57 is, for example, as follows: "update is performed if the turnover change rate is not less than a predetermined threshold value." Further, the update condition may be changed dynamically based on information included in the storage section 11 in the knowledge extracting apparatus 100. It is conceivable that the dynamic change of the update condition is such that, in a case where news information is used as the evaluation information 114, when the number of news stories related to the issue included in the news information is more than a given number, a threshold value included in the update condition is increased by a predetermined unit.

In the present embodiment, the update condition is "whether turnover change rate >1.1 or turnover change rate <1.0 is satisfied or not."

The judgment from step S55 to step S57 is an example of the process of judging whether or not the certainty factor is updated, and it is also conceivable that the judgment may be divided into more details or that another index may be used as a criteria.

When the number of news stories including the group name is not the prescribed number or more ("No" in step S56) or when the evaluation value calculated by the evaluation section 183 does not satisfy the update condition of the certainty factor ("No" in step S57), processes from step S58 to step S62 are omitted to proceed to a process of step S63.

When the evaluation value calculated by the evaluation section 183 satisfies the update condition of the certainty factor ("Yes" in step S57), the certainty factor update section 184 updates the certainty factor stored in the storage section 11 in association which the issue (step S58). Note that the update of the certainty factor by the certainty factor update section 184 is performed such that the certainty factor update rule 115 is set in the storage section 11 in advance and the update is performed according to this rule.

An example of the certainty factor update rule 115 in the present embodiment is illustrated in FIG. 27. The certainty factor update rule 115 illustrated in FIG. 27 is stored in the storage section 11.

The certainty factor update rule 115 of FIG. 27 is as follows: "in a case where the judgment in step S55 is "Yes" and turnover change rate ≤1.1 is satisfied, 0.05 is added to the certainty factor;" "in a case where the judgment in step S55 is "Yes" and turnover change rate >1.1 is satisfied, (turnover change rate−1.0)×0.5 is added to the certainty factor;" "in a case where the judgment in step S56 is "Yes" and turnover change rate >1.1 is satisfied, (news number change rate−turnover change rate)×0.5 is reduced from the certainty factor;" and "in a case where the judgment in step S56 is "Yes" and turnover change rate <1.0 is satisfied, (news number change rate−turnover change rate)×0.5 is added to the certainty factor."

The news number change rate is calculated based on the following formula:

News number change rate=(a value obtained by multiplying the number of news stories including the group name on a current day by the certainty factor on the current day)/(an average of values obtained by multiplying respective numbers of news stories including the group name for most recent five business days by the certainty factor on the current day)     (2)

Figure 28:
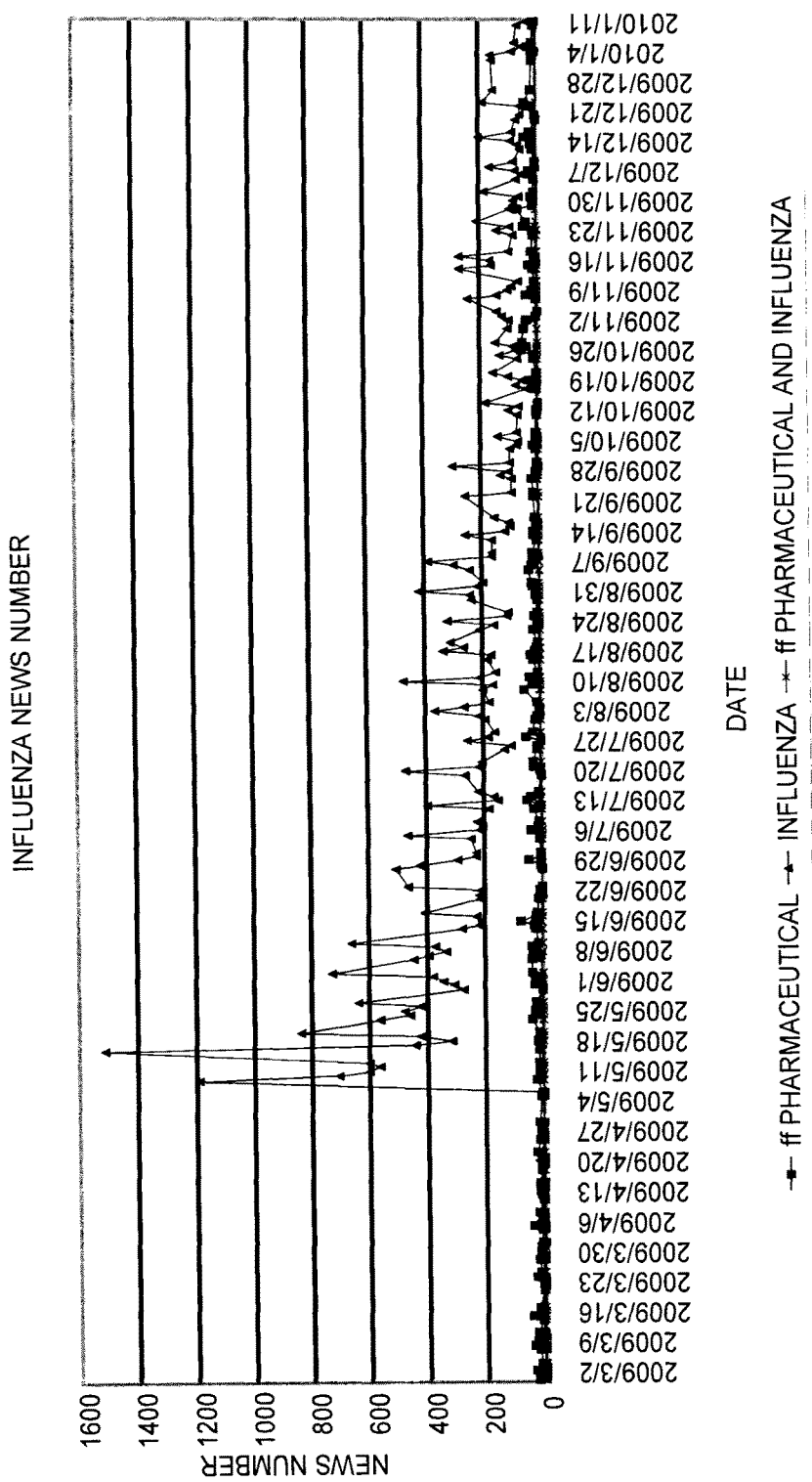
FIG. 28 is a view illustrating one example of a certainty factor update process of the knowledge evaluation update apparatus in the fourth embodiment.

Further, a graph indicative of the number of news stories including influenza in the present embodiment per day is illustrated in FIG. 28.

In the present embodiment, different update rules are applied to a case where the process proceeds from "Yes" in step S55 to step S58 and to a case where the process proceeds from "Yes" in step S57 to step S58. Further, such an update rule that "in a case where turnover change rate <1.0 is satisfied, (1−turnover change rate)×0.5 is reduced from the certainty factor on the previous business day" may be applicable. Note that a value of the certainty factor on the previous day is calculated, for example, from a certainty factor updating history included in the knowledge information in FIG. 22. Alternatively, the certainty factor itself may be retained as a history.

Figure 29:
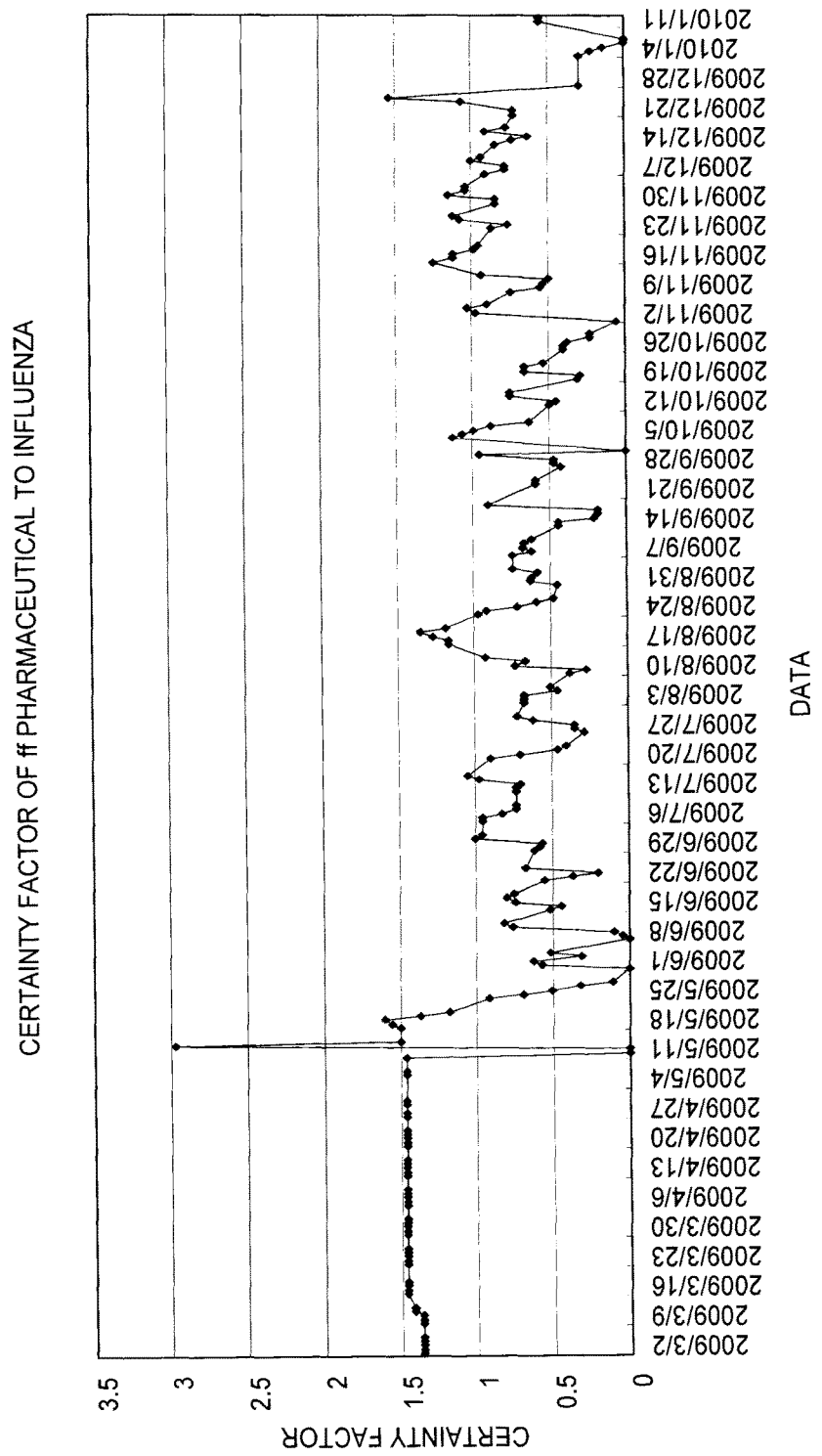
FIG. 29 is a view illustrating one example of the certainty factor update process of the knowledge evaluation update apparatus in the fourth embodiment.

FIG. 29 illustrates an example of a graph related to the certainty factor of the present embodiment.

Subsequently, the knowledge update section 185 updates the knowledge information in FIG. 22. More specifically, the knowledge update section 185 judges whether or not the certainty factor after the update satisfies a condition (hereinafter referred to as a deletion condition) to delete knowledge information including the issue from the storage section 11 (step S59). In the present embodiment, when the certainty factor is not more than 0.3, for example, the knowledge update section 185 judges that the deletion condition is satisfied. Note that this judgment is made not by a value of a latest certainty factor, but may be made when the deletion condition is satisfied after the certainty factor has been decreased continuously five times in the update history, for example.

When the certainty factor after the update is not 0.3 or less ("No" in step S59), that is, when the deletion condition from the group is not satisfied, the knowledge update section 185 omits processes from step S61 to step S62 and proceeds to step S63.

When the certainty factor after the update is 0.3 or less ("Yes" in step S59), that is, when the deletion condition from the group is satisfied, the knowledge update section 185 shows an alarm to a user (step S60). This alarm is intended to ask the user about whether or not the issue currently selected is to be deleted from the group currently selected, and the alarm is displayed on the input-output interface 16, for example.

When the user inputs information on whether the knowledge information is deleted or not via the input-output interface by referring to the alarm thus displayed, the knowledge update section 185 judges whether or not the information thus input is information to instruct deletion (step S61).

When the deletion is not instructed ("No" in step S61), the knowledge update section 185 omits the process of step S62 and proceeds to the process of step S63.

When the deletion is instructed ("Yes" in step S61), the knowledge update section 185 deletes the selected issue from the group (step S62). That is, knowledge information corresponding to a combination of the group currently selected and the issue currently selected is deleted from the storage section. Note that the deletion of the issue from the group may be performed not only in these series of processes, but a process of deleting an issue of which a closure timing comes may be performed independently according to information of the business closure timing described in the knowledge information in FIG. 22.

Subsequently, the knowledge update section 185 judges whether or not there are unprocessed issues in the group currently selected (step S63). When there are unprocessed issues ("Yes" in step S63), the process returns to step S54 and the same process is performed on one of the unprocessed issues.

When the unprocessed issues in the group currently selected are all subjected to the process ("No" in step S63) or in a case of "No" in step S52, the knowledge update section 185 judges whether or not there are any unprocessed groups among groups retained in the knowledge information (step S64).

When there are unprocessed groups ("Yes" in step S64), the process returns to step S51 and the same process is performed on one of the unprocessed groups. When there is no unprocessed group ("No" in step S64), the process is finished.

As described above, according to the present embodiment, with such a configuration that, based on information (a share price fluctuation and turnover) other than an information source from which knowledge is extracted, effectiveness of the knowledge is evaluated and updated, it is possible to maintain accuracy of the knowledge to be high based on a plurality of information sources, in addition to the effect of the first embodiment.

Note that in the fourth embodiment, the criteria of the processes of FIGS. 24 and 25 are not limited to those described above. For example, the judgment on whether or not there is any news story including a group name currently selected in step S52 may be replaced with a judgment on whether or not the number of news stories including a group name currently selected is more than that of the previous day or replaced with a judgment on whether or not a group name currently selected corresponds to a trend word.

Further, the judgment on whether or not a turnover change rate of an issue currently selected satisfies the update condition in step S57 may be replaced with a judgment based on a share price fluctuation tendency as a result of comparison of share price fluctuations and trading values of the issue currently selected, and an index indicative of a tendency of a whole stock market such as a Nikkei Stock Average.

For example, in a case where the judgment is made by use of share price fluctuations in step S57, the evaluation section 183 finds, as an evaluation value, a share price fluctuation ratio of the issue from a previous business day, or a share price fluctuation ratio from a business day further before the previous business day. At this time, if the share price fluctuation is a rise of 5% or more, for example, the evaluation section 183 judges it appropriate that the issue currently selected belongs to the group currently selected. Further, in a case where the share price fluctuation is a drop of less than 5% or a rise of less than 5%, the evaluation section 183 suspends a judgment on appropriateness of group belonging of the issue. Further, in a case where the share price fluctuation is a drop of 5% or more, the evaluation section 183 judges it inappropriate that the issue currently selected belongs to the group currently selected. As described in the second embodiment and FIG. 18, this judgment on the share price fluctuation may be performed by taking into account an element expression described in a news story and its direction and determining which one of a rise (positive) and a drop (negative) is appropriate to the judgment on whether or not it is appropriate for the issue to belong to the group.

Further, the process on each issue is configured to be performed per group to which the issue belongs, but in a case where a certain issue will become a processing target in a plurality of groups on the same day, exceptional processing may be performed. The exceptional processing may be, for example, a process [4] or [5] as follows:

[4] In regard to an issue to be a processing target in a plurality of groups on the same day, the certainty factor update is not performed.

[5] In regard to an issue to be a processing target in a plurality of groups on the same day, when the process on the issue is performed in each of the groups to which the issue belongs by referring to fluctuations of other issues belonging thereto. When the issue exhibits a value fluctuation in the same direction as and in an equivalent degree to other issues in a certain group, the certainty factor update process is performed in this group.

Further, in the present embodiment, a target for the evaluation update based on the certainty factor is a relationship between a group name and an issue, but the certainty factor may be also used for evaluation of a group definition word retained in the knowledge information in FIG. 22. That is, pieces of information on certainty factors corresponding to group definition words retained in the knowledge information are sorted per group definition word, and a group definition word of which an average or a maximum value of certainty factors is less than a prescribed value is judged to be not useful, so that the group definition word may be deleted from the group definition word dictionary (the first clue word dictionary) of FIG. 2.

Further, information on the certainty factor may not be used for the evaluation update of the knowledge information or the group definition words, but may be used for weighting at the time when the number of group names included in general news stories is counted. That is, in a case where there are 50 pieces of news stories including a group name "influenza," for example, it is assumed that 50 pieces of news stories are distributed for an issue with a certainty factor of 1.0, it is assumed that 40 pieces of news stories are distributed for an issue with a certainty factor of 0.8, and the respective numbers may be assigned to the respective issues.

FIG. 30 is a view illustrating an example of the effect of the present embodiment. FIG. 30 relates to a certain TSE First Section listed issue and illustrates a correlation coefficient of the number of news stories and the issue in terms of: the number of news stories including its issue name (ONLY ISSUE NAME); the number of news stories including at least one of the issue name and a group name to which the issue belongs (it is assumed that there are approximately 200 groups in the example of FIG. 30) (ISSUE NAME OR GROUP NAME (WITHOUT CERTAINTY FACTOR)); and a total amount of a number obtained by correcting the number of news stories including the group name by a certainty factor of the group name and the number of news stories including the issue name (ISSUE NAME OR GROUP NAME (WITH CERTAINTY FACTOR CORRECTION)).

The correlation coefficient is a correlation between two random variables, that is, a statistical index indicative of a degree of a similarity and takes an actual number between −1 and +1. When the correlation coefficient is almost 1, it can be said that two random variables have a direct correlation, and when the correlation coefficient is almost −1, it can be said that two random variables have a negative correlation. When the correlation coefficient is almost 0, a correlation between original random variables is weak. A relation between the correlation coefficient and the correlation is, for example, as follows: if the correlation coefficient is "0.0 to ±0.2," there is "almost no correlation;" if the correlation coefficient is "±0.2 to ±0.4," there is "a little correlation;" if the correlation coefficient is "±0.4 to ±0.7," there is "a correlation;" if the correlation coefficient is "±0.7 to ±0.9," there is "a strong correlation;" and if the correlation coefficient is "±0.9 to ±1.0," there is "an extremely strong correlation."

The correlation coefficient of "ISSUE NAME OR GROUP NAME (WITH CERTAINTY FACTOR CORRECTION)" to which the knowledge evaluation updating process of the present embodiment is applied, as illustrated in FIG. 30, has a value higher than the correlation coefficients of "ONLY ISSUE NAME" and "ISSUE NAME OR GROUP NAME (WITHOUT CERTAINTY FACTOR)", and it may be said that knowledge information with a stronger correlation can be obtained.

Note that the knowledge evaluation update apparatus 18 of the present embodiment is also be able to evaluate and update knowledge information other than the knowledge information related to stock transactions, and to perform, for example, a knowledge evaluation updating process of knowledge information related to a product (hereinafter referred to as product knowledge information).

In this case, the product knowledge information is extracted from information distributed on the Internet such as an announcement from a company, a blog, and a microblog. Further, at this time, information of a narrower concept included in the product knowledge information is assumed a product name, information of a broader concept is assumed a group name, and further, an evaluation value of the product knowledge information is assumed a change rate of sales information of the product. By evaluating and updating the product knowledge information according to this change rate of sales information, it is also possible to extract knowledge information having a stronger correlation between a group name of the product and sales of the product.

Fifth Embodiment

Next will be described a fifth embodiment.

In the first embodiment to the fourth embodiment, when it is judged whether or not news information includes information on a group, only a group name is assumed an expression to be extracted. However, in general news stories, related terms that are different from group names used in economic news may be described. For example, from the economic news as illustrated in FIG. 31, a combination of a group name "defense (related)" and issues "aa heavy industries <7191>," "bb heavy industries <7192>," and "cc industry <7193>" is extracted. Note that each numeric character provided beside each of the company names is a fictitious securities code.

In the above case, the group name is "defense," but a general news story will report "the government decided to push forward the private diversion of Self-Defense Force airplanes" and "growing tension on the Korean Peninsula," which are first half parts of respective economic news stories in FIG. 31, and it is highly unlikely that the group name "defense" is described.

In view of this, in the fifth embodiment, related-term information 116 illustrated in FIG. 32 is used in addition to the knowledge information in FIG. 12. As illustrated in FIG. 32, the related-term information 116 of the present embodiment is retained in a storage section 11 as a table in which knowledge No., a group name (a first conceptual name), and related terms are associated with each other. Note that the related terms may be registered by a user in advance or words appearing in news information simultaneously with the group name may be extracted as related terms and registered.

Figure 33:
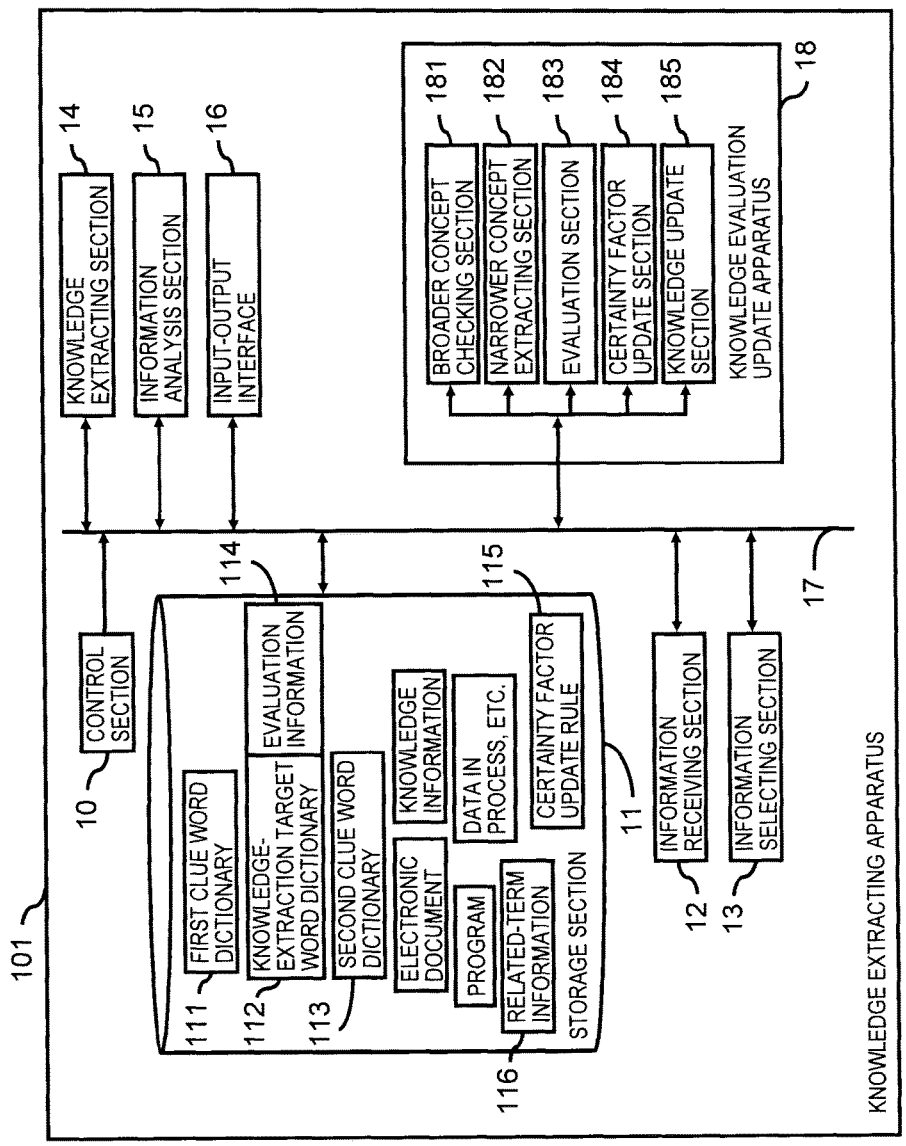
FIG. 33 is a view illustrating an exemplary configuration of a knowledge extracting apparatus according to the fifth embodiment.

Here, with reference to FIG. 33, a configuration of a knowledge extracting apparatus 101 of the fifth embodiment is described. Each constituent having the same reference sign as in the first embodiment to the fourth embodiment performs the same operation as in the first embodiment to the fourth embodiment.

As illustrated in FIG. 33, the knowledge extracting apparatus 101 of the fifth embodiment is configured such that related-term information 116 is retained in the storage section 11 in addition to the knowledge extracting apparatus 100 of the fourth embodiment. Note that the knowledge extracting apparatus 101 of the fifth embodiment may be configured such that the related-term information 116 is added to the knowledge extracting apparatus 100 of any of the first to third embodiments.

One example of a process of the knowledge extracting apparatus 101 of the present embodiment is described with reference to FIGS. 14, 24, and 25.

Figure 14:
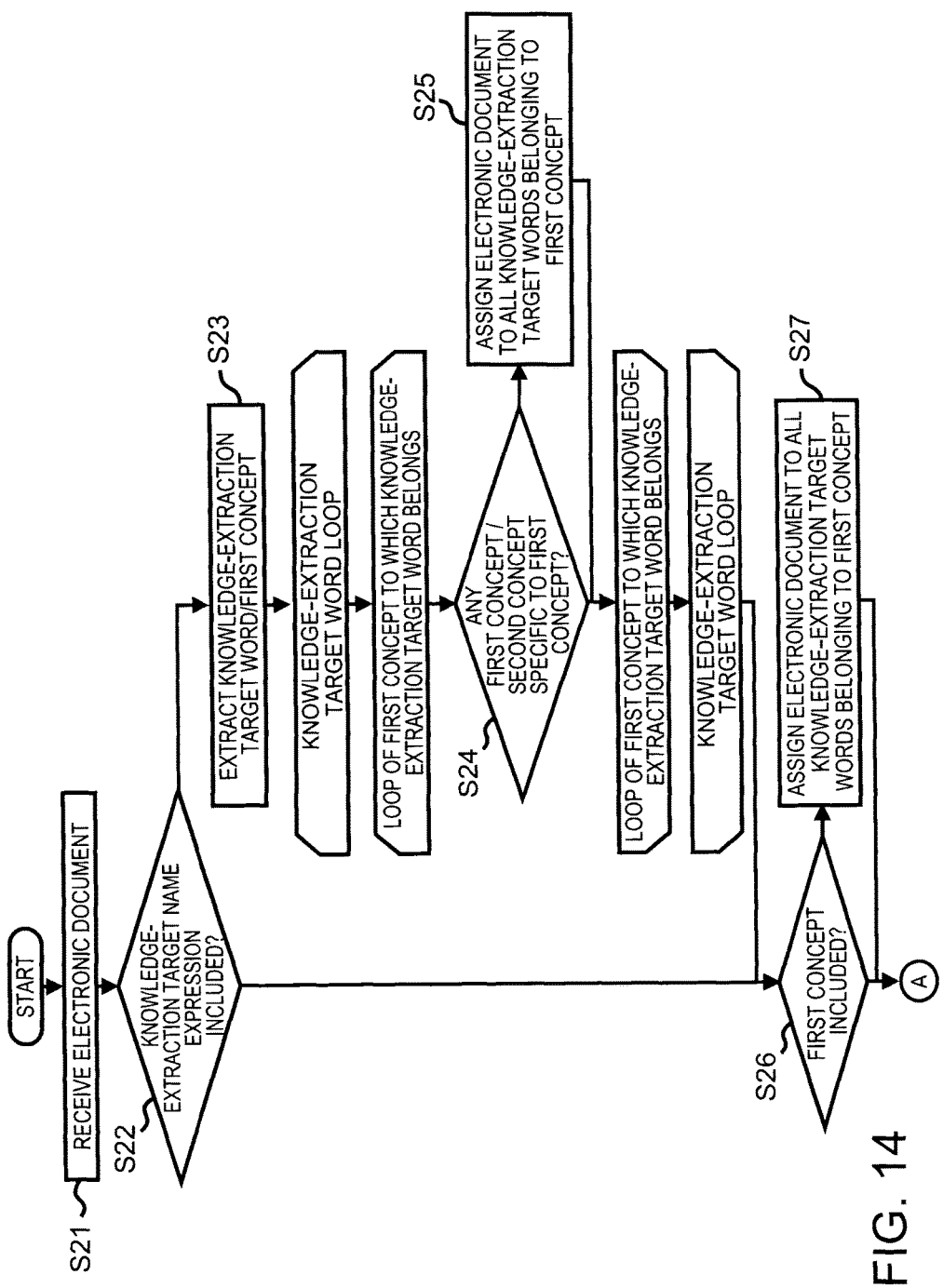
FIG. 14 is a flowchart to describe one example of the process operation of the information analysis section in the first embodiment.
Figure 15:
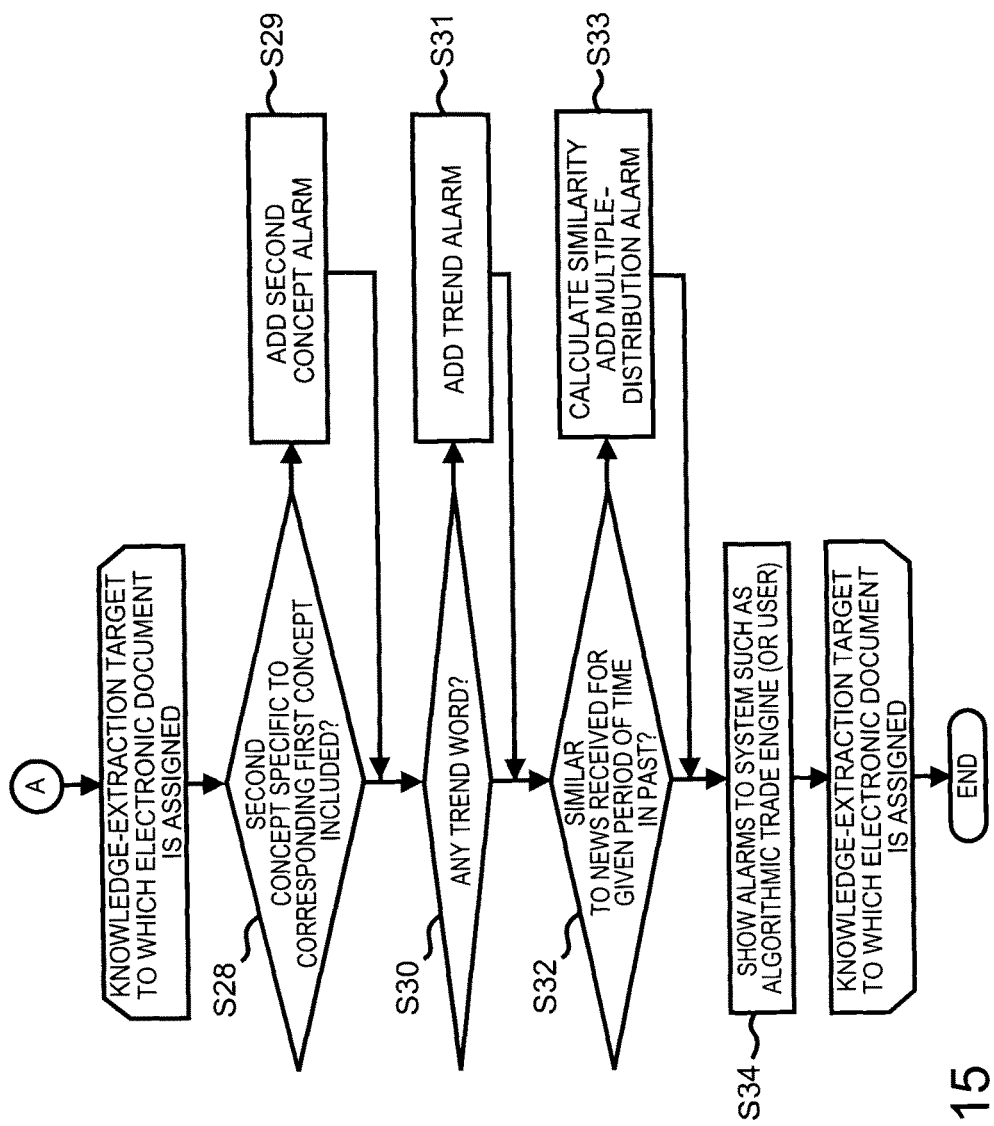
FIG. 15 is a flowchart to describe one example of the process operation of the information analysis section in the first embodiment.

When the knowledge extracting apparatus 101 of the present embodiment judges whether or not a group name is included in news information (step S24 in FIG. 14 or step S52 in FIG. 24) in the process illustrated in FIG. 14 or FIGS. 24 and 25, the knowledge extracting apparatus 101 adds related terms included in the related-term information 116 illustrated in FIG. 32 to a check target as expressions equivalent to the group name. That is, the knowledge extracting apparatus 101 of the present embodiment finds whether or not a group name identical with a group name selected in step S51 is retained in the related-term information 116, and when the group name is retained, and in a case where the group name is retained therein, the knowledge extracting apparatus 101 judges whether or not this group name or a related term corresponding to the group name is included in the news information.

At this time, in a case where the group name and its related term are described in one news story, the news story is counted as one equivalent news story in which the group name is described. As the related term, an expression which is not registered in other groups may be selected from the share-price-fluctuation elements described in the first embodiment. Further, a noun phrase which appears at significantly different frequencies in a group of news stories including the group name and in other groups of news stories may be extracted. Moreover, the knowledge information in FIG. 12, the knowledge information in FIG. 22, and the related-term information 116 in FIG. 32 may be retained in respective separate forms as far as they can be connected based on a group name.

According to the present embodiment, since the related term is also taken as an extraction target as well as the group name which is rarely described in general news stories, it is possible to evaluate an influence of the general news stories to an issue more appropriately.

Sixth Embodiment

Next will be described a knowledge extracting apparatus in the sixth embodiment. Similarly to the third embodiment, the knowledge extracting apparatus in the sixth embodiment further includes a function to add a time stamp to an electronic document when receiving the electronic document, and knowledge information to be extracted by a knowledge extracting section 14 is an element (an event) related to a certain target and its time stamp.

Figure 34:
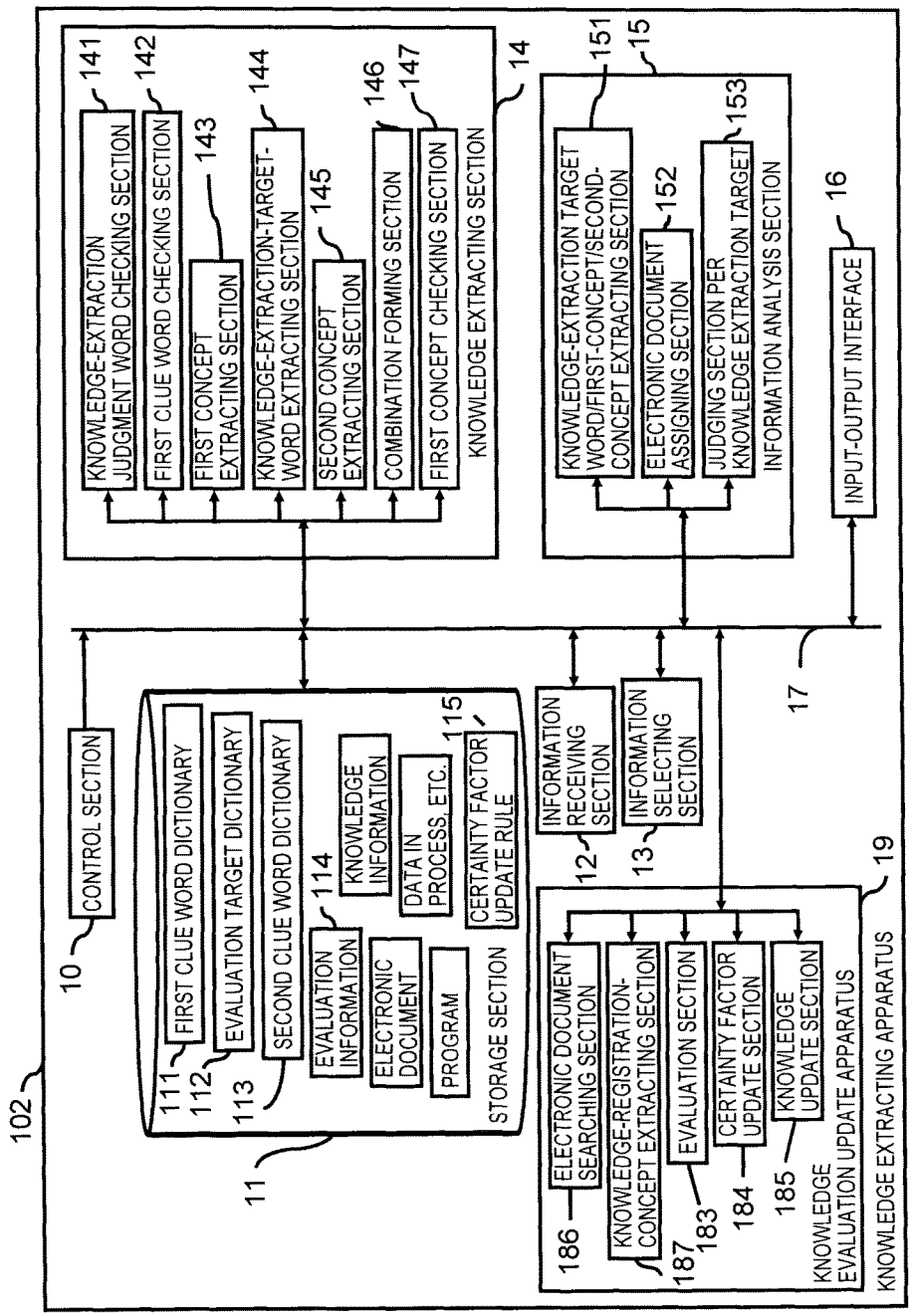
FIG. 34 is a block diagram illustrating an exemplary configuration of a knowledge extracting apparatus in a sixth embodiment.

With reference to FIG. 34, a configuration of a knowledge extracting apparatus 102 of the sixth embodiment is described. Note that the configurations as described in the above embodiments are omitted.

As illustrated in FIG. 34, the knowledge extracting apparatus 102 of the present embodiment includes a knowledge evaluation update apparatus 19.

The knowledge evaluation update apparatus 19 includes an electronic document searching section 186 and a knowledge-registration-concept extracting section 187 respectively instead of the broader concept checking section 181 and the narrower concept extracting section 182 in the knowledge evaluation update apparatus 18 of the knowledge extracting apparatus 100 illustrated in FIG. 21.

In terms of a first conceptual name included in knowledge information, the electronic document searching section 186 checks, in electronic documents newly registered in a storage section 11 for a predetermined period of time, whether or not there is any electronic document in which the first conceptual name is described and the number of distributions.

The knowledge-registration-concept extracting section 187 extracts all knowledge-extraction target words included in the knowledge information and associated with the first conceptual name checked by the electronic document searching section 186. Further, the knowledge-registration-concept extracting section 187 checks whether or not there is any electronic document in which the knowledge-extraction target words are described among the electronic documents checked by the electronic document searching section 186 and the number of distributions.

In the sixth embodiment, the electronic document is an article on a microblog (also referred to as a miniblog or a mutter blog; Twitter (registered trademark) is a representative example) distributed on the Internet, the first concept is a TV program, the knowledge-extraction target word is a matter appearing on a program such as a TV program, a character of the TV program, a feature of the TV program, a product picked up on the TV program, and the like, and the second concept is an evaluation expression to a TV program or a knowledge-extraction target word. That is, the present embodiment does not deal with an apparatus like the knowledge extracting apparatus 100 in the fourth embodiment as illustrated in FIG. 21 in which knowledge information related to stock transactions is extracted from news information, but deals with a knowledge extracting apparatus 102 in which upon reception of an article mentioning a TV program among articles of microblogs which are electronic documents, knowledge for grouping knowledge-extraction target words (characters, matters picked up, storyline, staffs, and the like) related to a drama A, and knowledge of evaluation expressions such as "LOL," "weep" and "kick ass" which are often used for the drama A or the knowledge-extraction target words thereof are obtained, for example, and these pieces of knowledge are extracted as knowledge information.

Note that "LOL" is a word used in the meaning of "laughed" or "laugh," and "kick ass" is a word used in the meaning of "to a very great extent." Further, when the knowledge extracting apparatus 102 receives an electronic document including a microblog distributed on the Internet, such as a news story, a general blog, and announcement information of a TV station, the knowledge extracting apparatus 102 refers to retained knowledge information, and adds, to the electronic document, a program name such as "drama A," knowledge-extraction target words belonging to the program, and information on whether or not there is any evaluation expression to the program or the knowledge-extraction target words, so that the knowledge extracting apparatus 102 is able to provide the electronic document to a terminal device of a user such as a program creator thereof.

That is, the knowledge extracting apparatus 102 of the present embodiment is a modification of the knowledge extracting apparatus 101 described in the fourth embodiment.

Figure 35:
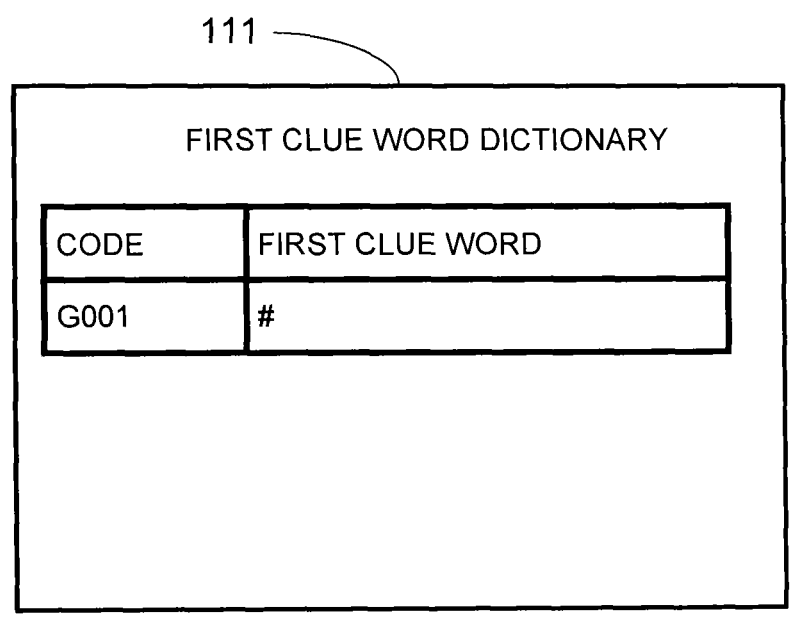
FIG. 35 is a schematic view illustrating an example of a first clue word dictionary of the knowledge extracting apparatus in the sixth embodiment.

FIG. 35 illustrates one example of a first clue word dictionary 111 in the present embodiment. As illustrated in FIG. 35, a code for identifying a first clue word, and a first conceptual name, i.e., a first clue word to define a program name in the present embodiment, are described in association with each other.

In the present embodiment, as illustrated in the example in FIG. 35, the first clue word dictionary 111 is configured such that a code for identifying a first clue word, and a first conceptual name, i.e., a first clue word to define a program name in the present embodiment are described in association with each other. More specifically, the first clue word which defines an article content such as a program name is "#," which is a first character of the article content.

As illustrated in an example in FIG. 36, a knowledge-extraction target word dictionary 112 in the present embodiment is configured such that, in regard to a knowledge-extraction target word, i.e., a matter appearing on a TV program in the present embodiment, a code for identifying the knowledge-extraction target word, a program name associated with the knowledge-extraction target word, and a knowledge-extraction target word expression which is another expression of the knowledge-extraction target word appearing on a microblog article are described in association with each other. As the knowledge-extraction target word expression, various names such as an official name, an abbreviated name, a popular name, a common name, and a nickname of the knowledge-extraction target word are usable. The knowledge-extraction target word dictionary 112 may be built initially based on public information of the TV station. On this occasion, a program name may not specified as for a performer who appears on other programs, and a program name may be described as for official titles specific to the program. Further, the knowledge-extraction target word dictionary may be configured such that, when knowledge information is extracted, another noun or compound noun appearing on the microblog article in which the first concept is described is recorded as a knowledge-extraction target word candidate, and registered as a knowledge-extraction target word after user's confirmation.

As illustrated in an example in FIG. 37, the second clue word dictionary 113*a* is configured such that a code for identifying a second clue word, and a second concept, i.e., a second clue word corresponding to the knowledge-extraction target word expression in the present embodiment are described in association with each other. In the present embodiment, the second clue word is a face mark which expresses an emotion and an expression similar to the face mark. Similarly to the second embodiment, the second clue word dictionary 113*a* has such a configuration that a direction of an emotion and an intensity of the emotion are given. Note that the intensity is shown with a larger value as the emotion is stronger.

FIG. 38 illustrates one example of a microblog article, which is an electronic document received by the information receiving section 12. As illustrated in FIG. 38, in the present embodiment, four items of a "time stamp," a "user," "background information," and a "main body," and an "article ID" given by the information receiving section 12 are used among constituents of the microblog article distributed on the Internet.

The "time stamp" is distribution time-of-day information given to the distributed microblog article. The "user" is an identification name of a user who distributes the information. The "background information" is an identification name of another user who distributes an original article, and the background information is given when the user quotes a microblog article distributed by the another user and redistributes the microblog article. The "article main body" is a text of a main body of the distributed microblog article.

The information selecting section 13 selects an electronic document as a knowledge extraction target, i.e., a microblog article regarding a TV program in the present embodiment, from microblog articles received by the information receiving section 12. A judgment on the microblog article being a microblog regarding the TV program is made, for example, based on whether or not a TV program name or a TV station name is described after the first clue word "#" in the top of an article content of the microblog. In a case of a microblog article including no first clue word, it is judged whether or not its main body includes any of the TV program name, the TV station name, and a knowledge-extraction target word described in the knowledge-extraction target word dictionary 112 of FIG. 36.

Figure 39:
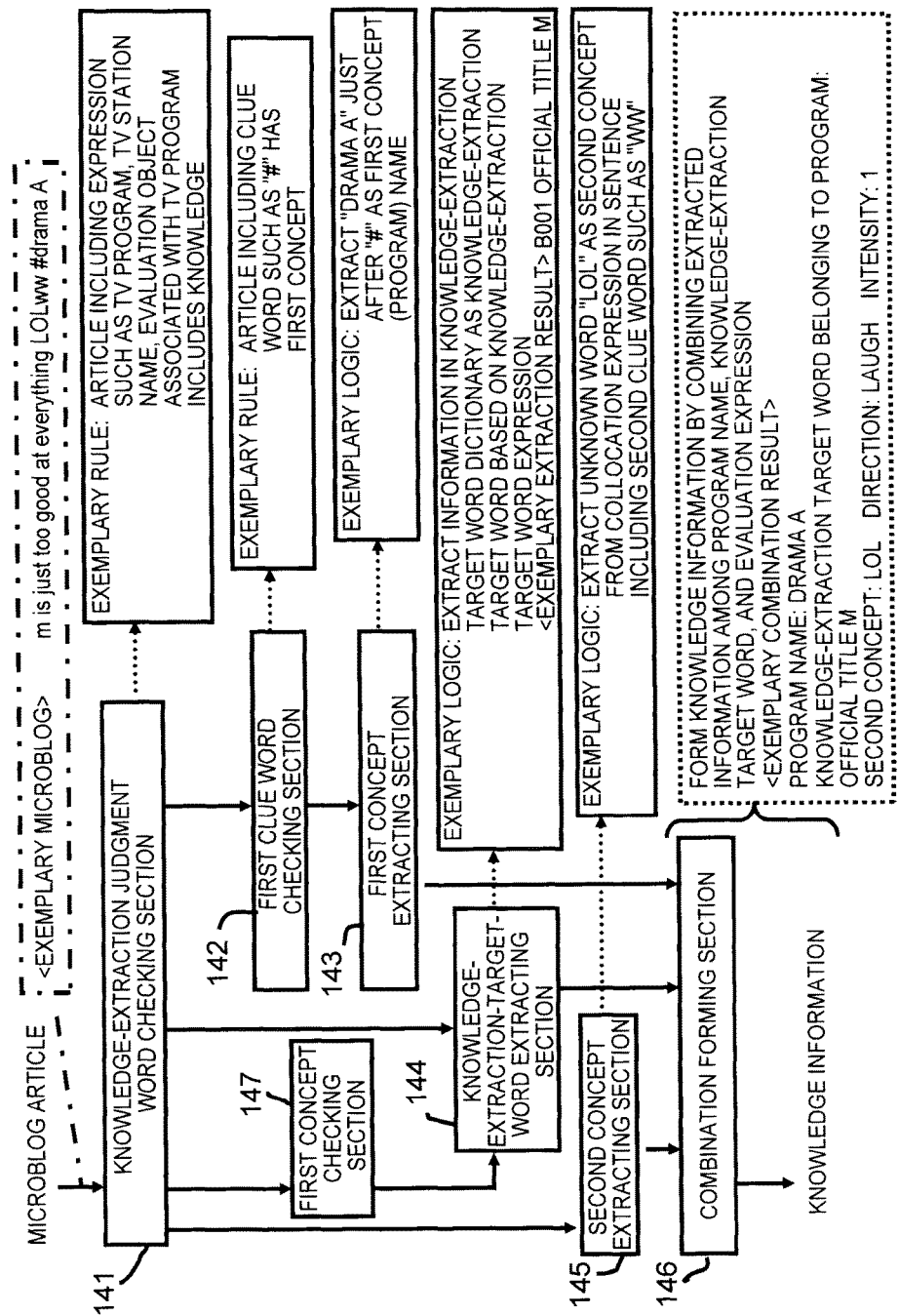
FIG. 39 is a schematic view illustrating details of a process operation of a knowledge extracting section in the sixth embodiment.

The following describes an operation of the knowledge extracting apparatus 102 constituted as above. FIG. 39 is a schematic view illustrating details of a process operation of the knowledge extracting section 14 in the knowledge extracting apparatus 102. The process operation of the knowledge extracting section follows the flowchart of FIG. 9, similarly to the first embodiment.

Note that, in the following description, the process of the knowledge extracting section 14 is performed every time an electronic document is received, but this process may be performed collectively on electronic documents that have been received already, during times such as nighttime when an information analysis process is not performed.

The information receiving section 12 receives a new microblog by distribution from a site on which the microblog is posted or by accessing the site on which the microblog is posted. The information receiving section 12 receives, for example, a microblog corresponding to an article ID "3" illustrated in FIG. 38.

The information selecting section 13 selects a microblog article regarding a TV program from microblog articles received by the information receiving section 12 (step S1). A judgment on the microblog article being a microblog regarding a TV program is made, for example, based on whether or not a TV program name or a TV station name is described after the first character "#" in an article content of the microblog. In a case of a microblog article without the first character "#" in an article content, it is judged whether or not its main body includes any of the TV program name, the TV station name, and a knowledge-extraction target word described in the knowledge-extraction target word dictionary of FIG. 36. The microblog article thus selected is sent to the knowledge extracting section 14 from the information selecting section 13.

In the knowledge extracting section 14, a knowledge-extraction judgment word checking section 141 judges whether or not the microblog article thus selected includes a knowledge-extraction judgment word (step S2). In a case of the present embodiment, the process of step 1 and the process of step S2 of step S1 may have the same criteria for judgment, so that only either one of the process steps may be performed.

In a case where a knowledge-extraction judgment word is included, the microblog article is transmitted to a first clue word checking section 142 as a microblog article including knowledge information.

As a result of the judgment in step S2, when the microblog article includes a knowledge-extraction judgment word, the first clue word checking section 142 judges whether or not the microblog article includes a first conceptual name, i.e., a first clue word to define a program name in the present embodiment (step S3).

For example, the first clue word checking section 142 refers to the first clue word dictionary 111, and judges whether or not a main body of the received microblog article includes at least one group definition word. For example, a news story of the article ID "3" illustrated in FIG. 38 includes a first clue word "#."

In a case where the received microblog article does not include any first clue word, the process of step S4 by a first concept extracting section 143 is omitted.

In a case where the received microblog article includes a first clue word, the first clue word checking section 142 transmits the microblog article to the first concept extracting section 143.

As a result of the judgment in step S3, when the microblog article includes a first clue word, the first concept extracting section 143 extracts a program name based on the first clue word (step S4).

For example, when receiving a microblog article including a first clue word, the first concept extracting section 143 extracts a noun or a compound noun just after the first clue word as a program name. In a case where the microblog article thus received is the news ID "3" illustrated in FIG. 38, the first concept extracting section 143 extracts a compound noun "drama A" just after the first clue word "#."

In the case of the present embodiment, for example, after a noun or a compound noun just after the clue word is extracted as a program name, the noun or compound noun thus extracted is compared with a list (not illustrated) of existing program names, and only if the noun or compound noun thus extracted is a full name or an abbreviated name of the program name, the noun or compound noun thus extracted is employed as the program name. Otherwise, it may be judged not to include a program name.

On the other hand, as a result of the judgment by the knowledge-extraction judgment word checking section 141, when the microblog article includes a knowledge-extraction judgment word, the knowledge-extraction-target-word extracting section 144 extracts a knowledge-extraction target word name from the microblog article.

More specifically, after step S3 or S4, for example, with respect to the microblog article transmitted without the process of the first concept extracting section 143, the knowledge-extraction-target-word extracting section 144 refers to the knowledge-extraction target word dictionary 112 and judges whether or not a main body of the microblog article includes a knowledge-extraction target word expression (step S5), and when a knowledge-extraction target word expression is included, the knowledge-extraction-target-word extracting section 144 extracts a knowledge-extraction target word corresponding to the knowledge-extraction target word expression (step S6).

In a case where the main body of the microblog article includes an expression in a column of a "knowledge-extraction target word expression" in the knowledge-extraction target word dictionary 112, it is judged that a knowledge-extraction target word written in a "knowledge-extraction target word name" in a corresponding row is included.

The knowledge-extraction target word dictionary 112 may include definitions in a plurality of rows or a plurality of expressions in a knowledge-extraction target word expression column, with respect to one knowledge-extraction target word. Further, a plurality of knowledge-extraction target word expressions may be extracted from a single microblog article.

For example, in a case of a microblog article of the article ID "3" of FIG. 38, a knowledge-extraction target word expression "m" is included, and therefore, a knowledge-extraction target word "code: B001, knowledge-extraction target word name: official title M" is extracted.

As a result of the judgment by the knowledge-extraction judgment word checking section 141, when the microblog article includes a knowledge-extraction judgment word, a second concept extracting section 145 extracts a second concept, that is, an evaluation expression in the present embodiment, from the microblog article. More specifically, the second concept extracting section 145 judges whether or not one or more clue words in a second clue word dictionary 113a are included in the main body of the microblog article including the knowledge-extraction judgment word (step S7).

The processes of step S7 and step S8 are performed after step S6 in the flowchart of FIG. 9, but may be performed before the process of step S3 or in parallel with the processes from step S3 to step S6, similarly to the first embodiment.

When a second clue word in the second clue word dictionary 113a is included in a headline or a main body of the received microblog article, the second concept extracting section 145 extracts a word phrase collocating with the clue word as an evaluation expression (step S8).

For example, in a main body of the article ID "3" illustrated in FIG. 38, "m is just too good at everything. LOLww #drama A" includes a second clue word "ww."

A word phrase collocating with the second clue word "ww," e.g., a word phrase put just before that is "LOL" (an unknown word not listed on general dictionaries). This unknown word "LOL" is extracted as an evaluation expression.

The evaluation expression may not be a word phrase just before a clue word in one article in process. All words are extracted from many microblog articles including the same second clue word, and in comparison with a set of articles which do not include the second clue word, a word phrase having a high probability to collocate with the clue word statistically may be assumed as an evaluation expression. For example, an article ID7 and an article ID8 in FIG. 38 include different second clue words "ww" and "(;_;)" and word phrases just before them are both "awesome." Probabilities to collocate with the respective second clue words are the same, and therefore, the word phrase is not assumed as an evaluation expression.

With respect to the extracted evaluation expression "LOL," a direction and an intensity associated with the second clue word "ww" registered in the second clue word dictionary 113a are given, and an evaluation expression "Evaluation expression: LOL, Direction: laugh, Intensity: 1" is obtained.

After the processes from step S3 to step S8 have been finished, a combination forming section 146 combines the program name, the knowledge-extraction target word, and the evaluation expression, which are extracted from the microblog article in process, so as to form knowledge information, and writes the knowledge information into a storage section (step S9). Here, the knowledge information includes the evaluation expression "Evaluation expression: LOL, Direction: laugh, Intensity: 1," to which the direction and the intensity are given. The evaluation expression may select a form in which the direction and the intensity are not given, similarly to the first embodiment.

In a case where only a single program name is extracted from the microblog article, all extracted knowledge-extraction target words and all extracted evaluation expressions are assigned to the program name. That is, one or more knowledge-extraction target words and evaluation expressions are allowed to be assigned to a single program name. In a case where a plurality of program names is extracted, similarly to the first embodiment, a program name, a knowledge-extraction target word relating to the program name, and an evaluation expression relating to the program name or a knowledge-extraction target word relating to the program name may be distinguished by context analysis and a simple discrimination process and combined. Further, the knowledge information is configured such that a knowledge-extraction target word and an evaluation expression are assigned to a program name, but a combination without the knowledge-extraction target word or the evaluation expression may be formed.

By such a process, the following knowledge is extracted as a set of the program name, the knowledge-extraction target word name, and the evaluation expression, and written into the storage section 11.

Program name: drama A
Knowledge-extraction target word belonging to program: Official title M
Evaluation expression: LOL, Direction: laugh, Intensity: 1

The combination is configured as a set of the program name, the knowledge-extraction target word, and the evaluation expression, but similarly to the first embodiment, the combination may only a set of the program name and the knowledge-extraction target word, and the evaluation expression may be retained as knowledge information, independently. Alternatively, the evaluation expression may be retained not with the program name but with the knowledge-extraction target word as knowledge information.

In regard to the main body of the microblog which is judged in step S2 not to include any knowledge-extraction judgment word, a first concept checking section 147 judges whether or not the main body of the microblog article includes the program name in the knowledge information written in the storage section 11 (step S11).

In a case where the program name is included, the knowledge-extraction-target-word extracting section 144 judges whether or not the main body of the microblog includes a knowledge-extraction target word expression by use of the knowledge-extraction target word dictionary 112 (step S12).

In a case where a knowledge-extraction target word expression is included, e.g., in a case where there is such an expression as "adopt" and "appear," the combination forming section 146 forms a combination for a process of adding a knowledge-extraction target word corresponding to the extracted knowledge-extraction target word expression to the program.

In a case where there is such an expression as "leave," the combination forming section 146 forms a combination for a process of removing a knowledge-extraction target word corresponding to the knowledge-extraction target word expression extracted for the program (step S13).

When the combination of the program and the adding or removing process of the knowledge-extraction target word is formed in step S13, the process is performed on the storage section 11 (step S9).

Note that the extraction of a knowledge-extraction target word may be performed without the use of knowledge-extraction target word dictionary 112 such that a noun phrase is extracted from the main body of the microblog article including the program name and assumed as a knowledge-extraction target word. In this case, the extracted noun phrase may be newly added to the knowledge-extraction target word dictionary 112 as a knowledge-extraction target word. Further, the process and judgment from step S11 to step S13 may not be performed in a case of only a single microblog, but may be performed on the storage section 11, for example, only in a case where there are more than a predetermined number of distributions. Alternatively, the processes from step S11 to step S13 may not be performed on a main body of a microblog, but may be performed only on an electronic document distributed by a TV station or a news distribution supplier.

Next will be described an operation of the information analysis section 15 with reference to FIGS. 39, 14, and 15.

Initially, the information receiving section 12 receives a new microblog article by distribution from a site on which the microblog is posted or by accessing the site on which the microblog is posted. The information receiving section 12 receives, for example, a microblog corresponding to an article ID "6" illustrated in FIG. 38 (step S21). The microblog article thus received is transmitted to a knowledge-extraction target word/first-concept/second-concept extracting section 151.

Initially, the knowledge-extraction target word/first-concept/second-concept extracting section 151 refers to the knowledge-extraction target word dictionary 112 stored in the storage section 11, and judges whether or not the received microblog article includes a knowledge-extraction target word expression (step S22).

When a knowledge-extraction target word expression is included, the knowledge-extraction target word/first-concept/second-concept extracting section 151 extracts a knowledge-extraction target word name/code corresponding to the knowledge-extraction target word expression thus extracted. Further, the knowledge-extraction target word/first-concept/second-concept extracting section 151 refers to the knowledge-extraction target word dictionary 112 illustrated in FIG. 36 as knowledge information, and extracts all first concepts to which the knowledge-extraction target word name is assigned, that is, all program names (step S23). The knowledge-extraction target word/first-concept/second-concept extracting section 151 and an electronic document assigning section 152 perform processes of step S24/step S25, per knowledge-extraction target word name extracted from the main body of the microblog article, on each program name to which the knowledge-extraction target word name belongs.

Figure 40:
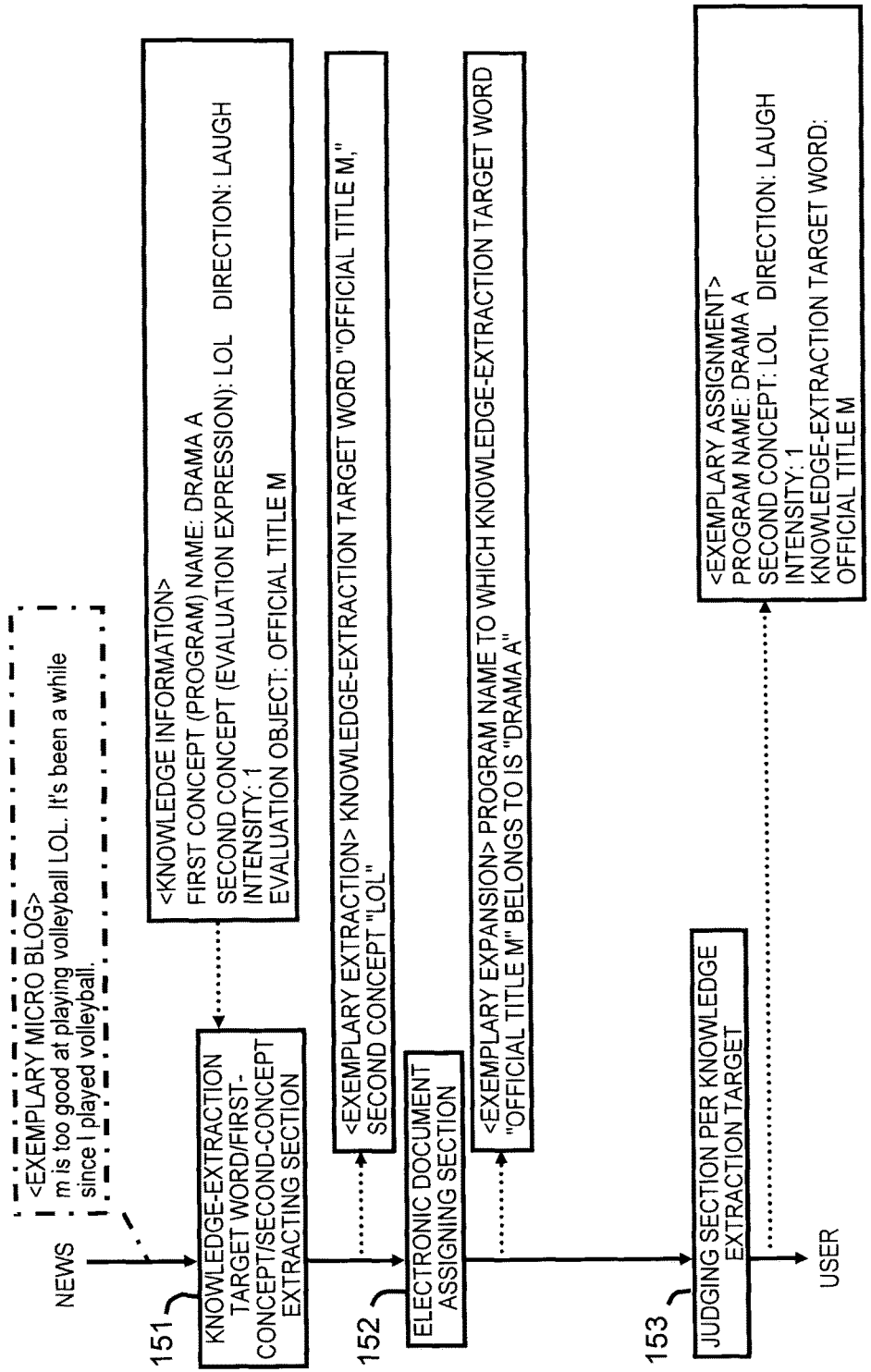
FIG. 40 is a schematic view illustrating details of a process operation of an information analysis section in the sixth embodiment.

Initially, the knowledge-extraction target word/first-concept/second-concept extracting section 151 refers to knowledge information illustrated in FIG. 40 which is extracted by the preceding processes, extracts a second concept assigned to the program name to which a knowledge-extraction target word name in process at the point and its knowledge-extraction target word belong, that is, an evaluation expression in the present embodiment, and judges whether or not there is the evaluation expression in the main body of the microblog (step S24).

When there is the evaluation expression, it is judged that information and evaluation related to the program are included in the received microblog article in process, and the electronic document assigning section 152 assigns the microblog article in process to the knowledge-extraction target word and the program (step S25). In the present embodiment, differently from the first embodiment, the process may not be performed on all knowledge-extraction target words belonging to the program name.

After, before, or in parallel with the processes from step S22 to step S25, the knowledge-extraction target word/first-concept/second-concept extracting section 151 judges whether or not the main body of the received microblog article includes any first conceptual name in the knowledge information illustrated in FIG. 40 (step S26).

For example, in a microblog article of an article ID "6" illustrated in FIG. 38, its main body does not include the program name. In this case, the knowledge-extraction target word/first-concept/second-concept extracting section 151 extracts the program name "drama A" associated with the extracted knowledge-extraction target word "official title M" in the knowledge-extraction target word dictionary 12 of FIG. 36, and sends it to the electronic document assigning section 152.

In a case where the first conceptual name is extracted, the electronic document assigning section 152 is also able to take out a knowledge-extraction target word associated with the program name in the knowledge information illustrated in FIG. 40 and to assign the microblog article in process to corresponding the knowledge-extraction target word (step S27). In the present embodiment, this process is omitted and the microblog article is assigned to only the knowledge-extraction target word extracted from the main body.

A judging section 153 per knowledge extraction target performs processes from step S28 to step S34 described below for each knowledge-extraction target word to which the microblog article is assigned in the processes to step S27.

In step S28, by referring to an extraction result of the second concept, that is, the evaluation expression in step S24, it is judged whether or not an evaluation expression of the program to which the knowledge-extraction target word currently in process belongs is extracted.

In regard to the knowledge-extraction target word in process, in a case where an evaluation expression associated with the program in process to which the knowledge-extraction target word in process belongs is extracted, it is judged that a reaction to the knowledge-extraction target word or the program may vary, and a set of the program, the knowledge-extraction target word, and the evaluation expression is added to an alarm (step S29).

In a case where the knowledge information retained in the storage section 11 is divided into a "program name/knowledge-extraction target word" and an evaluation expression, it is judged, in step S28, whether or not all evaluation expressions retained in the storage section 11 are extracted regardless of whether the knowledge-extraction target word in process or the program belongs or not.

In this case, a set of the knowledge-extraction target word and the evaluation expression extracted in step S28 is added to the alarm in step S29.

After the microblog article has been assigned to the knowledge-extraction target word, main bodies of microblogs assigned to the knowledge-extraction target word or the program in process and stored in the storage section 11 for a given period of time in the past, for example, for three days are referred to, so as to judge whether or not there is any trend word (step S30), and when there is a trend word in the microblog article including the knowledge-extraction target word or the program in process, a set of the program, the knowledge-extraction target word, and the trend word is added to an alarm (step S31).

Further, similarly, main bodies of microblog articles assigned to the knowledge-extraction target word or the program in process and stored in the storage section 11 for a given period of time in the past, for example, for one hour are referred to, so as to judge whether or not the received microblog article in process is similar to or identical with the microblog articles for the given period of time in the past (step S32), and when there is a similar microblog article or an identical microblog article, a similarity between the microblog articles in pairs is found, and a multiple-distribution alarm is added (step S33).

The alarm, the trend alarm, and the multiple-distribution alarm output in the above processes are output from the information analysis section 15 and is provided to a user terminal device 2 (step S34).

As described above, according to the present embodiment, since knowledge such as a TV program, a knowledge-extraction target word (a matter picked up on a program), and an evaluation expression are extracted from a received microblog article and retained, it is possible to utilize, as knowledge, even expressions which are not listed in general dictionaries.

Further, with such a configuration that after knowledge information is stored, all microblog articles received newly are analyzed based on the knowledge information in the storage section 11, a result of the analysis is immediately provided to a user, thereby making it possible to effectively support to know viewer's reactions.

Further, similarly to the third embodiment, in the aforementioned function to extract knowledge information from a microblog article selected by the information selecting section 13, the knowledge extracting section 14 has a function to extract event information including an expression indicative of a predetermined target from the selected microblog article, and to write the event information thus extracted and a time stamp into the storage section 11 as knowledge information.

Here, the expression indicative of a predetermined target is, for example, a knowledge-extraction target word, that is, a knowledge-extraction target word expression described in the knowledge-extraction target word dictionary 112 in the present embodiment, or a first concept, that is, an expression indicative of a program name in the present embodiment. Note that a "first clue word to define a program name which is a knowledge-extraction target word" is described in the first clue word dictionary 111.

The process of the knowledge extracting section 14 follows the flowchart of FIG. 18, similarly to the third embodiment.

When the information receiving section 12 receives a microblog article (step S41), the knowledge extracting section 14 refers to the first clue word dictionary 111, the knowledge-extraction target word dictionary 112, and the like, and judges whether or not an expression indicative of a target (a knowledge-extraction target word, a program name, and the like) selected by a user is included therein (step S42).

When the expression indicative of the target selected by the user is included, the knowledge extracting section 14 extracts a noun phrase including the expression indicative of the target as an element (an event) (step S43).

The knowledge extracting section 14 additionally writes the extracted element (event) together with a target name and a time stamp of the received information into the storage section 11 (step S44).

After that, the information analysis section 15 performs operations from steps S21 to S34 in a similar manner to the above.

FIG. 41 is a view illustrating an example of the knowledge information. This is an example in which a process is performed on a knowledge-extraction target word name "official title M" in regard to the news ID "3" and the news ID "6" illustrated in FIG. 38.

The knowledge to be extracted is a noun phrase including a target expression selected by the user, but a compound noun may be selected from this noun phrase, a proper noun may be selected therefrom, or a trend word may be selected as an element (event).

The element (event) extracted for the knowledge-extraction target word name "official title M" may be assigned to the program according to the knowledge-extraction target word dictionary 112 of FIG. 36 and written as knowledge information together with information obtained by replacing the "target" from "official title M" to "drama A" in the knowledge information illustrated in FIG. 41.

Further, as illustrated in FIG. 41, the number of distributions of microblog articles having a high similarity may be assumed as "a similar information number" and regarded as the knowledge information as well.

As described above, the present embodiment is configured such that, when a microblog article is received, a time stamp is added to the microblog article, event information including an expression indicative of a predetermined target is extracted from a selected microblog article, and the event information thus extracted and the time stamp are written into the storage section 11 as knowledge information. With such a configuration, similarly to the third embodiment, an element (event) related to a certain target is extracted and retained in time series with time stamp information, and therefore, it is possible to retain knowledge information which is effective for forecast in the near future when a similar event occurs, and to show it to a user terminal device 2.

Next will be described a process of a knowledge evaluation update apparatus 19.

In a case where the program is a comedy sketch, the evaluation of "laugh" is able to be regarded as a positive evaluation, but in a case where the program is a serious drama, "laugh" is derisive laughter, which is considered as a negative evaluation. Accordingly, it is effective that, for every program, an evaluation expression and a level of evaluation of the program, i.e., information on a certainty factor in the present embodiment, are retained together.

In view of this, as illustrated in FIG. 42, the present embodiment is configured to retain knowledge information to which certainty factor information including a certainty factor and a certainty factor updating history is added. That is, the certainty factor of the present embodiment is a value indicative of a degree of how much a second concept and a first concept are related to each other.

Note that, in FIG. 42, respective pieces of information on a program name which is the first concept, an evaluation expression which is the second concept, and a knowledge-extraction target word are retained, but the information of the program name or the knowledge-extraction target word may not be retained.

It is possible to perform the process of the knowledge evaluation update apparatus 19 according to a process of Japanese Patent Application No. 2012-15700 which was not published as of the filing of the present application. In the case of the present embodiment, it is possible to use an audience rating of a program, for example, as numerical information. The knowledge evaluation updating process may be performed once a day during times when not so many microblog articles are distributed or may be performed after a predetermined time after the end of the program as an analysis target.

The present embodiment is configured such that, based on information (audience rating or the like) other than an information source from which knowledge is extracted, effectiveness of a combination of a first concept and a second concept is evaluated and updated. This makes it possible to maintain accuracy of the knowledge and an influence rate to the first concept or a knowledge-extraction target word to be high based on a plurality of information sources.

Information on the certainty factor may not be used for evaluation update of a relationship to knowledge information, a first clue word, or a second clue word, and may be used for weighting when the number of program names or knowledge-extraction target words included in an electronic document including a microblog article is counted. That is, in a case where there are 50 microblog articles including a knowledge-extraction target word "character X" which belongs to the program name "drama A," for example, it is assumed that 50 microblog articles are distributed for a certainty factor of 1.0, and it is assumed that 40 microblog articles are distributed for a certainty factor of 0.8, and the respective numbers may be assigned. Alternatively, in a case where the number of evaluation expressions with a low certainty factor increases, the certainty factor may be regarded as knowledge to judge that the evaluation from audiences falls down.

According to a knowledge extracting apparatus of at least one of the embodiments described above, it is possible to extract, at any time, knowledge information related to a knowledge-extraction target word from an electronic document continually distributed in a state where the electronic document is not associated with the knowledge-extraction target word. Further, the knowledge extracting apparatus of at least one of the above embodiments is able to make knowledge information in a latest state.

Note that the technique described in each of the above embodiments is storable, as a program executable by a computer, in a storage medium such as a magnetic disk (a floppy (registered trademark) disk, a hard disk, and the like), an optical disk (CD-ROM, DVD, and the like), a magneto-optical disk (MO), and a semiconductor memory, so as to be distributed.

Further, this storage medium may have any storage form as long as the storage medium is able to store the program and readable by a computer.

Further, an OS (an operating system) operating on a computer, database management software, MW (middleware) such as network software, or the like may execute part of each process to realize the embodiments based on an instruction from a program installed in the computer via a storage medium.

Further, the storage medium in each of the embodiment is not limited to a medium independent of a computer, and includes a storage medium which downloads a program transmitted via LAN, the Internet, or the like and stores or temporarily stores the program therein.

Further, the number of storage media is not limited to one, and the present invention also includes a case where a plurality of media executes the processes in each of the above embodiments. These media may have any configuration.

Note that a computer in each of the above embodiments executes each process in each of the above embodiments based on a program stored in a storage medium, and may have any configuration, for example, a single device such as a personal computer, a system in which a plurality of devices is connected via a network, and the like.

Further, the computer in each of the embodiment is not limited to a personal computer, and includes an arithmetic processing device, a microcomputer, and the like included in information processing equipment, and generally refers to an apparatus and a device which are able to realize the functions of the present invention by a program.

Note that some embodiments of the present invention have been described, but these embodiments are merely described as examples and are not intended to limit a scope of the invention. These new embodiments are implementable in other various configurations, and it is possible to perform various omissions, substitutions, and modifications without departing from a summary of the invention. These embodiments and the modifications thereof are included in the scope and summary of the invention, and are also included within inventions described in Claims and their equivalent ranges.

What is claimed is:

1. A knowledge extracting apparatus for extracting knowledge information from an electronic document, comprising:
an information receiving section for receiving the electronic document;
a knowledge extracting section for extracting a concept from the electronic document based on a target word to extract the knowledge information and a clue word to extract the knowledge information and forming knowledge information in which the concept thus extracted and the target word are associated with each other;
a storage section for storing the knowledge information thus formed;
an information analysis section for, after the knowledge information is stored, analyzing a new electronic document based on the knowledge information stored in the storage section;
an electronic document searching section for searching the concept or the target word included in the new electronic document;
a knowledge-registration-concept extracting section for,
when at least a predetermined threshold of the concept is described in the new electronic document as a result of the searching by the searching section, the predetermined threshold of the concept being not less than 0 and not more than 1, extracting the concept, and
when at least a predetermined threshold of the target word is described in the new electronic document as a result of the searching by the searching section, the predetermined threshold of the target word being not less than 0 and not more than 1, extracting the knowledge information associated with the target word from the storage section;
an evaluation section for evaluating a magnitude or a fluctuation of numerical information associated with the target word or the concept extracted by the knowledge-registration-concept extracting section; and
a certainty factor update section for updating a certainty factor which is an evaluation value indicative of a relationship between the concept and the target word, based on a magnitude of the numerical information, a direction of the fluctuation, and a magnitude of the fluctuation of the numerical information.

2. The knowledge extracting apparatus according to claim 1, comprising:
a knowledge update section for asking a user to make a judgment when the certainty factor is less than a prescribed value and deleting the relationship between the concept and the target word being selected in response to an instruction from the user.

3. The knowledge extracting apparatus according claim 1, wherein:
the clue word is associated with a direction and an intensity which is set in advance; and
the knowledge extracting section forms knowledge information associated with the intensity of the clue word, the concept thus extracted, and the target word.

4. A knowledge extracting apparatus for extracting knowledge information related to stock transactions from pieces of distributed news information, comprising:
an information receiving section for receiving the pieces of news information;
an information selecting section for selecting news information including economic terms from the pieces of news information thus received;
a knowledge extracting section for extracting the knowledge information from the news information thus selected;
a storage section for storing the knowledge information thus extracted; and
an information analysis section for, after the knowledge information is stored, analyzing all the pieces of news information received by the information receiving section, based on the knowledge information stored in the storage section;
wherein the knowledge extracting section includes:
a share-price-fluctuation evaluation word judging section for judging whether or not the news information thus selected includes a share-price-fluctuation evaluation word to evaluate a share price fluctuation;
a group definition word judging section for judging whether or not the news information includes a group definition word to define a group name of an issue when the news information includes the share-price-fluctuation evaluation word as a result of the judgment;
a group name extracting section for extracting a group name from the news information based on the group definition word when the news information includes the group definition word as a result of the judgment;
an issue extracting section for extracting an issue including a company name and a securities code from the news information when the news information includes the share-price-fluctuation evaluation word as a result of the judgment by the share-price-fluctuation evaluation word judging section;
an element extracting section for extracting a share-price-fluctuation element from the news information when the news information includes the share-price-fluctuation evaluation word as a result of the judgment by the share-price-fluctuation evaluation word judging section;
a combination forming section for combining the group name, the issue, and the share-price-fluctuation element thus extracted so as to form the knowledge information; and
a writing section for writing the knowledge information thus formed into the storage section,
wherein the knowledge information is information including the group name, the issue, and the share-price-fluctuation element, or information including first information constituted by the group name and the issue and second information constituted by the share-price-fluctuation element.

5. The knowledge extracting apparatus according to claim 4, wherein:
the knowledge extracting section further includes:
an element-expression clue word dictionary storage section for storing a clue word to an expression of the share-price-fluctuation element, information indicative of a direction of the share price fluctuation, and information indicative of an intensity of the share price fluctuation in association with each other; and
an information giving section for searching the element-expression clue word dictionary based on the share-price-fluctuation element thus extracted and giving respective pieces of searched-out information indicative of a direction and an intensity of the share price fluctuation, to the share-price-fluctuation element.

6. The knowledge extracting apparatus according to claim 4, wherein:

the information receiving section adds a time stamp to the news information when receiving the news information;

the knowledge extracting section extracts event information including an expression indicative of a predetermined target from the news information thus selected, and performs a writing process of wiring the event information thus extracted and a time stamp into the storage section as the knowledge information; and the expression indicative of the predetermined target is a company name expression indicative of a company name of an issue or an expression indicative of a noun just before a group definition word to define a group name of the issue.

7. The knowledge extracting apparatus according to claim 4, wherein:

the knowledge information has a hierarchical structure constituted by broader-concept information and narrower-concept information; and the storage section stores evaluation information, and a certainty factor indicative of how much the narrower-concept information belongs to the broader-concept information, the knowledge extracting apparatus comprising:

an evaluation section for calculating an evaluation value based on the evaluation information associated with the broader-concept information and the narrower-concept information; and a certainty factor update section for updating the certainty factor based on the evaluation value.

8. The knowledge extracting apparatus according to claim 7, comprising:

a knowledge update section for deleting knowledge information including the narrower-concept information and the broader-concept information from the storage section when the certainty factor is less than a prescribed value.

9. The knowledge extracting apparatus according to claim 4, wherein:

the storage section further stores evaluation information and a certainty factor indicative of how much the issue included in the knowledge information belongs to the group name, the knowledge extracting apparatus comprising:

a checking section for checking the group name included in the news information;

an extracting section for extracting an issue from the knowledge information based on the group name checked by the checking section to be included in the news information;

an evaluation section for calculating an evaluation value based on the evaluation information associated with the issue; and a certainty factor update section for updating the certainty factor based on the evaluation value.

10. A non-transitory computer readable medium which stores a program to be used in a knowledge extracting section for extracting a concept from a distributed electronic document, which knowledge extracting section includes a storage section, the program causing the knowledge extracting apparatus to function as:

an information receiving section for receiving the electronic document;

a knowledge extracting section for extracting a concept from the electronic document based on a target word to extract the knowledge information and a clue word to extract the knowledge information and forming knowledge information in which the concept thus extracted and the target word are associated with each other;

a storage section for storing the knowledge information thus formed;

an information analysis section for, after the knowledge information is stored, analyzing a new electronic document based on the knowledge information stored in the storage section;

an electronic document searching section for searching the concept or the target word included in the new electronic document;

a knowledge-registration-concept extracting section for,
when at least a predetermined threshold of the concept is described in the new electronic document as a result of the searching by the searching section, the predetermined threshold of the concept being not less than 0 and not more than 1, extracting the concept, and when at least a predetermined threshold of the target word is described in the new electronic document as a result of the searching by the searching section, the predetermined threshold of the target word being not less than 0 and not more than 1, extracting the knowledge information associated with the target word from the storage section;

an evaluation section for evaluating a magnitude or a fluctuation of numerical information associated with the target word or the concept extracted by the knowledge-registration-concept extracting section; and a certainty factor update section for updating a certainty factor which is an evaluation value indicative of a relationship between the concept and the target word, based on a magnitude of the numerical information, a direction of the fluctuation, and a magnitude of the fluctuation of the numerical information.

11. A non-transitory computer readable medium, which stores a program to be used in a knowledge extracting apparatus for extracting knowledge information related to stock transactions from pieces of distributed news information, which knowledge extracting apparatus includes a storage section, the program causing the knowledge extraction apparatus to function as:

an information receiving section for receiving the pieces of information;

an information selecting section for selecting a piece of news information including economic terms from the pieces of news information thus received;

a knowledge extracting section for extracting the knowledge information from the news information thus selected and writing the knowledge information into the storage section; and an information analysis section for, after the knowledge information is written, analyzing all the pieces of news information thus received by the information receiving section, based on the knowledge information thus stored in the storage section;

wherein the knowledge extracting section includes:

a share-price-fluctuation evaluation word judging section for judging whether or not the news information thus selected includes a share-price-fluctuation evaluation word to evaluate a share price fluctuation;

a group definition word judging section for judging whether or not the news information includes a group definition word to define a group name of an issue when the news information includes the share-price-fluctuation evaluation word as a result of the judgment;

a group name extracting section for extracting a group name from the news information based on the group definition word when the news information includes the group definition word as a result of the judgment;

an issue extracting section for extracting an issue including a company name and a securities code from the news information when the news information includes the share-price-fluctuation evaluation word as a result of the judgment by the share-price-fluctuation evaluation word judging section;

an element extracting section for extracting a share-price-fluctuation element from the news information when the news information includes the share-price-fluctuation evaluation word as a result of the judgment by the share-price-fluctuation evaluation word judging section;

a combination forming section for combining the group name, the issue, and the share-price-fluctuation element thus extracted so as to forms the knowledge information; and a writing section for writing the knowledge information thus formed into the storage section, wherein the knowledge information is information including the group name, the issue, and the share-price-fluctuation element, or information including first information constituted by the group name and the issue and second information constituted by the share-price-fluctuation element.

12. The non-transitory computer readable medium according to claim 11, wherein:

the knowledge information has a hierarchical structure constituted by broader-concept information and narrower-concept information; and the storage section stores evaluation information and a certainty factor indicative of how much the narrower-concept information belongs to the broader-concept information, the program causing the knowledge extracting apparatus to function as:

an evaluation section for calculating an evaluation value based on the evaluation information associated with the broader-concept information and the narrower-concept information; and a certainty factor update section for updating the certainty factor based on the evaluation value.

\* \* \* \* \*